US011203282B2

(12) United States Patent
Madril et al.

(10) Patent No.: US 11,203,282 B2
(45) Date of Patent: Dec. 21, 2021

(54) METHOD AND APPARATUS FOR VEHICULAR LIGHT FIXTURES

(71) Applicant: JST Performance, LLC, Gilbert, AZ (US)

(72) Inventors: Edgar A. Madril, Mesa, AZ (US); Pete D. Sibitzky, Lakeside, CA (US); Bradley J. LaMarche, Gilbert, AZ (US); Eric G. Lokken, Phoenix, AZ (US); Adam P. Boucher, Mesa, AZ (US)

(73) Assignee: JST Performance, LLC, Gilbert, AZ (US)

( * ) Notice: Subject to any disclaimer, the term of this patent is extended or adjusted under 35 U.S.C. 154(b) by 0 days.

(21) Appl. No.: 16/569,378

(22) Filed: Sep. 12, 2019

(65) Prior Publication Data
US 2020/0010014 A1   Jan. 9, 2020

Related U.S. Application Data

(63) Continuation of application No. 15/601,209, filed on May 22, 2017.
(Continued)

(51) Int. Cl.
*B60Q 1/14* (2006.01)
*B60Q 1/24* (2006.01)
(Continued)

(52) U.S. Cl.
CPC ............ *B60Q 1/1423* (2013.01); *B60K 37/02* (2013.01); *B60Q 1/0023* (2013.01);
(Continued)

(58) Field of Classification Search
CPC ............ B60K 2370/15; B60K 2370/33; B60K 2370/331; B60K 2370/34; B60K 37/02;
(Continued)

(56) References Cited

U.S. PATENT DOCUMENTS 8,325,027 B2 ‡ 12/2012 Tee .......................... B60Q 1/50
340/43
9,630,669 B2 ‡ 4/2017 Slaughter ................... B62J 6/02
(Continued)

FOREIGN PATENT DOCUMENTS

CN          103419713      ‡ 12/2013
WO     WO2013186685 A1  ‡  6/2013

OTHER PUBLICATIONS https:/revvalcycles~cOrn/prOducts/Ied-headlIght.‡
(Continued)

*Primary Examiner* — Anne M Hines
(74) *Attorney, Agent, or Firm* — Calfee, Halter & Griswold LLP

(57) ABSTRACT

A lighting device is provided for controlling the photometric distribution of light emitted by two or more LEDs. The lighting device may be integrated with a control system of the vehicle and may be controlled by a remote controller. The lighting device may be capable of being operated in one or more modes of operation based on operating conditions, user input, or both. Operating conditions may include vehicle conditions, environmental conditions, and user conditions. The controller may operate a software application to enable the user to modify, control, or otherwise regulate any mode of operation or other feature of the lighting system.

20 Claims, 27 Drawing Sheets

Related U.S. Application Data

(60) Provisional application No. 62/416,079, filed on Nov. 1, 2016, provisional application No. 62/339,837, filed on May 21, 2016.

(51) Int. Cl.
  *B60Q 1/00* (2006.01)
  *B60K 37/02* (2006.01)
  *B60Q 1/04* (2006.01)

(52) U.S. Cl.
  CPC ......... *B60Q 1/0058* (2013.01); *B60Q 1/0076* (2013.01); *B60Q 1/0088* (2013.01); *B60Q 1/0483* (2013.01); *B60Q 1/1446* (2013.01); *B60Q 1/1461* (2013.01); *B60Q 1/245* (2013.01); *B60K 2370/15* (2019.05); *B60K 2370/33* (2019.05); *B60K 2370/331* (2019.05); *B60K 2370/34* (2019.05); *B60Q 2300/11* (2013.01); *B60Q 2300/12* (2013.01); *B60Q 2300/13* (2013.01); *B60Q 2300/23* (2013.01); *B60Q 2300/31* (2013.01); *B60Q 2300/333* (2013.01); *B60Q 2300/40* (2013.01)

(58) Field of Classification Search
  CPC .. B60Q 1/0023; B60Q 1/0058; B60Q 1/0076; B60Q 1/0088; B60Q 1/0483; B60Q 1/1423; B60Q 1/1446; B60Q 1/1461; B60Q 1/245; B60Q 2300/11; B60Q 2300/12; B60Q 2300/13; B60Q 2300/23; B60Q 2300/31; B60Q 2300/333; B60Q 2300/40
  See application file for complete search history.

(56) References Cited

U.S. PATENT DOCUMENTS

| | | | |
|---|---|---|---|
| 2004/0062047 A1 | 4/2004 | Camarota et al. | |
| 2006/0082221 A1‡ | 4/2006 | Mouzas | B60Q 1/12 307/10.1 |
| 2010/0123402 A1‡ | 5/2010 | Chen | H05B 45/00 315/15 |
| 2012/0096978 A1‡ | 4/2012 | Voshell | B62K 21/12 74/551 |
| 2012/0203432 A1‡ | 8/2012 | Lukacs | B60Q 1/18 701/42 |
| 2013/0176747 A1‡ | 7/2013 | Sparrow | F21V 23/006 362/47 |
| 2013/0307411 A1‡ | 11/2013 | Tsuchiya | B60Q 11/005 315/77 |
| 2014/0078762 A1‡ | 3/2014 | Adams | F21S 45/47 362/496 |
| 2014/0198515 A1 | 7/2014 | Tulio et al. | |
| 2016/0221625 A1* | 8/2016 | Slaughter | H05B 45/10 |

OTHER PUBLICATIONS http://www mOtOrCyCfesuperstorecom/49672//kuryakyn-phase-7-led-headlig h.‡
http://pressroom~gelighting cOm/news/ge-iighting-Offers-iOng-lastng-dUrable- led-headlight-for-off-road-adventu rers#AVvWvtu IrKCg.‡
http://www~streetfightersinc~com/Head ightkits~htm.‡
https://www~kchilltes~com/.‡
International Search Report and Writ ten Opin on of the International Search Authority for copending Internat onal Patent Application No. PCT/U517/33806, dated Sep. 18, 2017, 10 pgs.‡
http://www.hella Com/hella-sg/Headlamps-201. html.‡
http:/www~alibaba ~Com/produCt-detail/Dle-Cast-alu minlu m-alloy-molded-cabl e_60266484685.htmli.‡
http:/lwww. Car-lIghting-seleCtor.Corm/en/featuresihtml.‡
http://www~Ip67ConneCtor~Com/produCt/6OO39835936-8OO1 7234313pin_Best _sell ing_ Screw_fixing adapter waterproof_ assem blyT COnlneCtorhtm I.‡
http://www~aliexpress cm/trnlpcs-TV-to-TV-RF-adapter-for-TV-male-to-TV- male-right-angle-T-connector/696997075 html.‡
http://www. ip68Con neCtor~Com/work/st-O8ip68-waterproof-t-spl itter-ConneC.‡
Ex Parte Quayle Office Action dated Apr. 9, 2021 in related U.S. Appl. No. 15/601,209.
Notice of Allowance dated Jun. 9, 2021 in related U.S. Appl. No. 15/601,209.

* cited by examiner
‡ imported from a related application

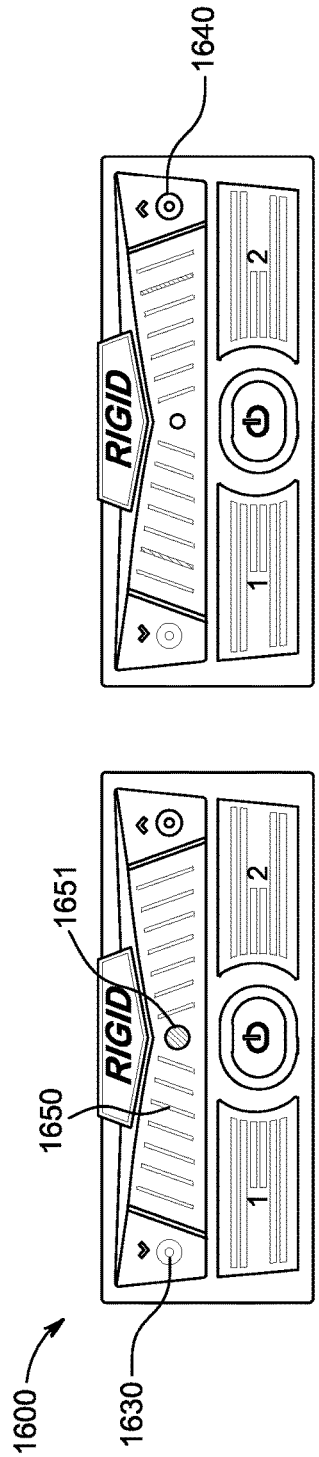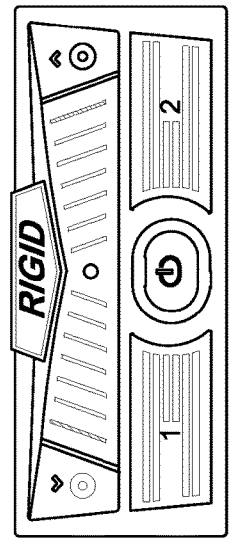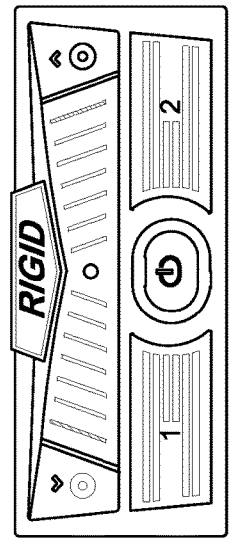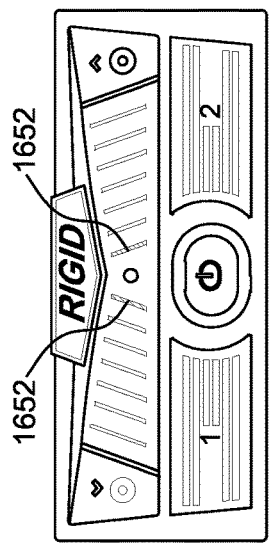
FIG. 16A
FIG. 16B
FIG. 16C
FIG. 16D
FIG. 16E

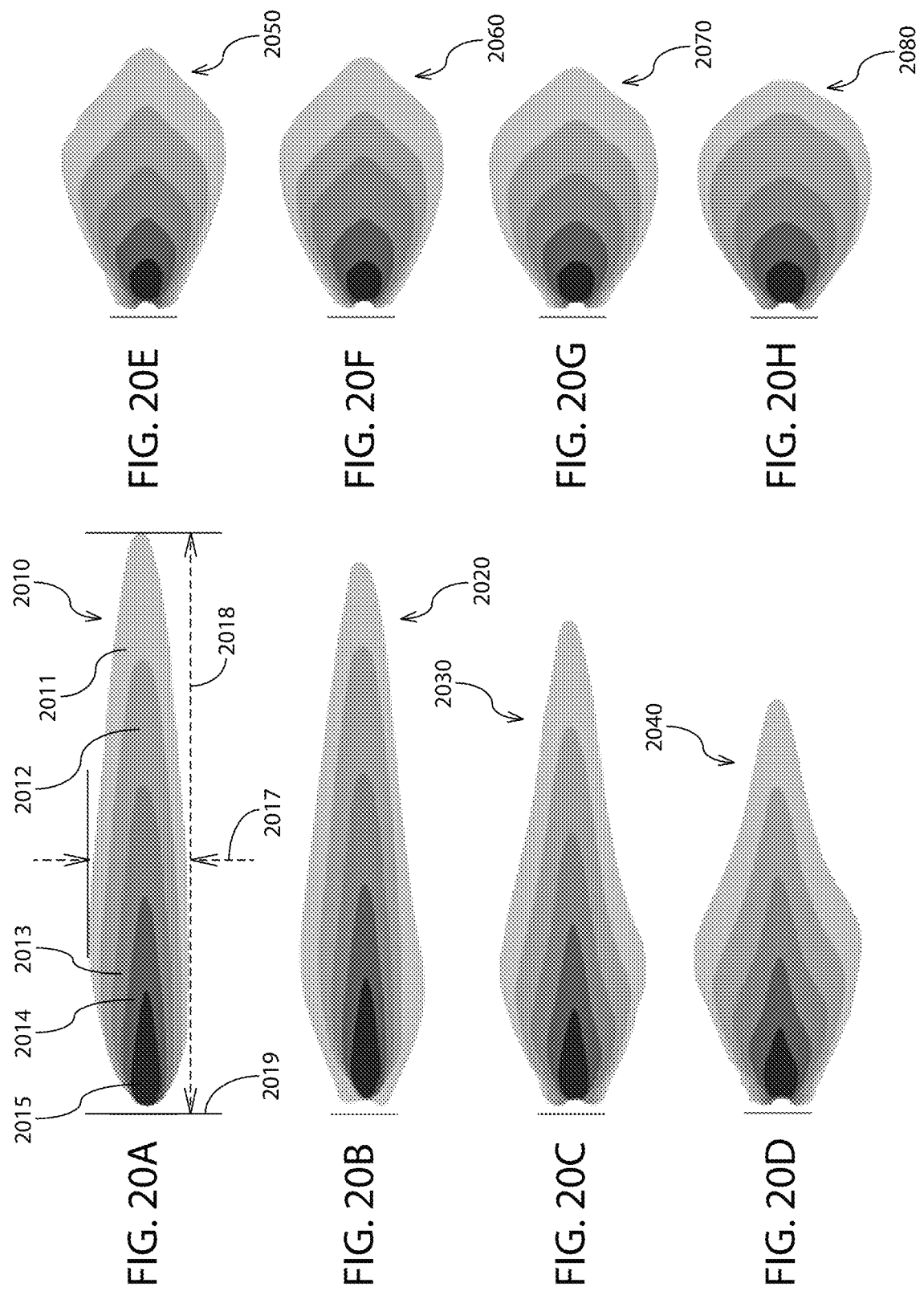

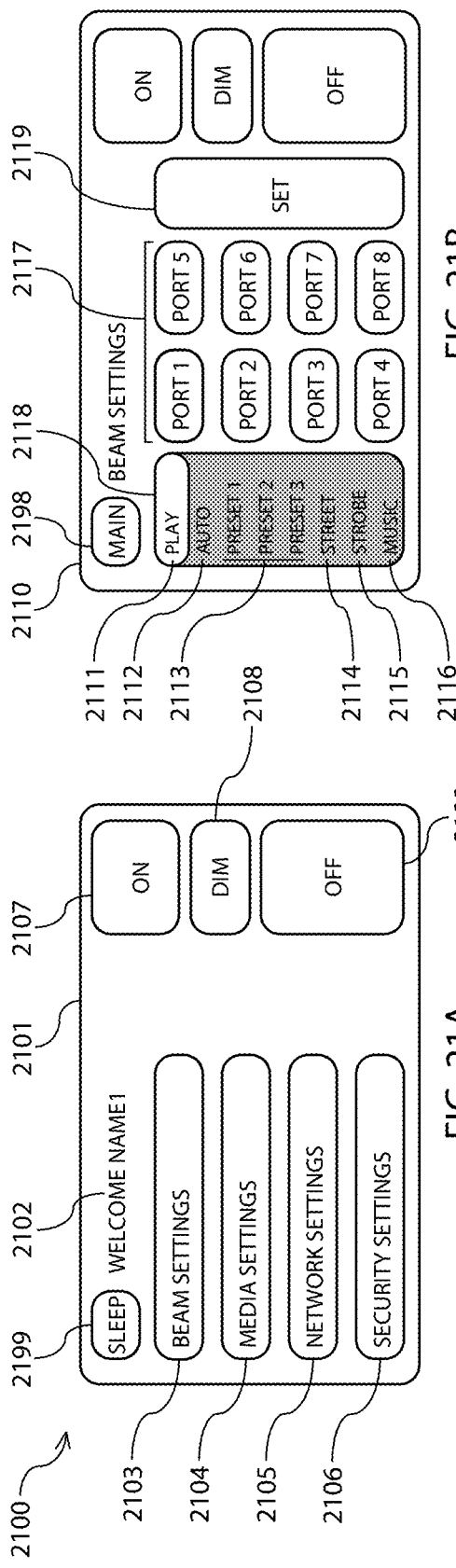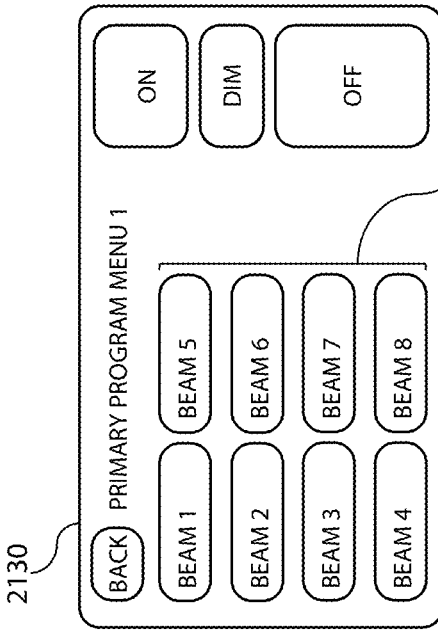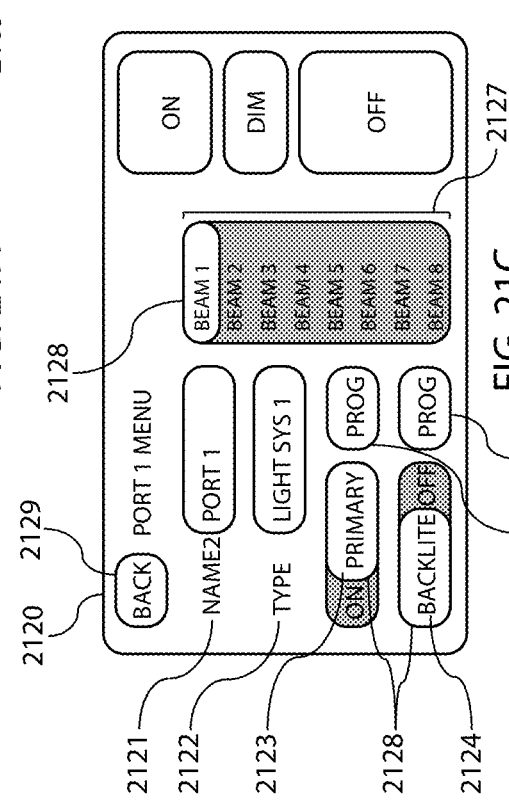
FIG. 21A
FIG. 21B
FIG. 21C
FIG. 21D

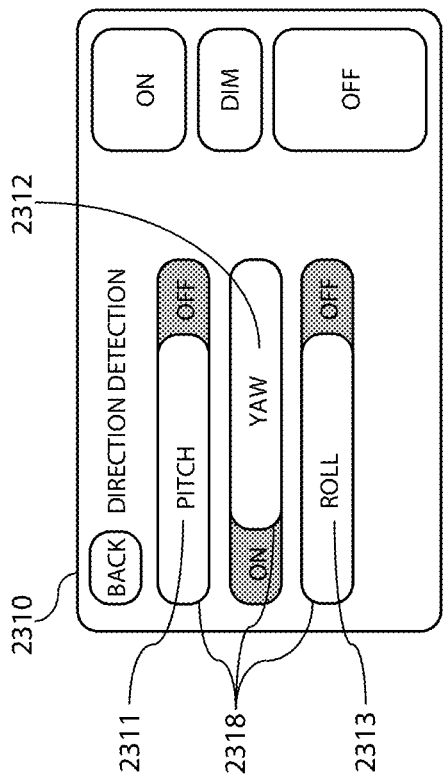
FIG. 23A
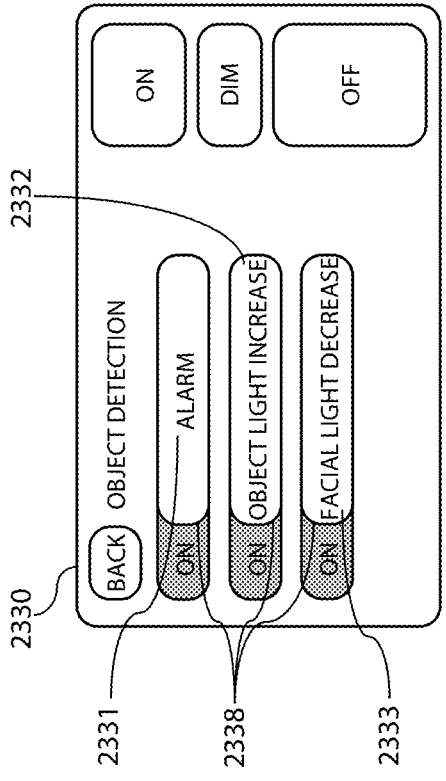
FIG. 23B
FIG. 23C
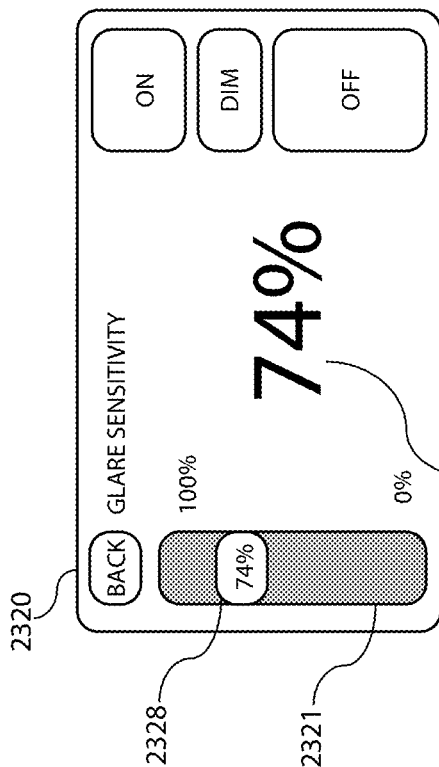
FIG. 23D

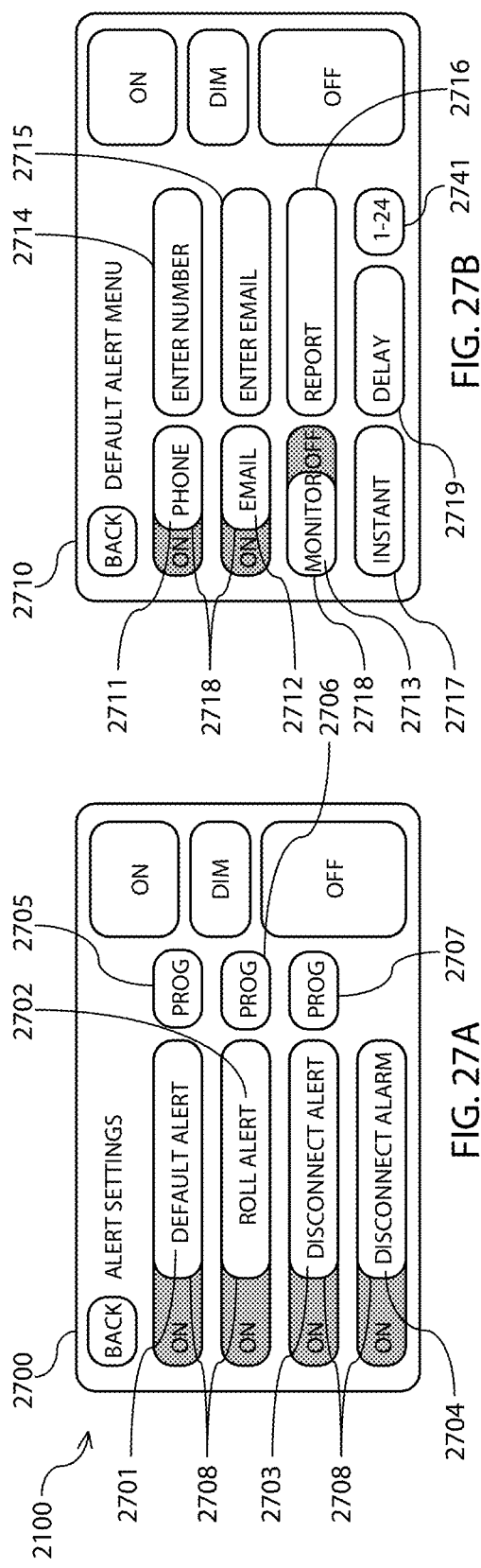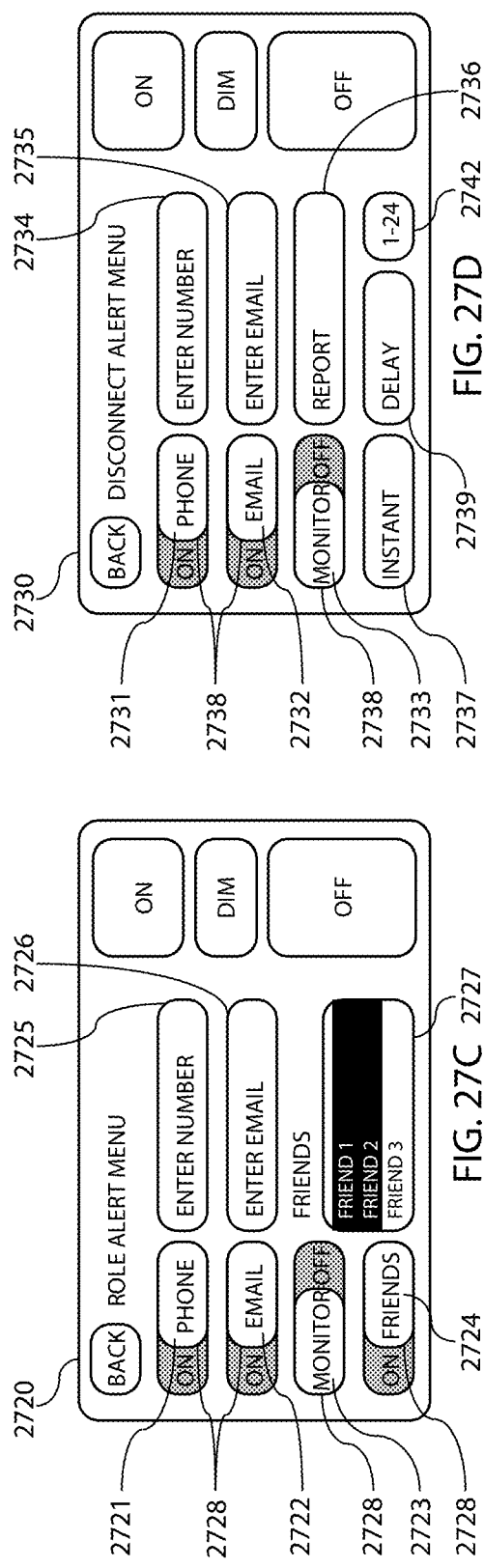

METHOD AND APPARATUS FOR VEHICULAR LIGHT FIXTURES

FIELD OF THE INVENTION

The present invention generally relates to lighting systems, and more particularly to lighting systems distributing light from a vehicle.

BACKGROUND

Light emitting diodes (LEDs) have been utilized since about the 1960s. However, for the first few decades of use, the relatively low light output and narrow range of colored illumination limited the LED utilization role to specialized applications (e.g., indicator lamps). As light output improved, LED utilization within other lighting systems, such as within LED "EXIT" signs and LED traffic signals, began to increase. Over the last several years, the white light output capacity of LEDs has more than tripled, thereby allowing the LED to become the lighting solution of choice for a wide range of lighting solutions.

For example, the off-road vehicle market has seen a broad shift toward the use of LEDs in lighting systems. Visibility during off-road operation of the off-road vehicle may be poor due to any number of environmental, vehicular, or other conditions. For example, heavy wind, rain, snow, sleet, or other precipitation or particulates in the air may reduce visibility. Further, the off-road vehicle may have limited mounting locations for lighting systems, thereby limiting the vehicle's light output. Further, an operator may have to make compromises between which lighting modules to mount within the system due to limited space, which may limit his ability to signal vehicle operations to other vehicles in the area.

In general, lighting systems are mounted to an off-road vehicle by a mounting apparatus. Further, lighting systems become increasingly heavier with the addition of more and more lighting modules. Thus, the larger the system, the greater the strain on the mounting apparatus. For example, lighting systems may frequently shift, rotate, or break off of the off-road vehicle due to failure of the mounting apparatus during operation of the off-road vehicle on uneven terrain.

Efforts continue, therefore, to develop lighting systems which maximize light output, minimize weight and use of mounting space, and enable all required and optional signaling options to be performed.

SUMMARY

To overcome limitations in the prior art, and to overcome other limitations that will become apparent upon reading and understanding the present specification, various embodiments of the present invention disclose a method and apparatus for vehicular light fixtures.

In accordance with one embodiment of the invention, a control system comprises a lighting system, a first controller coupled to the lighting system, and one or more sensors, coupled to the first controller and configured to detect one or more operating conditions, wherein upon detection of one or more operating conditions the one or more sensors send one or more signals to the controller, and wherein the controller regulates one or more modes of operation of the lighting system in response to the one or more signals.

In accordance with another embodiment of the invention, a controller configured to enable use interaction with a lighting system on a vehicle, the controller comprises a user interface configured to generate one or more signals in response to input received from a user, and a connection configured to relay the one or more signals from the user interface to the lighting system to cause the lighting system to operate in one or more modes of operation in response to operating conditions.

In accordance with another embodiment of the invention, a method of operating a lighting system comprises providing power at a first power level to a first LED such that light is emitted into a first photometric distribution, providing power at a second power level to a second LED such that light is emitted into a second photometric distribution different from the first photometric distribution, wherein the first photometric distribution combines with the second photometric distribution to form a combined beam pattern of the lighting system, and regulating power at different power levels to the first and second LEDs, such that changes in light emitted by the first and second LEDs causes a transformation of the combined beam pattern.

Other embodiments may be disclosed herein.

BRIEF DESCRIPTION OF THE DRAWINGS

Various aspects and advantages of the invention will become apparent upon review of the following detailed description and upon reference to the drawings in which:

FIG. 16A illustrates a front view of a controller for indicating a mode of operation according to another embodiment of the present invention;

FIG. 16B illustrates the controller of FIG. 16A in another mode of operation;

FIG. 16C illustrates the controller of FIG. 16A in another mode of operation;

FIG. 16D illustrates the controller of FIG. 16A in another mode of operation;

FIG. 16E illustrates the controller of FIG. 16A in another mode of operation.

FIG. 20A illustrates a plan view of a beam pattern produced by a lighting system of the present invention;

FIG. 20B illustrates a plan view of a beam pattern produced by a lighting system of the present invention;

FIG. 20C illustrates a plan view of a beam pattern produced by a lighting system of the present invention;

FIG. 20D illustrates a plan view of a beam pattern produced by a lighting system of the present invention;

FIG. 20E illustrates a plan view of a beam pattern produced by a lighting system of the present invention;

FIG. 20F illustrates a plan view of a beam pattern produced by a lighting system of the present invention;

FIG. 20G illustrates a plan view of a beam pattern produced by a lighting system of the present invention;

FIG. 20H illustrates a plan view of a beam pattern produced by a lighting system of the present invention;

FIG. 21A illustrates a diagram of a software application menu screen;

FIG. 21B illustrates a diagram of a software application menu screen;

FIG. 21C illustrates a diagram of a software application menu screen;

FIG. 21D illustrates a diagram of a software application menu screen;

FIG. 23A illustrates a diagram of a software application menu screen;

FIG. 23B illustrates a diagram of a software application menu screen;

FIG. 23C illustrates a diagram of a software application menu screen;

FIG. 23D illustrates a diagram of a software application menu screen;

FIG. 27A illustrates a diagram of a software application menu screen;

FIG. 27B illustrates a diagram of a software application menu screen;

FIG. 27C illustrates a diagram of a software application menu screen;

FIG. 27D illustrates a diagram of a software application menu screen.

DETAILED DESCRIPTION

Figure 1:
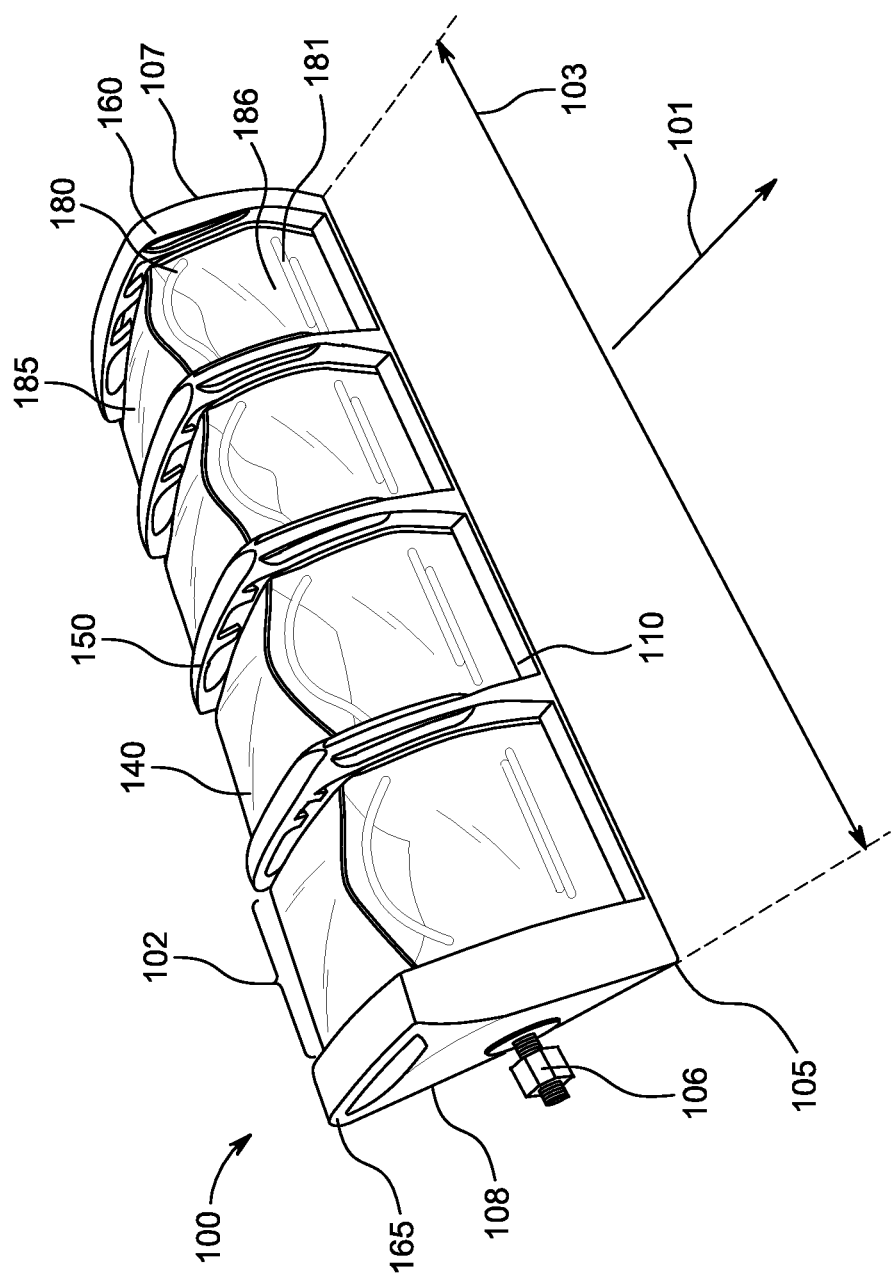
FIG. 1 illustrates an isometric view of a lighting system according to an embodiment of the present invention.

Generally, the various embodiments of the present invention are applied to a method and apparatus for controlling the distribution of light from one or more lighting devices. For example, the lighting device may be a terrain viewing apparatus, a lighting module, and/or a lighting system. Control of the lighting devices may be provided for by internally (e.g., via a printed circuit board assembly (PCBA) having control circuitry) and/or externally by a controller.

The lighting device, or lighting system may emit light directionally therefrom and may be mounted on a vehicle or other structure to emit light directionally from the vehicle and/or structure. Light may be emitted by providing power to one or more light sources configured to emit light directionally from a printed circuit board assembly (PCBA) upon which the light sources may be mounted. For example, the light sources may be light emitting diodes (LEDs). In another example, the light sources may be laser diodes (LDs). In another example, the light sources may be high intensity discharge (HID) lamps. In another example, "LED" may refer to any type of light emitting light source. The LEDs may be operable individually and/or within operational groups of LEDs (e.g., having shared functions and/or capabilities). Reflectors, lenses, and/or light pipes may subtend light emitted by the LEDs into a photometric distribution. Each reflector, lens, and/or light pipe may be paired with at least one LED, and a group of LEDs, reflectors, lenses, and light pipes may collectively form an optical set which may repeat along one or more dimensions of the lighting system (e.g., along its length).

The PCBA may control power provided to the LEDs such that the LEDs may be operable in one or more modes of operation. Each mode of operation may include providing power at similar or different power levels to any number of operational groups of LEDs (e.g., 0, 1, 2, 3, 4, 5, or more groups). Selecting, and/or scrolling through several modes of operation may have the visual effect of a variable beam pattern, or photometric distribution (e.g., shifting from a spot photometric distribution to a flood photometric distribution, or vice versa). Generally, a spot photometric distribution may be narrower than both a medial and/or a flood photometric distribution, and a medial photometric distribution may be narrower than a flood photometric distribution. Narrowness may refer to one or both of a height and a width of the photometric distribution. Further, "spot", "medial", and/or "flood" may refer to different photometric distributions of projected light (e.g., to enable a user to see environmental conditions). Alternatively, one or more of the LEDs may emit light throughout the visible spectrum, while other LEDs may emit only one wavelength of light at a time. Therefore, one or more modes of operation may enable emission of projected light (e.g., high intensity light), and one or more modes of operation may enable emission of backlight (e.g., low intensity light visible by a user, though not necessarily enabling user to see environmental conditions).

The lighting system may be formed of a modular design with repeating components along one or more dimensions (e.g., along its length). Furthermore, the lighting system may be formed with smooth contours to enable laminar flow across its body. The lighting system may be mountable to a vehicle and/or other structure with an attachment system which enable rotation and/or translation with respect to the vehicle and/or structure (e.g., pitch, yaw, roll).

The lighting system may be part of a control system which includes one or more controllers which are capable of providing signals to the lighting system. Controllers may be connected to lighting system via wired connections and/or wirelessly. Controllers may be positioned under the hood of a vehicle, in the cab of a vehicle, on an exterior of a vehicle/structure, and/or within/on the lighting system. At least one controller may have a user interface to enable a user to interact with the lighting system and/or control features, functions, and/or modes of operation of the lighting system. Further, at least one controller may include one or more sensors to sense vehicle conditions and/or environmental conditions. The controller may be capable of selecting a mode of operation of the lighting system without input from the user (e.g., in an automatic mode of operation).

A software application may be executable on one or more of the controllers (e.g., the controller having a user interface), and may enable a user to control, modify, adjust, program or otherwise customize one or more features, functions, or modes of operation of the lighting system.

FIG. 1 illustrates an isometric view of a lighting system 100 configured to emit light substantially in a first direction 101 (e.g., a forward direction). Nevertheless, light fixture 100 may emit light in a plurality of directions other than the first direction, and further may be configured to emit light substantially in a direction other than the first direction 101. For example, lighting system 100 may be configured on a vehicle (e.g., vehicle 1109 of FIG. 11) such that light is emitted substantially forwardly of the vehicle. Alternatively, lighting system 100 may be oriented to emit light in another direction (e.g., rearwardly) and/or may be capable of emitting light in a plurality of directions (e.g., forwardly and rearwardly).

Lighting system 100 may include a housing assembly 105 for containing the electrical components of lighting system 100. Housing assembly 105 may include a base 110, one or more heat sinks (e.g., heat sinks 220, 225, of FIG. 2), a media 140, one or more trusses 150, and one or more end caps 160, 165. Further, lighting system 100 may include one or more optical sets 102 configured along a width 103 of lighting system 100 to enable subtending of light therefrom. For example, four optical sets 102 may be configured along width 103 (as exemplified in FIG. 1). In another example, less than four optical sets 102 may be configured along width 103 (e.g., a single optical set). In another example, more than four optical sets 102 may be configured along width 103 (e.g., 8, 12, 16, 20, or more optical sets). A person of ordinary skill in the art will appreciate that any number of optical sets 102 may be configured along width 103.

Furthermore, width 103 may be dimensioned to optimize sizing of light fixture 100. For example, width 103 may be between about 3 inches and about 60 inches (e.g., about 10 inches, as exemplified in FIG. 1). In another example, width 103 may vary based on the number of optical sets (e.g., about 10, 20, 30, 40, or 50 inches).

Base 110 may extend from a right side 107 to a left side 108 of lighting system 100, to provide rigidity to housing assembly 105. Base 110 may be substantially planar on a top side thereof (e.g., as exemplified in FIG. 2), and may have one or more ridges (e.g., ridges 214 of FIG. 2) extending along a bottom side (e.g., bottom side 215 of FIG. 2) thereof from the right side 107 to the left side 108 (e.g., along width 103). The ridges may be appropriately sized to prevent excessive bending of housing assembly 105.

Heat sinks (e.g., heat sinks 220, 225, of FIG. 2) may be secured to the bottom side of base 110 to assist in the dissipation of heat away from base 110. Media 140 may be secured to a top side (e.g., top side 216 of FIG. 2) of base 110 to enclose and/or seal the electrical components of the system and/or optical sets 102 from moisture, particulates, and other contaminants. Further, media 140 may be configured as a single element spanning all optical sets 102 (e.g., spanning width 103), or may be configured to span fewer than all optical sets 102 (e.g., spanning only a single optical set 102).

Media 140 may be configured with switchable material (e.g., switchable glass), or may have a layer of switchable material (e.g., on the interior) to protect the electrical components from solar radiation and/or hide the electrical components from view (e.g., a black-out feature). The switchable material may be configured to switch from a transparent state to a translucent and/or opaque state upon application of voltage, light (e.g., ultraviolet light), and/or heat. For example, media 140 may be opaque and/or translucent during the day, and may switch to transparent during the night. In another example, media 140 may be opaque and/or translucent when not in use, and may switch to transparent when in use. In another example, media 140 may be opaque and/or translucent until a user causes media 140 to be transparent by interacting with a user interface (e.g., user interface 1853 of FIG. 18). In another example, media 140 may be permanently tinted, colored, or otherwise rendered to filter light passing therethrough (e.g., of a particular color). In another example, media 140 may have regions of clear, non-filtering material and/or regions of tinted, colored, or filtering material.

Media 140 may be configured with a moisture removal element to enable media 140 to remove moisture from a surface thereof. For example, a wire may be attached to a surface of and/or embedded within media 140, and an electric current may be passed through the wire to cause heating, which may remove moisture from the surface of media 140. In another example, the moisture removal element may cause media 140 to be defrosted during cold weather. In another example, the moisture removal element may cause media 140 to be decondensated during wet weather.

Media 140 may be configured with a particulate removal system to enable media 140 to be cleaned during use and/or while in a field of use. For example, the particulate removal system may enable a user to clean media 140 while lighting system 100 is in active use (e.g., with cleaning fluid and/or wipers). In another example, the particulate removal system may enable a user to stop a vehicle upon which lighting system 100 is configured, and clean media 140 before continuing operation of the vehicle (e.g., with peel off cellophane covers).

Trusses 150 may be secured to the top side of base 110, and may extend over media 140 to provide strength, structure, and/or to protect media 140 from impact with environmental conditions (e.g., tree branches). For example, each optical set 102 may be separated by a truss 150. In another example, each truss 150 may extend beyond any surface of media 140 so that any impact occurs on truss 150 rather than on media 140 (e.g., as illustrated with respect to FIG. 8). In another example, a truss 150 may be configured at each end of width 103. In another example, end caps 160, 165 may be secured to the top side and/or the right and left sides 107, 108 of base 110 to provide strength, structure, and/or to protect media 140 from impact with environmental conditions.

Figure 11:
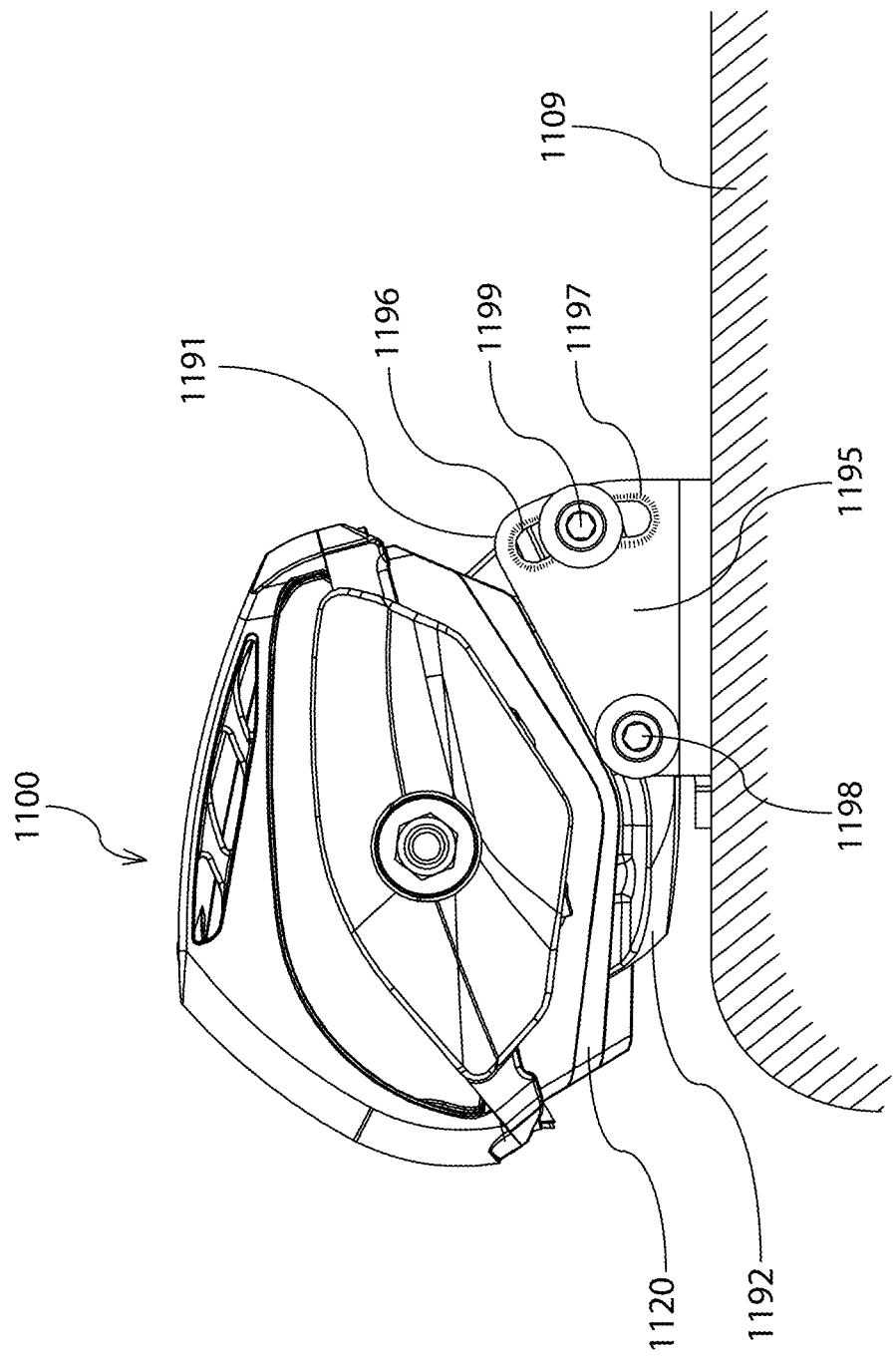
FIG. 11 illustrates a lighting system attached to another structure by an attachment system.

Lighting system 100 may have one or more attachment points 106 to enable lighting system 100 to be mounted to another structure (e.g., vehicle 1109 of FIG. 11). For example, at least one attachment point 106 may be configured at right and left sides 107, 108. In another example, one or more attachment points may be configured at discrete positions along width 103 (e.g., to base 110 and/or the heat sinks).

The electrical components of the system may include one or more printed circuit board assemblies (PCBAs) (e.g., PCBA 470 of FIG. 4) with one or more light emitting diodes (LEDs) (e.g., LEDs 471A-476A of FIG. 4) secured thereon. The optical sets may include one or more reflectors (e.g., reflectors 580, 581 of FIG. 5) for redistributing or subtending light from the LEDs, and one or more light pipes (e.g., light pipes 585, 586 of FIG. 5) for redistributing or subtending light from the LEDs. Each of the PCBAs, LEDs, reflectors, and light pipes may be sealed in a compartment formed between the top side of base 110 and media 140. For example, media 140 may be sealed against base 110 by a gasket (not shown).

Figure 6:
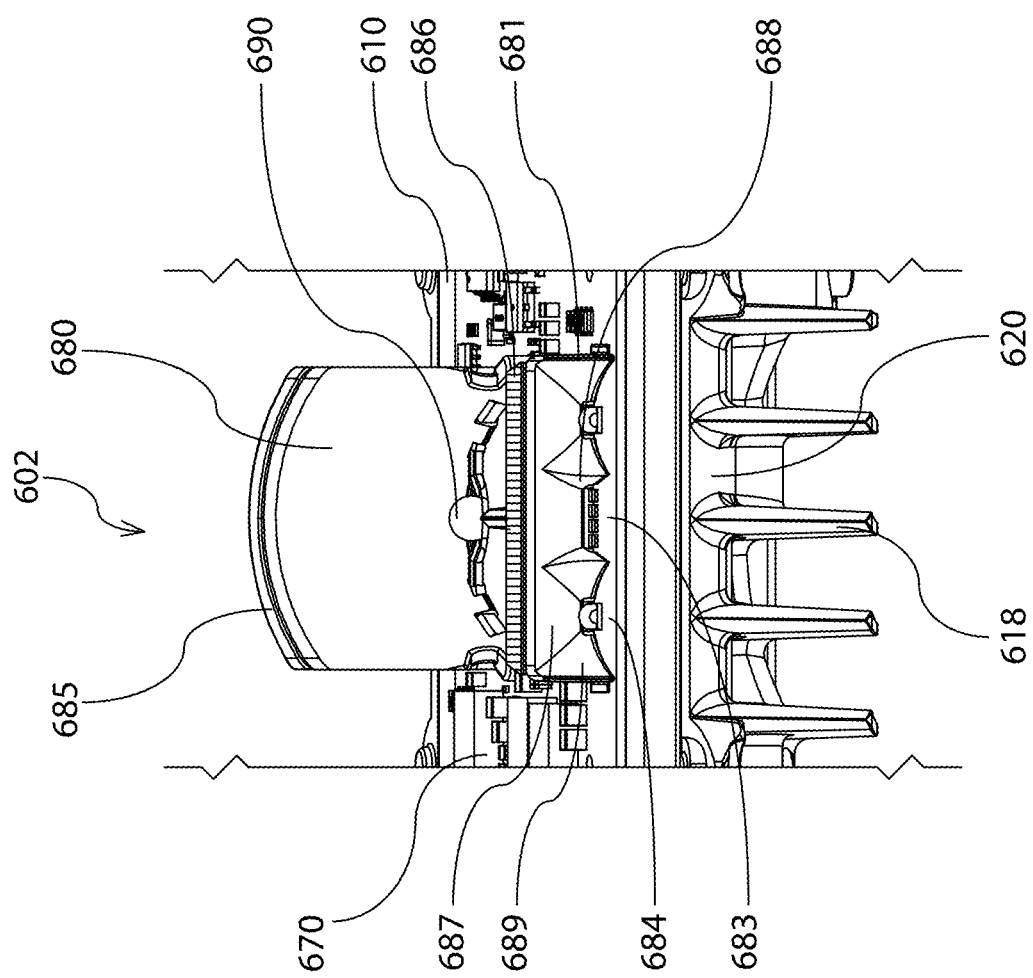
FIG. 6 illustrates a front view of a single optical set according to another embodiment of the present invention.

When lighting system 100 is mounted on a vehicle, base 110 may be horizontal, or may be inclined or declined from the horizontal (e.g., horizontal 617 of FIG. 6). For example, base 110 may be inclined between about 10 degrees and about 50 degrees from the horizontal (e.g., about 30 degrees). The PCBAs (e.g., PCBA 470 of FIG. 4) may be secured to base 110 (e.g., via fasteners), such that the LEDs may emit light substantially upwardly and/or in first direction 101. For example, the LEDs may emit light having a principal optical axis that is substantially perpendicular to the top side of base 110. In another example, the LEDs may emit light having a principal optical axis that is not perpendicular to the top side of base 110.

Figure 5:
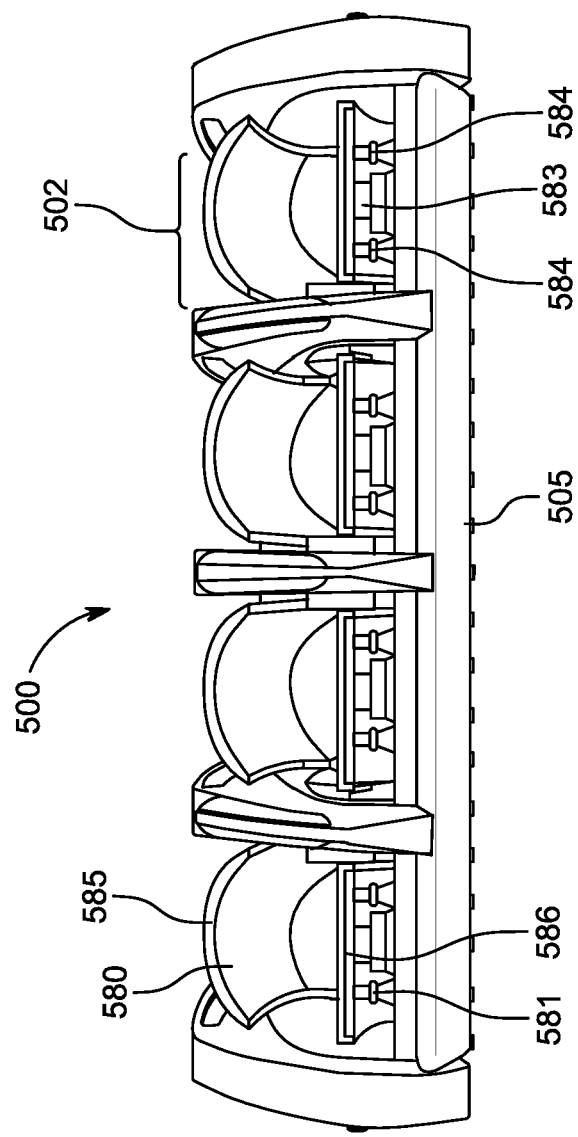
FIG. 5 illustrates a front view of the lighting lighting system of FIG. 1 with a media removed.

The reflectors and/or light pipes may be positioned over corresponding LEDs (e.g., as illustrated in FIG. 5), to redistribute or subtend light emitted from the LEDs. For example, a first reflector 180 may be positioned over a single LED to redistribute or subtend light from the single LED into a direction forward from lighting system 100 and/or in first direction 101. In another example, a second reflector 181 may be positioned over two or more LEDs to redistribute light from each LED into a direction forward from lighting system 100. In this example, the second reflector 181 may redistribute light from the two or more LEDs individually, and/or collectively. A first light pipe 185 may be positioned above the first reflector 180 to capture light emitted by one or more LEDs, and may distribute or subtend the light forwardly, rearwardly and/or in first direction 101 from lighting system 100. A second light pipe 186 may be positioned above the second reflector 181 to capture light emitted by one or more LEDs, and may distribute or subtend the light forwardly and/or in first direction 101 from lighting system 100. Each optical set 102 may include one or more reflectors and/or one or more light pipes with corresponding LEDs.

Media 140 may be formed of a material selected to optimize performance characteristics (e.g., durability, light transmissibility). For example, media 140 may be polycarbonate. Further, media 140 may be transparent, translucent, opaque, and/or may have discrete regions of transparency, translucence, and/or opaqueness. Media 140 may extend from the right side 107 to the left side 108 of lighting system 100 (e.g., spanning width 103), and may enclose all of the PCBAs, LEDs, reflectors, and light pipes in a single or in multiple compartments.

Media 140 may be shaped with aerodynamic contours to facilitate in the laminar flow of air across lighting system 100. For example, laminar air flow may be induced by environmental conditions (e.g., wind), or may be the result of movement of lighting system 100 while attached to another structure (e.g., a vehicle). Further, trusses 150 and/or end caps 160, 165 may be shaped with aerodynamic contours to facilitate in the laminar flow of air across lighting system 100. The aerodynamically shaped media 140, trusses 150, and/or end caps 160, 165 may reduce or eliminate drag and/or wind noise which may be caused by lighting system 100.

Figure 2B:
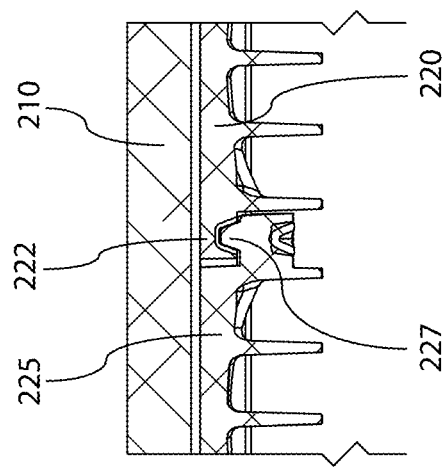
FIG. 2B illustrates a cross-sectional view of the base and heat sinks of FIG. 2A as assembled.
Figure 2A:
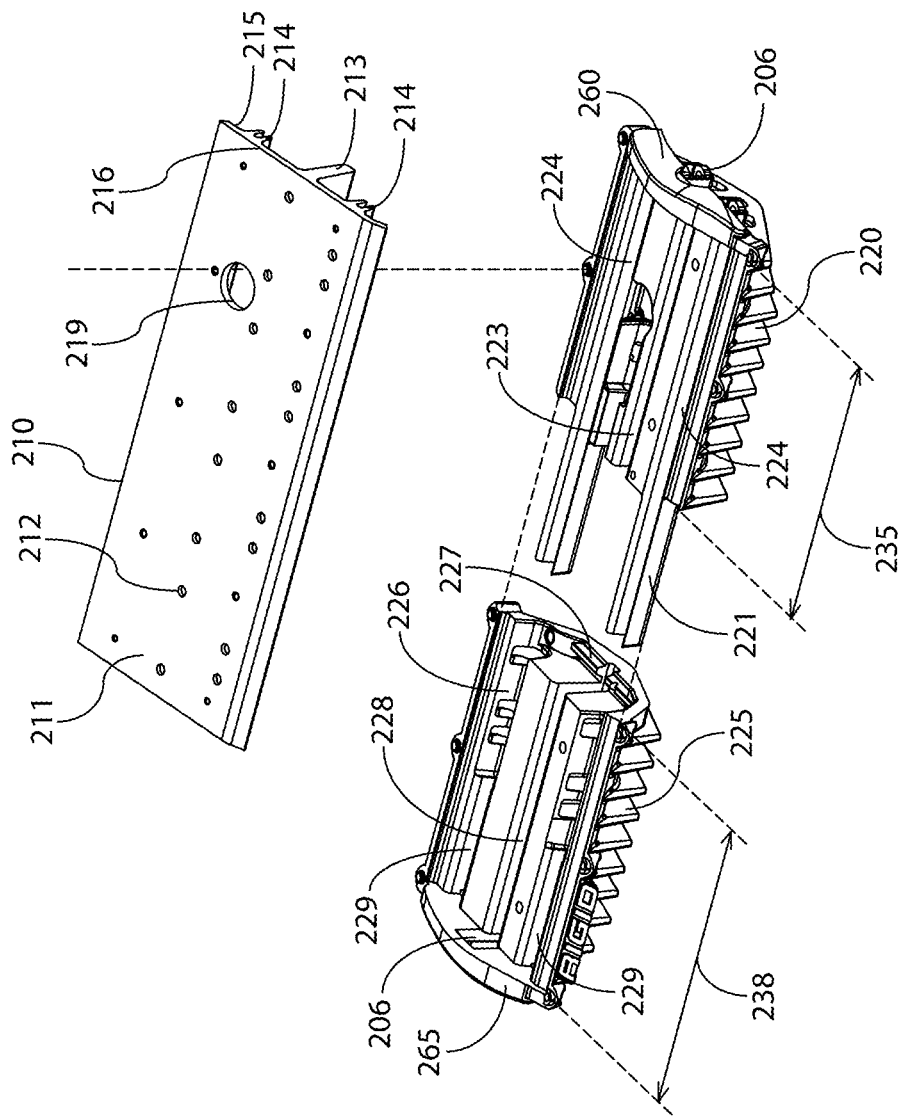
FIG. 2A illustrates an exploded view of two heat sinks for attachment with a base according to another embodiment of the present invention.

FIG. 2A illustrates an exploded view of a base 210 prior to assembly with a first heat sink 220 (e.g., a right heat sink) and a second heat sink 225 (e.g., a left heat sink) in a lighting system (e.g., lighting system 100 of FIG. 1). FIG. 2B illustrates a portion of a cross-section of the assembled components. Base 210 may include a deck portion 211 with one or more apertures 212 configured for attachment with first and second heat sinks 220, 225, and/or other components of the lighting system (e.g., PCBA 470 of FIG. 4). For example, first and second heat sinks 220, 225, and/or other components of the lighting system may be secured to deck portion 211 with one or more fasteners (e.g., bolts 751 of FIG. 7). Base 210 may further include ingress 219 to enable electrical power to be provided from a bottom side 215 to a top side 216 of deck 211 (e.g., to PCBA 470 of FIG. 4).

One or more ridges may extend from the bottom side 215 of deck 211 to reduce deflection of deck 211 during loading. For example, a first ridge 213 may extend along a width (e.g., width 103 of FIG. 1) of deck 211. In another example, a plurality of second ridges 214 may extend along the width of deck 211. In another example, first ridge 213 and/or second ridges 214 may be in alignment with apertures 212 so that the fasteners may have more material to interconnect with (e.g., enabling a stronger interconnection).

First and second heat sinks 220, 225 may be capable of interconnection before being secured to deck 211. For example, one or more projections 221 of first heat sink 220 may be configured to interconnect with one or more channels 226 of second heat sink 225. In another example, one or more tongues 222 of first heat sink 220 may be configured to interconnect with one or more grooves 227 of second heat sink 225 (e.g., as exemplified in FIG. 2B). After interconnection of first and second heat sinks 220, 225, the one or more ridges of deck 211 may be interconnected with one or more slots of first and second heat sinks 220, 225. For example, first ridge 213 may be interconnected with a first slot 223 of first heat sink 220 and/or with a first slot 228 of second heat sink 225. In another example, second ridges 214 may be interconnected with second slots 224 of first heat sink 220 and/or with second slots 229 of second heat sink 225.

Alternatively, first heat sink 220 may be secured to base 210, with first and/or second ridges 213, 214 of deck 211 interconnecting with first and/or second slots 223, 224 of first heat sink 220, respectively. Next, second heat sink 225 may be secured to base 210 and interconnected with first heat sink 220, such that first and/or second ridges 213, 214 of deck 211 interconnect with first and/or second slots 228, 229 of second heat sink 225, respectively, such that the one or more projections 221 of first heat sink 220 interconnect with the one or more channels 226 of second heat sink 225, and/or such that the one or more tongues of first heat sink 220 interconnect with the one or more grooves 227 of second heat sink 225.

First heat sink 220 may have a first width 235, and second heat sink 238 may have a second width 238. For example, first width 235 may be about equal to second width 238. In another example, each of first and second widths 235, 238 may be about half the width of base 210 (e.g., corresponding to width 103 of FIG. 1), such that interconnected first and second heat sinks 220, 225 collectively span the width of base 210. In another example, first and second widths 235, 238 may be greater than half the width of base 210, such that interconnected first and second heat sinks 220, 225 extend beyond base 210 (e.g., having end plates 260, 265 extending beyond opposing ends of the width of base 210).

End plates 260, 265 may provide rigidity to first and second heat sinks 220, 225, may facilitate enclosure of components attached to the top side 216 of deck 211, and/or may facilitate attachment of the lighting system to another structure (e.g., via opposing attachment points 206).

Figure 3:
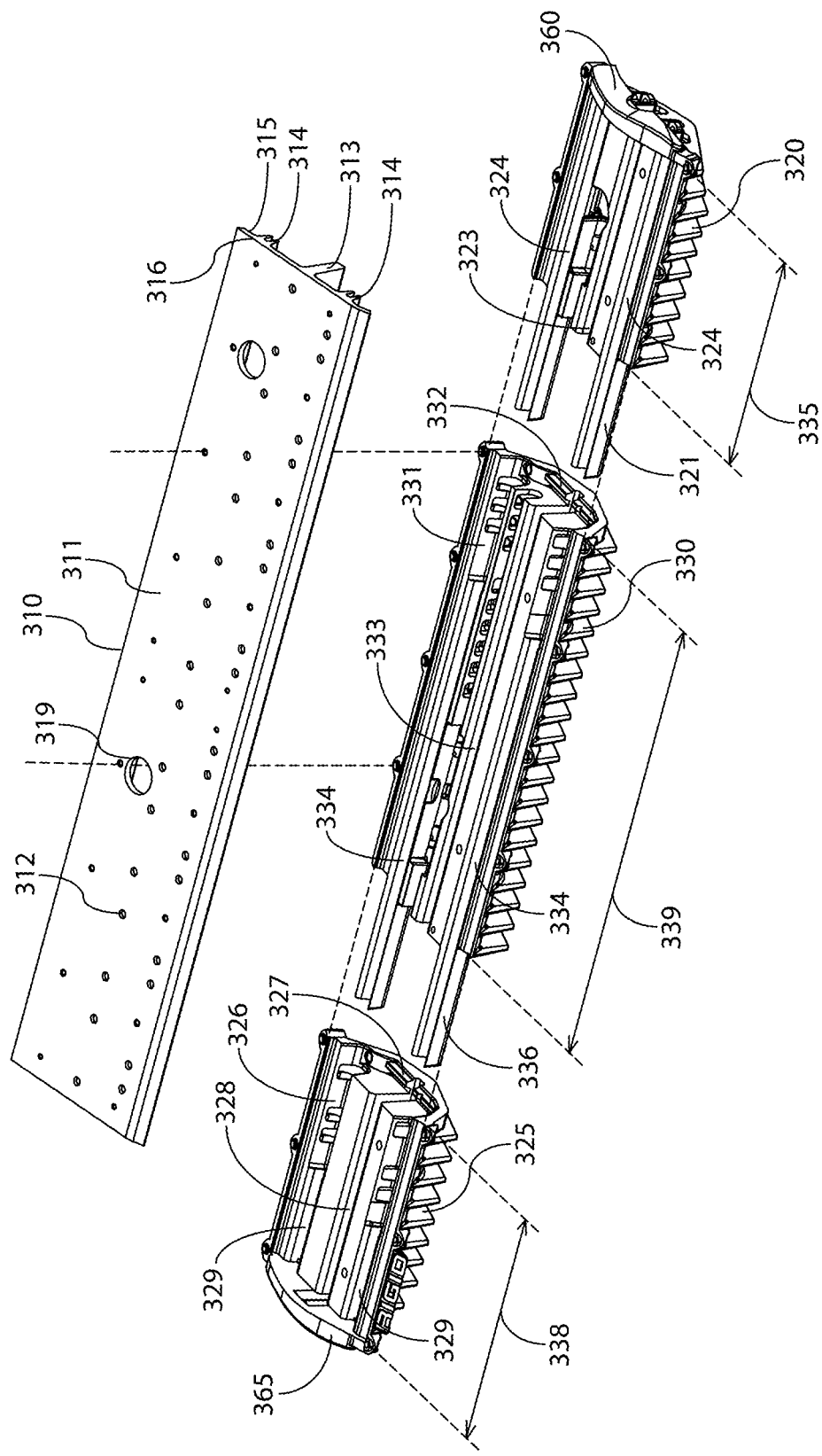
FIG. 3 illustrates an exploded view of three heat sinks for attachment with a base according to another embodiment of the present invention.

FIG. 3 illustrates an exploded view of a base 310 prior to assembly with a first heat sink 320 (e.g., a right heat sink), a second heat sink 325 (e.g., a left heat sink), and a third heat sink 330 (e.g., a center heat sink) in a lighting system (e.g., lighting system 100 of FIG. 1). Base 310 may include a deck portion 311 with one or more apertures 312 configured for attachment with first, second, and third heat sinks 320, 325, 330, and/or other components of the lighting system (e.g., PCBA 470 of FIG. 4). For example, first, second, and third heat sinks 220, 225, 230, and/or other components of the lighting system may be secured to deck portion 311 with one or more fasteners (e.g., bolts 751 of FIG. 7). Base 310 may further include a plurality of increases 319 to enable electrical power to be provided from a bottom side 315 to a top side 316 of deck 311 (e.g., to PCBA 470 of FIG. 4).

One or more ridges may extend from the bottom side 315 of deck 311 to reduce deflection of deck 311 during loading. The ridges may be increasingly helpful in preventing deflection for increasing widths of base 310 (e.g., corresponding to width 103 of FIG. 1) during loading. For example, a first ridge 313 may extend along the width of deck 311. In another example, a plurality of second ridges 314 may extend along the width of deck 311.

First, second, and third heat sinks 220, 225, 230 may be capable of interconnection before being secured to deck 211. For example, one or more projections 321 of first heat sink 320 may be configured to interconnect with one or more channels 331 of third heat sink 330 and/or one or more projections 336 of third heat sink 330 may be configured to interconnect with one or more channels 326 of second heat sink 325. In another example, one or more tongues (e.g., tongue 222 of FIG. 2B) of first heat sink 320 may be configured to interconnect with one or more grooves 332 of third heat sink 330 and/or one or more tongues (e.g., similar to tongue 222 of FIG. 2B) of third heat sink 330 may be configured to interconnect with one or more grooves 327 of second heat sink 325. After interconnection of first, second, and third heat sinks 320, 325, 330, the one or more ridges of deck 311 may be interconnected with one or more slots of first, second, and third heat sinks 320, 325, 330. For example, first ridge 313 may be interconnected with a first slot 323 of first heat sink 320, with a first slot 328 of second heat sink 325, and/or with a first slot 333 of third heat sink 330. In another example, second ridges 314 may be interconnected with second slots 324 of first heat sink 320, with second slots 329 of second heat sink 325, and/or with second slots 334 of third heat sink 330.

Alternatively, first heat sink 320 may be secured to base 310, with first and/or second ridges 313, 314 of deck 311 interconnecting with first and/or second slots 323, 324 of first heat sink 220, respectively. Next, third heat sink 330 may be secured to base 310 and interconnected with first heat sink 320, such that first and/or second ridges 313, 314 of deck 311 interconnect with first and/or second slots 333, 334 of third heat sink 330, respectively, such that the one or more projections 321 of first heat sink 320 interconnect with the one or more channels 331 of third heat sink 330, and/or such that the one or more tongues of first heat sink 320 interconnect with the one or more grooves 332 of third heat sink 330. Further, second heat sink 325 may be secured to base 310 and interconnected with second heat sink 325, such that first and/or second ridges 313, 314 of deck 311 interconnect with first and/or second slots 328, 329 of second heat sink 325, respectively, such that the one or more projections 336 of third heat sink 330 interconnect with the one or more channels 326 of second heat sink 325, and/or such that the one or more tongues of third heat sink 330 interconnect with the one or more grooves 327 of second heat sink 325.

First heat sink 320 may have a first width 335, second heat sink 238 may have a second width 338, and third head sink 330 may have a third width 339. For example, first width 335 may be about equal to second width 338. In another example, first and second widths 335, 338 may be about half of third width 339. In another example, each of first and second widths 335, 338 may be about one quarter the width of base 310, and third width 339 may be about half the width of base 310, such that interconnected first, second, and third heat sinks 320, 325, 330 collectively span the width of base 310. In another example, first and second widths 335, 338 may be greater than one quarter the width of base 310, such that interconnected first, second, and third heat sinks 320, 325, 330 cause first and second heat sinks 320, 325 to extend beyond base 310 (e.g., having end plates 360, 365 extending beyond opposing ends of the width of base 310).

The use of one or more ridges disposed in slots and/or projections disposed in channels may serve to strengthen the assembly and reduce deflection of base 10 during loading. Based on the above principles, a width of a lighting system may be incrementally increased and/or decreased to satisfy the spatial requirements of a particular application. For example, a lighting system may include a right and left heat sink (e.g., as exemplified in FIG. 2). In another example, a lighting system may include a right, a left, and a center heat sink (e.g., as exemplified in FIG. 3). In another example, a lighting system may include a right, a left, and two or more center heat sinks (e.g., three, four, five, or more center heat sinks). While third heat sink 330 (e.g., the central heat sink) has been exemplified as about twice the width of the first and/or second heat sinks 320, 325, a person of ordinary skill in the art will appreciate that additional widths may diversify the modularity of the present invention in obtaining a lighting system that is suitable for a particular application. Furthermore, a person of ordinary skill in the art will appreciate the utility and versatility in an assembly having right and left side heat sinks, with the capability of any number of heat sinks placed therebetween.

Figure 4:
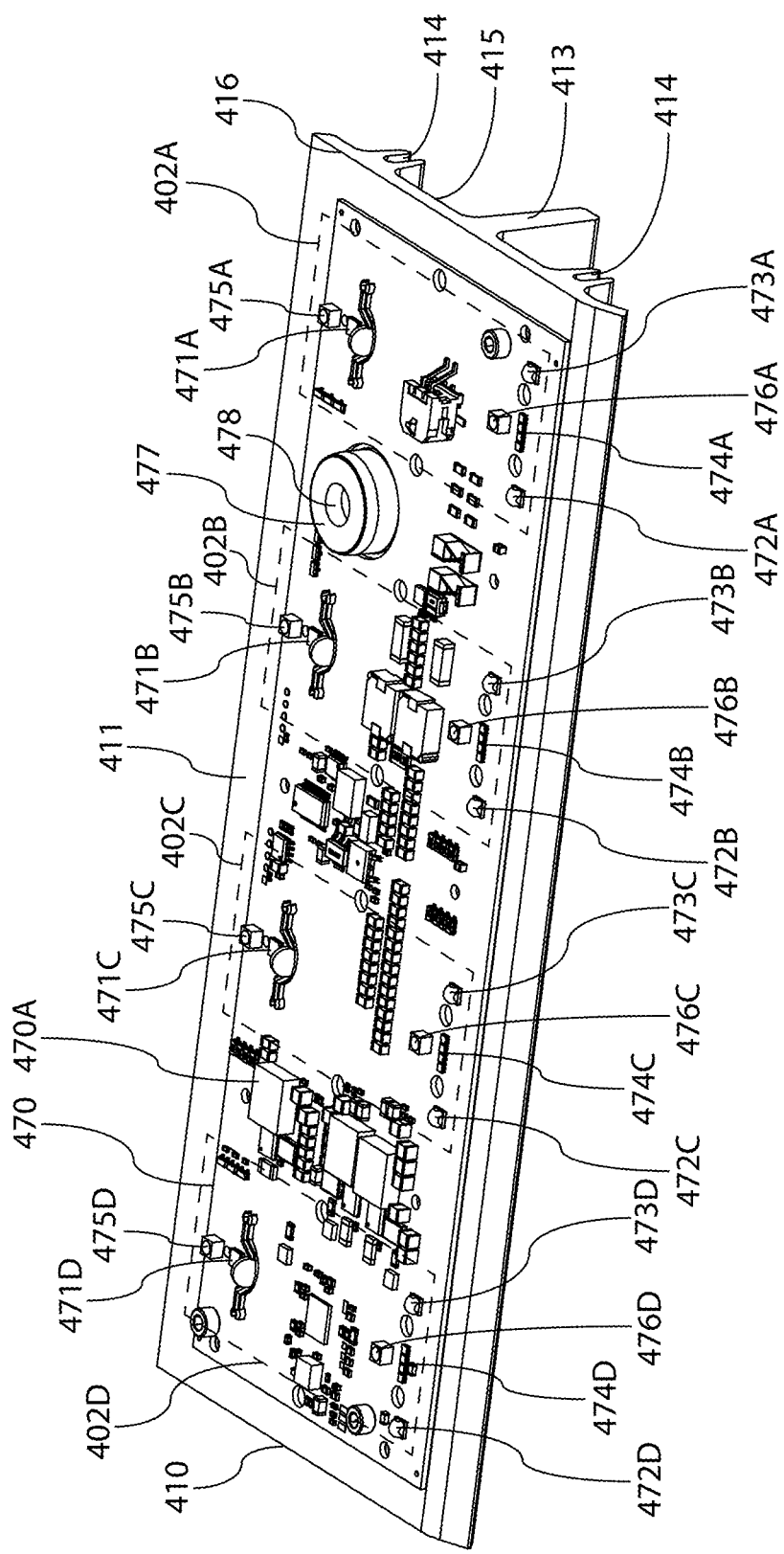
FIG. 4 illustrates an isometric view of the base of FIG. 2, with a PCBA configured on the base.

FIG. 4 illustrates an isometric view of a base 410 with a deck 411 and structural elements 413, 414 (e.g., ridges) extending from a bottom side 415 of deck 411. A PCBA 470 may be secured to a top side 416 of deck 411, and may include control circuitry for operating one or more LEDs (e.g., LEDs 471A-476A, 471B-476B, 471C-476C, 471D-476D). The control circuitry may be arranged throughout the PCBA in such a way as to not interfere with the essential configurations and functions of the LEDs. While the control circuitry will not be described in specific terms, a person of ordinary skill in the art will appreciate what control circuitry may be desirable to facilitate the operational framework of the present invention as described herein.

For illustrative purposes, the LEDs of PCBA 470 may be described in LED sets 402 (e.g., exemplified as all LEDs falling within the dotted lines of FIG. 4) which repeat along a width (e.g., width 103 of FIG. 1) of base 410. Each LED set 402 may include one or more LEDs, the same number of LEDs, and/or a different number of LEDs. For example, a first LED set 402A may include six LEDs 471A-476A. In another example, a second LED set 402B may include a similar or different number of LEDs (e.g., six LEDs 471B-476B). In another example, a third LED set 402C may include a similar or different number of LEDs (e.g., six LEDs 471C-476C). In another example, a fourth LED set 402D may include a similar or different number of LEDs (e.g., six LEDs 471D-476D). In another example, a PCBA may include between 1 and 30 repeating LED sets, each including similar or different numbers of LEDs.

Each LED may include one or more light sources and/or light sources of similar or different luminous output to optimize PCBA spacing requirements, to optimize the photometric distribution of light produced by the LEDs individually, and/or to optimize the photometric distribution of light produced by the LEDs collectively. For example, LED 471A may include a single light source with luminous output configured to enable a high intensity spot photometric distribution. In another example, LED 474A may include a plurality of light sources (e.g., four light sources as exemplified in FIG. 4) with luminous output configured to enable a high intensity flood photometric distribution. In another example, LEDs 472A and 473A may each include a single light source with luminous output configured to enable a high intensity medial photometric distribution. In another example, LEDs 475A and 476A may each include a single light source with luminous output configured to enable a low intensity flood photometric distribution. The LEDs of one or more other optical sets (e.g., optical sets 402B-402D) may be similarly or differently configured as the LEDs of optical set 402A.

Further, each LED may include light sources capable of emitting light of a particular wavelength. For example, LEDs 471A-474A may emit light having wavelengths throughout the visible spectrum (e.g., white light). In another example, LEDs 475A and 476A may emit light having any one wavelength in the visible spectrum (e.g., blue, green, red, etc.). In another example, LEDs 475A and 476A may emit light having wavelengths throughout the visible spectrum, but may be capable of emitting only one wavelength at a time (e.g., red-green-blue LEDs or RGB LEDs).

For functional purposes and to control light output from the LEDs, the LEDs of PCBA 470 may be controllable within operational groups, where LEDs from one or more of the optical sets 402 form each operational group. For example, each LED of each optical set (e.g., optical set 402) may be in an exclusive operational group (e.g., each LED on PCBA 470 may be independently operable). In another example, LEDs 471 (e.g., A, B, C, D, etc.) may be associated with a first operational group, such that the first operational group of LEDs may be controlled collectively. In another example, LEDs 472 and 473 may be associated with a second operational group, such that the second operational group of LEDs may be controlled collectively. In another example, LEDs 474 may be associated with a third operational group, such that the third operational group of LEDs may be controlled collectively. In another example, LEDs 475 and 476 may be associated with a fourth operational group, such that the fourth operational group of LEDs may be controlled collectively. A person of ordinary skill in the art will appreciate that LEDs may be organized into any number of operational groups, which groups may be programmable and controllable via a controller (e.g., controller 470A).

PCBA 470 may be capable of operating in one or more modes of operation and may be capable of providing one or more power levels to each operational group to optimize the combined photometric distribution (e.g., beam pattern 2010 of FIG. 20A) of the powered operational groups. Thus, each LED and/or operational groups of LEDs may be operable independently, interdependently, and/or collectively at one or more power levels and in one or more modes of operation. In general, each LED may be designed to be capable of a range of luminous output (e.g., between about 0% and about 100% of a maximum luminous output). Nevertheless, LEDs may be capable of exceeding the maximum luminous output up to a threshold without undergoing permanent damage (e.g., a damage threshold). Therefore, a person of ordinary skill in the art will appreciate that a plurality of modes of operation may be configured where similar or different power levels are provided to one or more operational groups.

For example, in a first mode of operation PCBA 470 may provide power at a first power level to the first operational group only (e.g., corresponding to a high intensity spot photometric distribution). The first power level may be between about 5 watts and about 24.8 watts (e.g., about 14.9 watts) for each LED in the first operational group. The first power level may cause each LED in the first operational group to produce a luminous output of between about 100% and about 150% of their maximum luminous outputs (e.g., about 125%).

In another example, in a second mode of operation PCBA 470 may provide power at a second power level to the first operational group and power at a third power level to the second operational group. The second power level may be between about 3.7 watts and about 18.7 watts (e.g., about 11.2 watts) for each LED in the first operational group. The second power level may cause each LED in the first operational group to produce a luminous output of between about 66% and about 122% of their maximum luminous outputs (e.g., about 94%). The third power level may be between about 1.0 watt and about 5.0 watts (e.g., about 3.0 watts) for each LED in the second operational group. The third power level may cause each LED in the second operational group to produce a luminous output of between about 0% and about 50% of their maximum luminous outputs (e.g., about 25%).

In another example, in a third mode of operation PCBA 470 may provide power at a fourth power level to the first operational group and power at a fifth power level to the second operational group. The fourth power level may be between about 2.5 watts and about 12.3 watts (e.g., about 7.4 watts) for each LED in the first operational group. The fourth power level may cause each LED in the first operational group to produce a luminous output of between about 33% and about 91% of their maximum luminous outputs (e.g., about 62%). The fifth power level may be between about 2.0 watts and about 9.9 watts (e.g., about 6.0 watts) for each LED in the second operational group. The fifth power level may cause each LED in the second operational group to produce a luminous output of between about 25% and about 75% of their maximum luminous outputs (e.g., about 50%).

In another example, in a fourth mode of operation PCBA 470 may provide power at a sixth power level to the first operational group and power at a seventh power level to the second operational group. The sixth power level may be between about 1.2 watts and about 6.1 watts (e.g., about 3.7 watts) for each LED in the first operational group. The sixth power level may cause each LED in the first operational group to produce a luminous output of between about 0% and about 62% of their maximum luminous outputs (e.g., about 31%). The seventh power level may be between about 3.0 watts and about 14.9 watts (e.g., about 8.9 watts) for each LED in the second operational group. The seventh power level may cause each LED in the second operational group to produce a luminous output of between about 50% and about 100% of their maximum luminous outputs (e.g., about 75%).

In another example, in a fifth mode of operation PCBA 470 may provide power at an eighth power level to the second operational group only (e.g., corresponding to a high intensity medial photometric distribution). The eighth power level may be between about 4.0 watts and about 19.8 watts (e.g., about 11.9 watts) for each LED in the second operational group. The eighth power level may cause each LED in the second operational group to produce a luminous output of between about 75% and about 125% of their maximum luminous outputs (e.g., about 100%).

In another example, in a sixth mode of operation PCBA 470 may provide power at a ninth power level to the second operational group and power at a tenth power level to the third operational group. The ninth power level may be between about 3.0 watts and about 14.9 watts (e.g., about 8.9 watts) for each LED in the second operational group. The ninth power level may cause each LED in the second operational group to produce a luminous output of between about 50% and about 100% of their maximum luminous outputs (e.g., about 75%). The tenth power level may be between about 1.3 watts and about 6.5 watts (e.g., about 3.9 watts) for each LED in the third operational group. The tenth power level may cause each LED in the third operational group to produce a luminous output of between about 0% and about 66% of their maximum luminous outputs (e.g., about 33%).

In another example, in a seventh mode of operation PCBA 470 may provide power at an eleventh power level to the second operational group and power at a twelfth power level to the third operational group. The eleventh power level may be between about 2.0 watts and about 9.9 watts (e.g., about 6.0 watts) for each LED in the second operational group. The eleventh power level may cause each LED in the second operational group to produce a luminous output of between about 25% and about 75% of their maximum luminous outputs (e.g., about 50%). The twelfth power level may be between about 2.6 watts and about 13.1 watts (e.g., about 7.9 watts) for each LED in the third operational group. The twelfth power level may cause each LED in the third operational group to produce a luminous output of between about 33% and about 100% of their maximum luminous outputs (e.g., about 66%).

In another example, in an eighth mode of operation PCBA 470 may provide power at a thirteenth power level to the second operational group and power at a fourteenth power level to the third operational group. The thirteenth power level may be between about 1.0 watts and about 5.0 watts (e.g., about 3.0 watts) for each LED in the second operational group. The thirteenth power level may cause each LED in the second operational group to produce a luminous output of between about 0% and about 50% of their maximum luminous outputs (e.g., about 25%). The fourteenth power level may be between about 4.0 watts and about 19.8 watts (e.g., about 11.9 watts) for each LED in the third operational group. The fourteenth power level may cause each LED in the third operational group to produce a luminous output of between about 66% and about 133% of their maximum luminous outputs (e.g., about 100%).

In another example, in an ninth mode of operation PCBA 470 may provide power at a fifteenth power level to the third operational group only (e.g., corresponding to a high intensity flood photometric distribution). The fifteenth power level may be between about 5.4 watts and about 26.5 watts (e.g., about 16.0 watts) for each LED in the third operational group. The fifteenth power level may cause each LED in the third operational group to produce a luminous output of between about 100% and about 150% of their maximum luminous outputs (e.g., about 125%).

In another example, in a tenth mode of operation PCBA 470 may provide power at sixteenth, seventeenth, and/or eighteenth power levels to the fourth operational group only (e.g., corresponding to low intensity flood photometric distribution). Where the fourth operational group includes RGB LEDs, the sixteenth power level may provide dedicated power to one or more red light sources of the LEDs, the seventeenth power level may provide dedicated power to one or more green light sources of the LEDs, and the eighteenth power level may provide dedicated power to one or more blue light sources of the LEDs. The sixteenth, seventeenth, and/or eighteenth power levels may be variably controlled by a controller (e.g., controller 470A, or processor 1811 of FIG. 18).

In another example, in an eleventh mode of operation PCBA 470 may operate the tenth mode of operation simultaneously with any one of the first, second, third, fourth, fifth, sixth, seventh, eighth, or ninth modes of operation. In another example, in a twelfth mode of operation PCBA 470 may prevent power from being provided to any operational group. A person of ordinary skill in the art will appreciate that additional modes of operation may be crafted which fall outside the ranges specified above. Furthermore, a person of ordinary skill in the art will appreciate that greater or fewer operational groups may be incorporated on PCBA 470, for which additional mode combinations and power level ranges may be possible. For example, PCBA 470 may receive signals from a user interface (e.g., user interface 1853 of FIG. 18) to program custom power levels of one or more operational groups for one or more additional modes of operation.

Additionally, in other modes of operation PCBA 470 may be configured to receive electrical signals from one or more sensors (e.g., directional sensor 1941-1946 of FIG. 19), and may adjust operation of the lighting system based on received electrical signals (e.g., in one or more automatic modes of operation). Thus, where the one or more sensors are configured to detect environmental conditions, vehicle speed, or any other sensed parameter, PCBA 470 may be configured to respond to sensed parameters by adjusting light output (e.g., photometric distribution) of one or more LEDs and/or one or more operational groups depending on the user selected mode of operation.

Further, one or more operational groups of LEDs of PCBA 470 may be configured to operate intermittently (e.g., strobing), to enable one or more signaling modes of operation. For example, one or more operational groups of LEDs may operate as a flashing hazard signal in one mode of operation. In another example, one or more operational groups of LEDs may operate as a flashing Morse code signal (e.g., S.O.S.) in one mode of operation. In another example, one or more operational groups of LEDs may operate as a flashing Morse code signal customized by a user in one mode of operation. In another example, one or more operational groups of LEDs and/or individual LEDs may operate as with part of a music sync feature wherein the operational groups of LEDs and/or individual LEDs strobe, flash, and/or illuminate in connecting with music provided from a music device (e.g., a radio of the vehicle, an MP3 player, a cellular phone, etc.). For example, light output (e.g., photometric distribution) may be adjusted based on tone, amplitude, wavelength, or other features of the music, which features may be detectable by a controller (e.g., controller 470A, or processor 1811 of FIG. 18).

Further, PCBA 470 may be configured to modulate and/or regulate power and/or power levels provided to one or more LEDs and/or operational groups of LEDs to produce incremental changes in light emitted by the LEDs and/or operational groups of LEDs, such that changes in light emitted by the LEDs and/or operational groups of LEDs may cause incremental changes to a beam pattern and/or photometric distribution produced thereby (e.g., as described herein). Further, the active operational groups of LEDs may operate within a specified intensity and/or within a specified wavelength. For example, within an infra-red wavelength. In another example, within an ultra-violet wavelength. In another example, having intensities that are compliant with industry and/or government regulations (e.g., SAE compliant).

Further, PCBA 470 may be configured with one or more spot LEDs and/or one or more operational groups of spot LEDs which each provide a high intensity spot photometric distribution in a different direction. For example, where the other LEDs of PCBA 470 emit light in a first direction (e.g., first direction 101 of FIG. 1), the spot LEDs and/or operational groups of spot LEDs may emit light at one or more inclines with respect to the first direction (e.g., the one or more inclines extending a vertical and/or a horizontal span). In accordance with this embodiment, each spot LED and/or operational group of spot LEDs may be operated independently or collectively to provide emitted light in a particular direction. Each particular direction may be further facilitated by a corresponding reflector positioned in proximity to each spot LED, to further subtend light emitted by each spot LED. Further, which of the spot LEDs and/or operational groups of spot LEDs are active at any given time may vary in accordance with vision tracking capabilities (e.g., vision conveying apparatus 1960 of FIG. 19). Alternatively, spot LEDs and/or operational groups of spot LEDs may be configured to change the direction or span (e.g., photometric distribution) of emitted light by a mechanical configuration, where the mechanical configuration enables discrete positioning of one or more reflectors with respect to corresponding LEDs. In this embodiment, each discrete position of the mechanical configuration may simulate the operational group in the solid-state configuration described above. A person of ordinary skill in the art will appreciate that a mechanical configuration may have increased variability, whereas a solid-state configuration will have greater durability due to having no moving parts.

Further, PCBA 470 may be configured to provide a maximum power level and/or in excess of a maximum power level (e.g., a super-bright mode of operation) to all LEDs and/or operational groups of LEDs for a predetermined period of time. For example, the predetermined period of time may be between about 0 seconds and about 20 seconds (e.g., about 6 seconds). In another example, the predetermined period of time may be selected to prevent overheating and/or melting of PCBA 470 or any of the LEDs on PCBA 470. In another example, the predetermined period of time may be selected to prevent overheating and/or melting of other components of the lighting system (e.g., reflector 580 of FIG. 5).

Further, PCBA 470 may be configured to operate based on user customized power levels, user customized operational groups, user customized color emissions, user customized light wavelengths, user customized directions, and/or with user customized intermittent power levels.

A plug 477 may extend through an aperture (e.g., ingress 219 of FIG. 2) of deck 411 to enclose and/or seal the aperture and prevent entrance of moisture and/or other contaminants. Plug 477 may include an opening 478, which may enable a cable (not shown) to extend through deck 411 to provide electrical power to PCBA 470. Plug 477 may be closely fitted with the cable to enclose and/or seal opening 478 and prevent entrance of moisture and/or other contaminants.

FIG. 5 illustrates a front view of lighting system 500, according to an embodiment of the present invention. For illustrative purposes and for clarity, a media (e.g., like media 140, of FIG. 1) has been removed. Lighting system 500 may be mounted on a vehicle (e.g., vehicle 1109 of FIG. 11) to emit light forwardly of the vehicle. A PCBA (e.g., PCBA 470 of FIG. 4), one or more LEDs (e.g., LEDs 471A-476A), one or more reflectors (e.g., reflectors 580, 581), and one or more light pipes (e.g., light pipes 585, 586) may be secured within a housing 505 of lighting system 500.

Reflector 580 may be capable of subtending light (e.g., collimating, focusing, and/or diffusing light) from one or more LEDs (e.g., LED 471A of FIG. 4) on the PCBA. For example, reflector 580 may be formed as a portion of a parabolic cup. In another example, reflector 580 may distribute light emitted by the LEDs into a beam pattern having a first intensity (e.g., a high intensity spot photometric distribution). In another example, an axis of symmetry of reflector 580 may be inclined with respect to a principal optical axis of the one or more LEDs. Further, reflector 580 may be duplicated one or more times along housing 505 (e.g., within corresponding optical sets 102 of FIG. 1). For example, four reflectors 580 may appear along housing 505. The LEDs emitting light into reflector 580 may be white LEDs.

Reflector 581 may be capable of subtending light (e.g., collimating, focusing, and/or diffusing light) from one or more LEDs (e.g., LEDs 472A-474A of FIG. 4) on the PCBA. For example, reflector 581 may be formed with at least one parabolic trough 583. In another example, reflector 581 may be formed with one or more parabolic cups 584. In another example, reflector 581 may be formed with one parabolic trough 583 and two parabolic cups 584. In another example, a reflector may be formed with three parabolic troughs. In another example, a reflector may be formed with one parabolic trough and two hybrid troughs having parabolic trough and parabolic cup surfaces (e.g., as exemplified in FIG. 6). In each of these examples, one or more LEDs may be associated with each parabolic trough and/or with each parabolic cup. For example, the parabolic trough may distribute light emitted by the LEDs into a beam pattern having a second intensity (e.g., a high intensity flood photometric distribution). In another example, the one or more parabolic cups may distribute light emitted by the LEDs into a beam pattern having a third intensity (e.g., a high intensity medial photometric distribution). The first intensity may be greater than the second and third intensities, and the third intensity may be greater than the second intensity.

Parabolic cups 584 of reflector 581 may be dimensioned to produce a beam wider than, equal to, or narrower than reflector 580. For example, the beam pattern produced by cups 584 may be wider and/or less intense than the beam pattern produced by reflector 580. Further, reflector 581 may be duplicated one or more times along housing 505. For example, four reflectors 581 may appear along housing 505. The LEDs emitting light into parabolic troughs 583 and/or parabolic cups 584 may be white LEDs.

The LEDs, reflectors, and light pipes may be organized into optical sets 502 such that each optical set 502 may be capable of light modulation between one or more beam patterns (e.g., in one or more modes of operations). For example, an optical set 502 may include at least one LED and one reflector (e.g., reflector 580) positioned above the LED. In another example, an optical set 502 may include at least one LED and one light pipe (e.g., light pipe 585) positioned above the LED. In another example, each optical set 502 may include a first reflector 580, a second reflector 581, a first light pipe 585, a second light pipe 586, and at least one LED corresponding to each reflector and each light pipe. As exemplified in FIG. 5, the lighting system 500 may have four optical sets 502.

Further, the LEDs may be organized into operational groups to enable light modulation between one or more beam patterns or photometric distributions (e.g., in one or more modes of operation). For example, a first operational group may include each LED positioned under reflectors 580 from each optical set 502. In another example, a second operational group may include LEDs positioned under parabolic cups 584 of each reflector 581 from each optical set 502. In another example, a third operational group may include each LED positioned within parabolic trough 583 of each reflector 581 from each optical set 502. In another example, a fourth operational group may include any LEDs positioned under light pipes 585, 586 from each optical set 502.

Light modulation between one or more beam patterns may be achieved in one or more modes of operation by controlling power provided to each operational group of LEDs (e.g., 10 or more modes of operation corresponding to 10 different beam patterns). For example, in a first mode of operation, a first power level may be provided to the first operational group of LEDs to produce the beam pattern of first intensity. In another example, in a second mode of operation, a second power level may be provided to the second operational group of LEDs to produce the beam pattern of second intensity. In another example, in a third mode of operation, a third power level may be provided to the third operational group of LEDs to produce the beam pattern of third intensity. In another example, a mode of operation may include providing power to the first and second operational groups to produce an intermediate beam pattern (e.g., having a photometric distribution or beam pattern sized between the beam pattern of first intensity and the beam pattern of second intensity). In another example, a mode of operation may include providing power to the first and third operational groups to produce an intermediate beam pattern (e.g., having a photometric distribution or beam pattern sized between the beam pattern of first intensity and the beam pattern of third intensity). In another example, a mode of operation may include providing power to the second and third operational groups to produce an intermediate beam pattern (e.g., having a photometric distribution or beam pattern sized between the beam pattern of second intensity and the beam pattern of third intensity). In another example, a mode of operation may include providing power to the first, second, and third operational groups to produce an intermediate beam pattern. A person of ordinary skill in the art will appreciate that more than three power levels may be utilized to produce different beam patterns, or photometric distributions, and that combining the beam patterns of each operational group may further diversify the photometric distribution produced. Thus, a photometric distribution may be designed for any lighting application.

Accent lighting may be achieved in one or more modes of operation by controlling power provided to each operational group of LEDs associated with light pipes 585, 586. For example, in an accent lighting mode of operation, power may be provided to the fourth operational group of LEDs to pass light through light pipes 585, 586. The accent lighting mode of operation may be operated independently, interdependently, and/or collectively with other modes of operation of the lighting system 500 and/or the lighting system of any embodiment of the present invention. Light subtended by light pipes 585, 586 may be visible from a position forward of the lighting system 500 (e.g., as indicated by first direction 101 of FIG. 1). Alternatively, light subtended by light pipes 585, 586 may be visible from nearly any other direction which is not collinear (e.g., inclined) with a position forward of the lighting system 500. Further, light pipes 585, 586 may be duplicated one or more times along housing 505. For example, four light pipes 585, and four light pipes 586 may appear along housing 505. The LEDs emitting light into light pipes 585, 586 may be white LEDs, may be red-green-blue (RGB) LEDs, or both.

The PCBA may be capable of providing power to each of the operational groups of LEDs at a plurality of power levels (e.g., the first power level, the second power level, and/or any number of additional power levels). An operator of the lighting system 500 may be capable of selecting the desired mode of operation, and the desired beam pattern through a remote controller (e.g., controller 1500 of FIG. 15) that interfaces with the PCBA and/or a controller integrated into the control circuitry of the PCBA (e.g., controller 470A of FIG. 4). For example, the remote controller may be a wireless controller, and may communicate with the PCB via wireless signals. For example, the wireless signals may be radio frequency (RF) signals. In another example, the wireless signals may be Bluetooth signals. Thus, the PCBA or the integrated controller may be capable of receiving commands from the remote controller at any distance within the range of the wireless signals.

FIG. 6 illustrates a single optical set 602 including base 610, a PCBA 670 configured on a top side of base 610, and one or more subtenders (e.g., first and second reflectors 680, 681 configured on PCBA 670, and/or first and second light pipes 685, 686 configured on PCBA 670). In general, these components may be included in a lighting system (e.g., lighting system 100 of FIG. 1). For example, the one or more subtenders (e.g., reflector and/or light pipe) may be configured to subtend light from one or more LEDs (e.g., LEDs 471A-476A of FIG. 4). In another example, the reflectors, light pipes, and LEDs may be arranged into one or more optical sets 602 which may repeat along a width (e.g. width 103 of FIG. 1) of the lighting system.

Reflector 681 may be capable of subtending light (e.g., collimating, focusing, and/or diffusing light) from one or more LEDs (e.g., LEDs 472A-474A) on the PCBA. Further, reflector 681 may be formed by one or more sets of surfaces (e.g., surface sets 683, 684), where each set of surfaces may be capable of subtending light from different LEDs. In addition, each set of surfaces may subtend light similarly and/or differently from one or more of the other sets of surfaces.

A first surface set 683 may be formed by one or more surfaces (e.g., surfaces 687, 688) to enable subtending of light into a high intensity flood photometric distribution. For example, surface 687 may be formed by a linear projection of a parabola along a width-wise dimension (e.g., corresponding to width 103 of FIG. 1), and may form a parabolic trough along the width-wise dimension. In another example, surface 688 may be formed by a linear projection of a parabola along a height-wise dimension (e.g., corresponding to height 804 of FIG. 8), and may form a parabolic trough along the height-wise dimension. In another example, first surface set 683 may include surface 687, and two surfaces 688 configured on opposing sides of a corresponding LED (e.g., LED 474A of FIG. 4).

A second surface set 684 may be formed by one or more surfaces (e.g., surfaces 687, 689) to enable subtending of light into a high intensity medial photometric distribution. For example, surface 687 may be formed by a linear projection of a parabola along a width-wise dimension (e.g., corresponding to width 103 of FIG. 1), and may form a parabolic trough along the width-wise dimension. In another example, surface 689 may be formed by a rotational projection of a parabola (e.g., forming a paraboloid or parabolic cup), and may extend from surface 687 to PCBA 670. In another example, second surface set 684 may include surface 687, and two surfaces 689 configured on opposing sides of a corresponding LED (e.g., LED 472A and/or LED 473A of FIG. 4).

At least one heat sink 620 may be secured to a bottom side (e.g., bottom side 415 of FIG. 4) of base 610 to enable the dissipation of heat generated by the LEDs during operation. For example, the LEDs may produce heat as a byproduct of converting electrical power into visible light. In another example, heat produced by the LEDs may be conducted away from the LEDs by PCBA 670, base 610, and/or heat sink 620. In another example, heat sink 620 may include one or more fins 618 which may increase the surface area of heat sink 620 and accelerate the dissipation of heat away from the LEDs.

Optical set 602 may be mounted on a moveable structure (e.g., vehicle 1109 of FIG. 11) to emit light away from the moveable structure. Motion of the moveable structure may cause airflow across optical set 602 and/or heat sink 620. Therefore, where the direction of airflow is anticipated, fins 618 may be configured to extend in a direction to enable airflow between each fin 618. For example, air may flow across heat sink 620 in a direction perpendicular to a width-wise dimension (e.g., width 103 of FIG. 1) of base 610 (e.g., into the page of FIG. 6). In another example, fins 618 may be configured to extend parallel to the airflow (e.g., perpendicular to the page of FIG. 6). In another example, airflow may increase the dissipation of heat by convection.

Optical set 602 may include one or more lenses 690 positioned to subtend (e.g., collimate, focus, or diffuse) light emitted by a corresponding LED. For example, lens 690 may be positioned to subtend light emitted by a first LED (e.g., LED 471A of FIG. 4). Thus, light emitted by the first LED may either be subtended by lens 690 and/or by first reflector 680. For example, light subtended by first reflector 680 may pass into a first direction (e.g., first direction 101 of FIG. 1) and light subtended by lens 690 may pass into a second direction. Second direction may be collinear, parallel to, or at an incline with respect to the first direction. Lens 690 and first reflector 680 may be positioned such that all or substantially all of the light emitted by the first LED is either subtended by lens 690, or by first reflector 680, or by both. Alternatively, first reflector 680 and/or lens 690 may be shaped to allow some portion of the light emitted by the first LED to pass beyond optical set 602 without being subtended.

Figure 7:
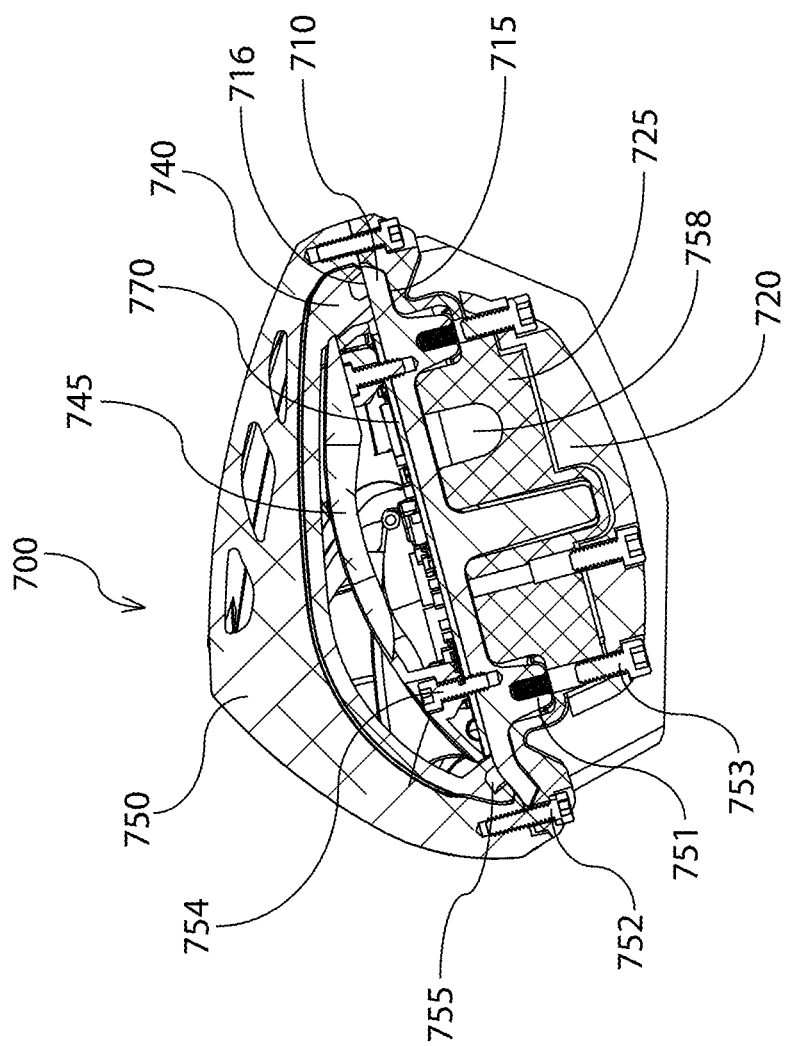
FIG. 7 illustrates a cross-sectional view of a lighting system according to another embodiment of the present invention.

FIG. 7 illustrates a cross-sectional view of a lighting system 700 through a center of a truss 750 (e.g., corresponding to truss 150 of FIG. 1). Lighting system 700 may include a base 710 with a bottom side 715 and a top side 716. One or more heat sinks (e.g., heat sinks 720, 725) may be configured on the bottom side 715 of base 710, and a PCBA 770, a media 740, a cover 745, and a truss 750 may be configured on the top side 716 of base 710.

Second heat sink 725 may be secured to base 710 directly and/or may be secured to truss 750 with base 710 configured between second heat sink 725 and truss 750 (e.g., secured to base 710 indirectly). For example, second heat sink 725 may be secured to base 710 by one or more fasteners (e.g., bolts 751). In another example, second heat sink 725 may be secured to truss 750 by one or more fasteners (e.g., bolts 752). First heat sink 720 may be secured to base 710 and/or other trusses in like manner. In addition, first heat sink 720 may be secured to second heat sink 725 to add increased stability to lighting system 700. For example, first heat sink 720 may be secured to second heat sink 725 by one or more fasteners (e.g., bolts 753) extending between first and second heat sinks 720, 725.

PCBA 770 may be configured on the top side 716 of base 710 and cover 745 may be configured over PCBA 770 with PCBA 770 configured between cover 745 and the top side 716 of base 710. This arrangement may enable cover 745 to protect PCBA 770 from solar radiation so as to prevent degradation of electronic and other components, and further may hide PCBA 770 from view. PCBA 770 and cover 745 may be secured to base 710 by one or more fasteners (e.g., bolts 754).

Media 740 may be configured on the top side 716 of base 710, and may entirely cover PCBA 770 and cover 745 to create an interior compartment. Further, media 740 may extend beyond PCBA 770 and cover 745 such that media 740 may directly contact and/or be sealed to base 710 by a sealing material 755. For example, sealing material 755 may be fasteners. In another example, media 740 may be sealed to base 710 by a gasket. In another example, sealing material 755 may be glue (e.g., silicone). In another example, securement of truss 750 to base 710 and/or one or more heat sinks (e.g., second heat sink 725) may cause truss 750 to exert a force on media 740, such that media 740 is compressed between truss 750 and base 710.

Figure 8:
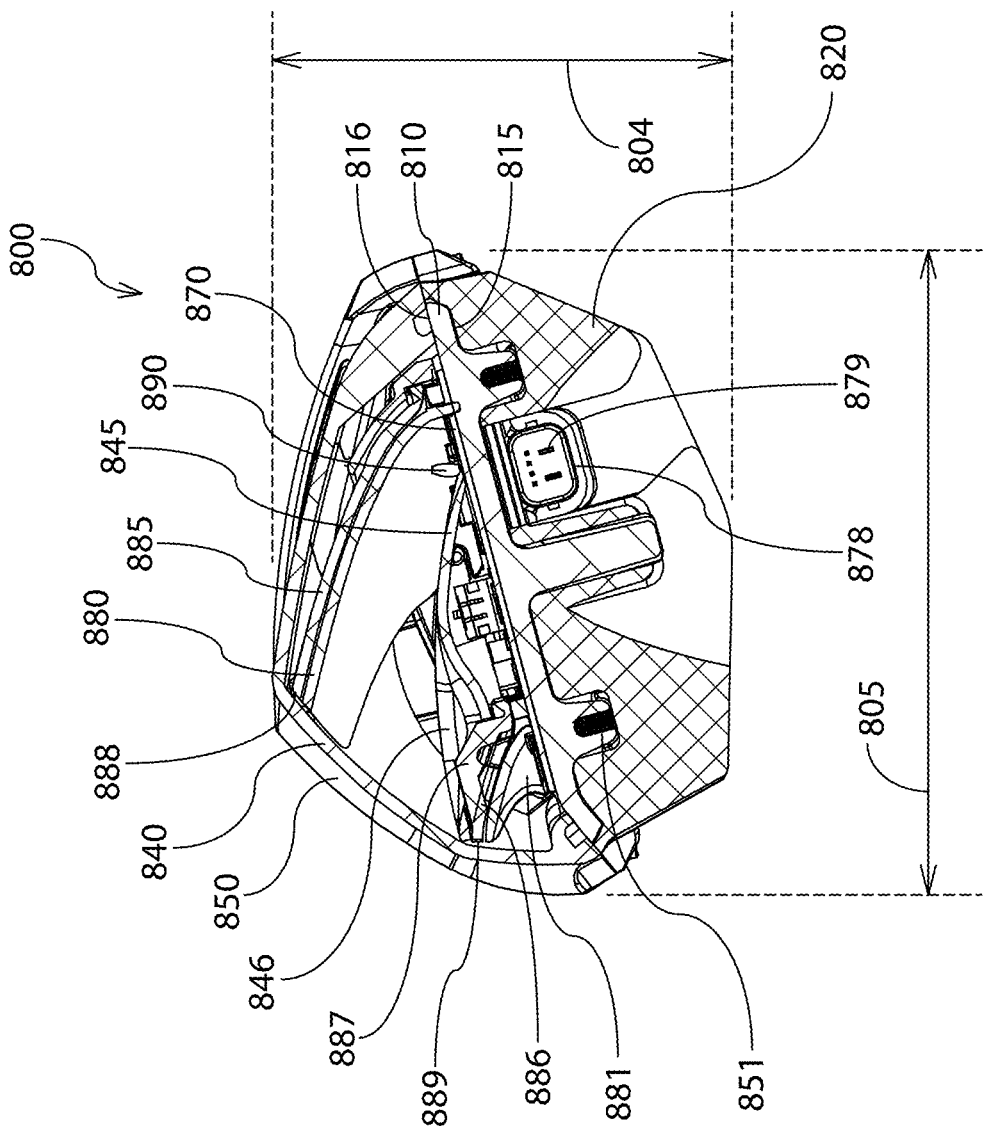
FIG. 8 illustrates a cross-sectional view of a lighting system according to another embodiment of the present invention.

A conduit (e.g., channel 758) may extend through one of more of the heat sinks (e.g., second heat sink 725 as exemplified in FIG. 7), to enable a cable segment (not shown) to interconnect with one or more electrical terminals (e.g., electrical port 878 of FIG. 8). For example, a cable segment may interconnect with a first electrical port, may extend through channel 758, and may interconnect with a second electrical port. In another example, a cable segment may extend from a battery of a vehicle (e.g., vehicle 1109 of FIG. 11), and may extend through 758 to interconnect with an electrical port.

FIG. 8 illustrates a cross-sectional view of a lighting system 800 through a center of an optical set (e.g., optical set 102 of FIG. 1) and/or between a midpoint of two trusses (e.g., trusses 150 of FIG. 1). Lighting system 800 may include a base 810 with a bottom side 815 and a top side 816. One or more heat sinks (e.g., heat sink 820) may be configured on the bottom side 815 of base 810, and a PCBA 870, one or more reflectors (e.g., reflectors 880, 881), one or more light pipes (e.g., light pipes 885, 886), a lens 890, a media 840, a cover 845, and a truss 850 may be configured on the top side 816 of base 810.

First heat sink 820 may be secured to base 810 by one or more fasteners (e.g., bolts 851). Additional heat sinks may be secured to base 810 in like manner. In addition, first heat sink 820 may be secured to the additional heat sinks by one or more fasteners (e.g., bolts 753 of FIG. 7). PCBA 870 may be configured on the top side 816 of base 810 with reflectors 880, 881, light pipes 885, 886, lens 890, and cover 845 configured over PCBA 870. This arrangement may enable cover 845 to protect PCBA 870 from solar radiation, and further may enable reflectors 880, 881, light pipes 885, 886, lens 890, and cover 845 to control light emissions from one or more LEDs (e.g., LEDs 471A-476A) corresponding to each of the reflectors and light pipes.

For example, light emitted by one or more LEDs (e.g., LED 471A) may by subtended by reflector 880, may be subtended by lens 890, may be subtended by cover 845, and/or may pass from lighting system 800 without being subtended. In another example, light emitted by one or more LEDs (e.g., LEDs 472A-474A) may be subtended by reflector 881 and/or may pass from lighting system 800 without being subtended. In another example, light emitted by one or more LEDs (e.g., LED 475A) may be subtended by light pipe 885, may be subtended by reflector 880, and/or may be subtended by cover 845. In another example, light emitted by one or more LEDs (e.g., LED 476A) may be subtended by light pipe 886, may be subtended by reflector 881, and/or may be subtended by cover 845.

The cross-section of reflector 880 may be parabolic (as exemplified in FIG. 8) to cause light to be subtended (e.g., collimated) into a high intensity spot photometric distribution (e.g., beam 2010 of FIG. 20A). Further, reflector 880 may have a high reflectivity, such as between about 0.5 and about 1.0 (e.g., about 0.93), to optimize the subtended light. Lens 890 may be appropriately shaped (e.g., with concavities and/or convexities) to cause light to be subtended (e.g., collimated) into a high intensity spot photometric distribution. The high intensity spot photometric distribution of reflector 880 may extend collinearly, parallel to, or at an incline with respect to the high intensity spot photometric distribution of lens 890. Lens 890 may be transparent, translucent, opaque, and/or may have regions of transparency, translucence, and/or opaqueness to optimize the subtended light.

The cross-section of reflector 881 may be parabolic (as exemplified in FIG. 8) to cause light to be subtended (e.g., focused) into a high intensity flood and/or medial photometric distribution (e.g., beams 2050, 2080 of FIGS. 20E, 20H). Further, reflector 881 may have a high reflectivity, such as between about 0.5 and about 1.0 (e.g., about 0.93), to optimize the subtended light.

Light pipe 885 may substantially imitate the shape of reflector 880, and may cause light to be subtended (e.g., diffused) into a low intensity flood photometric distribution. For example, light may be emitted by a corresponding LED (e.g., LED 475A), may pass into light pipe 885, may be transported through light pipe 885, and may exit light pipe 885 at a forward tip. In another example, light transported through light pipe 885 may exit light pipe 885 at any position along its body (e.g., to create a backlighting effect or accent lighting viewable from any position around the lighting system 800). Light pipe 885 may be transparent, translucent, may have portions of transparency and/or translucence, and may have transparent surface characteristics and/or translucent surface characteristics. Accordingly, light pipe 885 may subtend light through a forward edge 888 and/or through any other surface thereof.

Light pipe 886 may substantially imitate the shape of reflector 881, and may cause light to be subtended (e.g., diffused) into a low intensity flood photometric distribution. For example, light may be emitted by a corresponding LED (e.g., LED 476A), may pass into light pipe 886, may be transported through light pipe 886, and may exit light pipe 886 at a forward tip. In another example, light transported through light pipe 886 may exit light pipe 886 at any position along its body (e.g., to create a backlighting effect or accent lighting viewable from any position around the lighting system 800). Further, light pipe 886 may be configured with a tongue 887 which extends through cover 845, which may provide subtended light (e.g., diffused light) through cover 845 and onto cover 845 (e.g., onto a dimpled region 846 of cover 845) and/or onto reflector 880. Light pipe 886 may be transparent, translucent, may have portions of transparency and/or translucence, and may have transparent surface characteristics and/or translucent surface characteristics. Accordingly, light pipe 885 may subtend light through a forward edge 889 and/or through tongue 887.

Media 840 may be configured on the top side 816 of base 810, and may entirely cover PCBA 870, reflectors 880, 881, light pipes 885, 886, and cover 845 to create an interior compartment where these components may be protected from moisture and/or other contaminants. Truss 850 may extend over media 840, and may extend beyond media 840 to protect media from impact with environmental conditions (e.g., truss 850 is exemplified as extending forwardly of media 840 in FIG. 8).

A plug (e.g., plug 477 of FIG. 4) may extend through an aperture (e.g., ingress 219 of FIG. 2) of base 810 to enclose and/or seal the aperture and prevent entrance of moisture and/or other contaminants into the interior compartment formed by media 840. For example, the plug may include an electrical terminal (e.g., electrical port 878 with one or more electrical leads 879), which may enable a cord (not shown) to provide power and/or control signals to PCBA 870 via a cable extending from leads 879, through the plug, to PCBA 870. In another example, the plug may include an electrical port on opposing sides of the plug (e.g., electrical port 878, and an electrical port facing oppositely of electrical port 878), such that a first cord may provide power to electrical port 878, and a second cord may provide power from an opposing electrical port of the electrical terminal to another electrical terminal (e.g., providing power to another lighting system).

In general, lighting system 800 may be described as having a height 804 and a depth 805, which may be optimized to induce laminar airflow across lighting system 800. For example, height 804 may be of a smaller dimension that depth 805. In another example, height 804 may be between about 1.0 inches and about 10.0 inches (e.g., about 3.6 inches). In another example, depth 805 may be between about 1.0 inches and about 15.0 inches (e.g., about 5 inches). In addition, the precise shapes and contours of heat sink 820, media 840, and truss 850 may be formed to further induce laminar flow. For example, the cross-sectional shape of lighting system 800 may be streamlined, may be substantially tear-drop shaped, and/or may not have any sharp corners.

Figure 9:
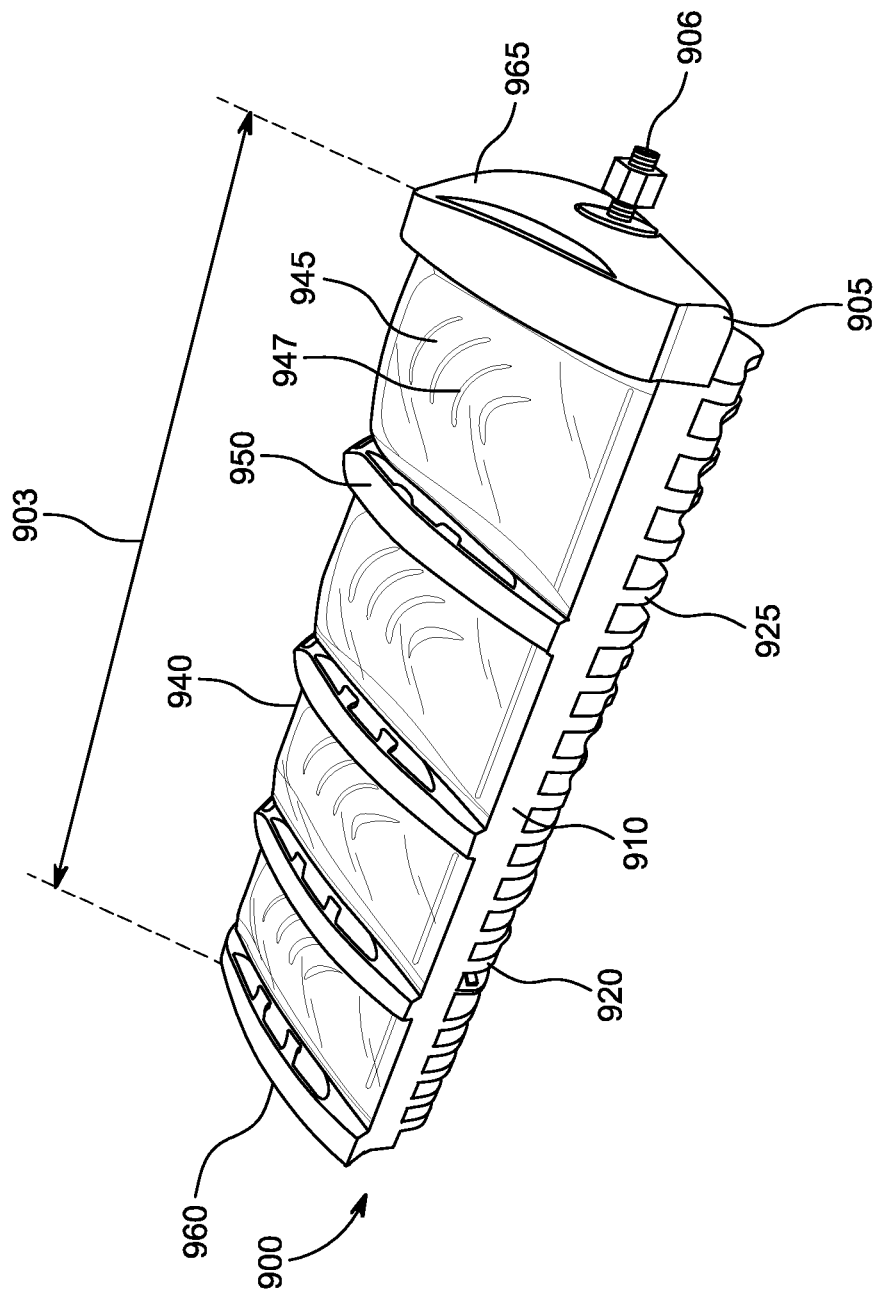
FIG. 9 illustrates an isometric view of a lighting system according to another embodiment of the present invention.

FIG. 9 illustrates an isometric view of a lighting system 900, according to an embodiment of the present invention. Lighting system 900 may be mounted on a vehicle (e.g., vehicle 1109 of FIG. 11) and may be used for dawn, dusk, night-time, and/or adverse weather conditions (e.g., rain). The lighting system 900 may be secured to the vehicle by one or more brackets (e.g., attachment system 1191) extending from the vehicle to the lighting system 900. The brackets may be secured to a housing 905 of lighting system 900. For example, the brackets may be secured by fasteners 906. In another example, the brackets may be secured to a base (e.g., base 410 of FIG. 4) of housing 905 (e.g. at right and left sides 107, 107 of base housing 105 of FIG. 1). In another example, the brackets may be secured to one or more heat sinks 920, 925 of housing 905 (e.g. at a rearward surface of heat sinks 920, 925). In another example, the brackets may be secured to one or more end caps 960, 965 of housing 905.

Housing 905 may be constructed of modular components and may be capable of being assembled to be any length (e.g., as described with reference to FIG. 2). The modular design may include base 905 having a width corresponding to a desired dimension of the lighting system 900. For example, lighting system 900 having a width 903, and/or may have a base 910 having a width substantially similar to width 903. The base may be formed of a material selected to optimize performance characteristics (e.g., strength, resistance to deflection). For example, the base may be formed of metal (e.g., aluminum), plastic (e.g., Lexan resin), composite material (e.g., glass-filled nylon), and/or any combination thereof.

Further, the base may be formed by extrusion. If a longer lighting system is desired, the base may be formed in a longer length. Similarly, the base may be formed in a shorter length as desired. For example, the base may be formed in standard lengths divisible by width 903 (e.g., width 903, two times width 903, three times width 903, four times width 903, five times width 903, and greater). For example, width 903 may be a predetermined distance, such as about 10 inches, and the base may be formed in standard lengths divisible by about 10 inches (e.g., about 10 inches, 20 inches, 30 inches, 40 inches, 50 inches, and greater).

Heat sinks 920, 925 may be secured to a bottom side of the base. Further, heat sink 920 may be a right side heat sink, and heat sink 925 may be a left side heat sink. Heat sink 920 may interconnect with heat sink 925. For example, the interconnection may be any one or more of a tongue and groove arrangement, a dovetail arrangement, a mortise arrangement, a male-female arrangement, or any other interconnecting arrangement. Thus, when interconnected, heat sinks 920, 925 may collectively extend about width 903.

If a longer lighting system is desired, heat sink 920 may remain at a right side (e.g., right side 107 of FIG. 1) of the base, and heat sink 925 may remain at a left side (e.g., left side 108 of FIG. 1) of the base. An intermediate heat sink (e.g., third heat sink 330 of FIG. 3) may span the dimension between heat sink 920 and heat sink 925. The right side of the intermediate heat sink may interconnect with the left side of heat sink 920, and the left side of the intermediate heat sink may interconnect with the right side of heat sink 925. Each incremental increase in the width of the base may result in the addition of another intermediate heat sink. For example, a base having a width three times width 103 may include a right side heat sink (e.g., heat sink 920), a left side heat sink (e.g., heat sink 925), and two intermediate heat sinks (e.g., two of third heat sink 330).

At least one PCBA (e.g., PCBA 470 of FIG. 4) and one or more LED sets (e.g., LED set 471A-476A of FIG. 4), reflectors (e.g., reflectors 880, 881 of FIG. 8), and light pipes (e.g., light pipes 885, 886 of FIG. 8) may be secured to the base within width 903. For example, four LED sets, reflectors, and light pipes may be secured to the base within width 903 (e.g., an optical set). A Media 940 may enclose and/or seal the PCBA, LEDs, reflectors, and light pipes within a single electronics compartment. A cable connector (e.g., plug 477 of FIG. 4) may extend through an aperture (e.g., ingress 219 of FIG. 2) in the base (e.g., base 210 of FIG. 4) to provide power to the PCBA and/or LEDs. The aperture may be sealed around the cable connector (e.g., via a gasket).

If a longer lighting system is desired, the electronics compartment may be duplicated for each incremental increase in width. For example, a width four times width 903 may include four electronics compartments, where each compartment has the electronic components described with respect to FIG. 9 (e.g., each enclosed by a media 940). Media 940 may be configured with right and left side interconnections (e.g., tongue 1048 and/or groove 1049 of FIG. 10C) and may be capable of interconnection with adjacent medias for lighting systems having a width two times width 903 or greater.

Further, each electronics compartment may have its own aperture (e.g., corresponding to ingress 219 of FIG. 2) for receiving a cable connector to provide power to the PCBA and/or LEDs within each compartment, and each aperture may be sealed to the corresponding cable connector (e.g., via a gasket). A conduit (e.g., channel 758 of FIG. 7) extending through the base, heat sinks 920, 925 (as exemplified in FIG. 7), and/or one or more intermediate heat sinks, may enable a cable segment to pass from one cable connector to the cable connector of the next adjacent electronics compartment. For example, a 5× lighting system of width five times width 903 may have at least four cable segments to electrically connect cable connectors (e.g., five cable connectors)

of each of the five electronics compartments. A power cord may be electrically connected to either a right-most or a left-most cable connector of the lighting system 900 or of any differently sized lighting system. The power cord may extend from lighting system 900 to a power source (e.g., a battery of the vehicle).

One or more trusses 950 may extend over media 940 to strengthen and protect media 940. For example, one truss 950 may extend over media 940 between each set of LEDs, reflectors, and light pipes (e.g., between each optical set). For example, in a lighting system 900 having four sets of LEDs, reflectors, and light pipes (e.g., 4 optical sets as exemplified in FIG. 9), three trusses 950 may extend over a media 940, and may create a visual separation between each of the optical sets. If a longer lighting system is desired, trusses 950 may extend over media 940 between each set of LEDs, reflectors, and light pipes (e.g, between each optical set). In addition, a truss 950 may extend over a space between two adjacent medias 940. Alternatively, a truss 950 may extend over the interconnection of two adjacent medias 940 (e.g., as illustrated with regard to FIG. 10B, 10C).

End caps 960, 965 may be located at right and left ends of lighting system 900, and may extend over right and left ends of media 940 to strengthen and protect media 940. Alternatively, trusses 950 may extend over right and left ends of media 940, and end caps 960, 965 may be secured to the outer right and left ends of these trusses 950, to outer right and left ends of the base, and/or to outer ends of one or more heat sinks. For example, the trusses 950 may strengthen and protect media 940, and the end caps (not shown) may create a finished appearance for the lighting system, or may enable securement of the lighting system 100 to another structural element (e.g., a vehicle).

If a longer lighting system is desired, one or both of the above end cap configurations may be used at the outermost right and left ends of the outermost media 940. Thus, the modular assembly reduces the number of overall hardware and components by incorporating components that repeat over the width of a lighting system of any size. The reduction in overall hardware and components may also reduce assembly time and manufacturing costs.

A cover 945 may be configured in the electronics compartment in a covering relationship with respect to the PCBA, the reflectors, and/or the light pipes (e.g., as exemplified in FIG. 9). The cover 945 may have one or more surface characteristics (e.g., slots 947) extending therein to enable light subtended through the light pipes to be visible on and/or through cover 945. For example, the surface characteristics may be in the form of contours, surface qualities, apertures, transparent regions, translucent regions, and so forth. While slots 947 are illustrated as crescent shaped, a person of ordinary skill in the art will appreciate that the surface characteristics may take on any shape, and may be customized by a user of the lighting system 900 to accommodate the user's style and/or preference.

Figures 10A, 10B, 10C:
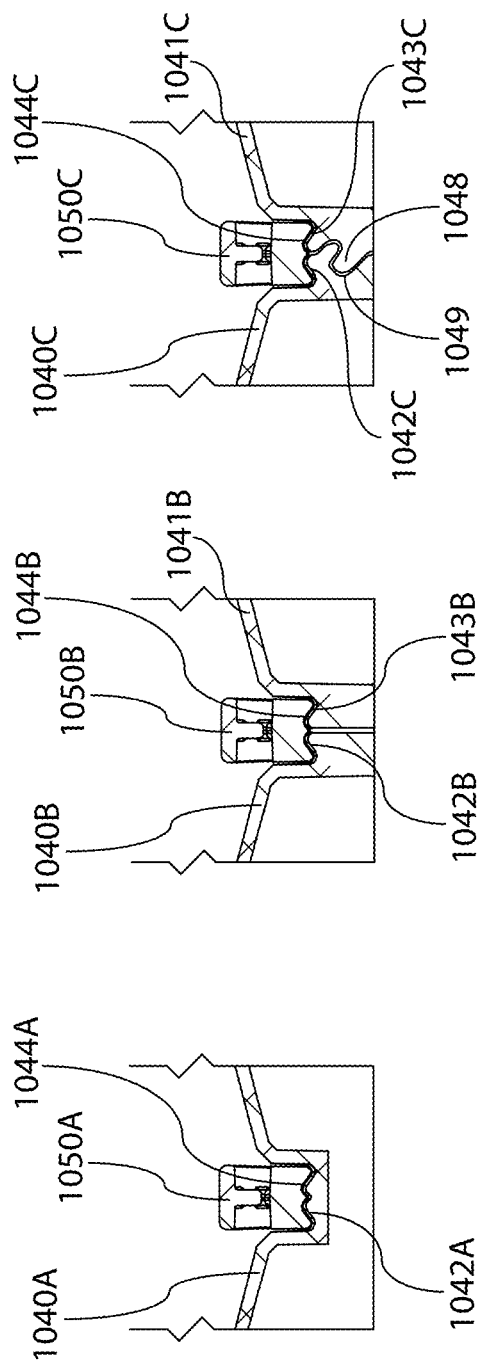
FIG. 10A illustrates a cross-sectional view of a truss configured over a media according to another embodiment of the present invention.
FIG. 10B illustrates a cross-sectional view of a truss configured over two medias according to another embodiment of the present invention.
FIG. 10C illustrates a cross-sectional view of a truss configured over two interconnected medias according to another embodiment of the present invention.

FIGS. 10A, 10B, and 10C illustrate cross-sectional views of a truss configured over one or more medias. A lighting system (e.g., lighting system 100 of FIG. 1) may have one or more trusses (e.g., truss 1050A) configured at a discrete position along a width (e.g., width 103 of FIG. 1) of the lighting system. For example, a truss 1050A may be configured over a media 1040A between two adjacent optical sets (e.g., as exemplified in FIG. 10A). Further, truss 1050A may have a profile 1044A which matches a corresponding profile 1042A of media 1040A to facilitate in alignment of truss 1050A with media 1040A. Truss 1050A may abut with media 1040A, may interconnect with media 1040A, and/or may apply a compressive force against media 1040A when truss 1050A is configured over media 1040A.

In another example, a truss 1050B may be configured over a first media 1040B, and may further be configured over a second media 1041B, such that truss 1050B may extend between adjacent optical sets of first and second medias 1040B, 1041B (e.g., as exemplified in FIG. 10B). Further, truss 1050B may have a profile 1044B, a portion of which may match a corresponding profile 1042B of media 1040B, and a portion of which may match a corresponding profile 1043B of media 1041B to facilitate in alignment of truss 1050B with first and second medias 1040B, 1041B. Truss 1050B may abut with first and second medias 1040B, 1041B, may interconnect with first and second medias 1040B, 1041B, and/or may apply a compressive force against first and second medias 1040B, 1041B when truss 1050B is configured over first and second medias 1040B, 1041B.

In another example, a truss 1050C may be configured over a first media 1040C, and may further be configured over a second media 1041C (e.g., as described with reference to FIG. 10B). First media 1040C may include a groove 1049 which may be configured to interconnect with a tongue 1048 of second media 1041C. Thus, first and second medias 1040C, 1041C may interconnect, and truss 1050C may interconnect with each media (e.g., each having a mating profile 1044C, 1042C, 1043C).

FIG. 11 illustrates a lighting system 1100 attached to a structure (e.g., a vehicle 1109) by a connecting means (e.g., attachment system 1191) to enable stable and/or adjustable securement to the structure. Attachment system 1191 may include a first member 1192 configured to be secured to lighting system 1100. For example, first member 1192 may be secured to a housing (e.g., to housing 105 of FIG. 1). In another example, first member 1196 may be secured to a base (e.g., base 410 of FIG. 4). In another example, first member 1196 may be secure to a heat sink (e.g., heat sink 1120 of FIG. 11).

Attachment system 1191 may include a second member 1195 configured to be secured to vehicle 1109. Further, first member 1192 may be interconnected with second member 1195 in order to secure lighting system 1100 to vehicle 1109. For example, first member 1192 may be interconnected with second member 1195 by one or more fasteners (e.g., bolts 1198, 1199). In another example, a first bolt 1198 may secure first and second members 1192, 1195, such that bolt 1198 may serve as an axis of pivot to enable lighting system 1100 to rotate with respect to vehicle 1109 about bolt 1198.

In another example, a second bolt 1199 may secure first and second members 1192, 1195, such that bolt 1199 may serve to prevent rotation of lighting system 1100 with respect to vehicle 1109 about bolt 1198. In another example, second bolt 1199 may extend through a slot 1196 of second member 1195, such that second bolt 1199 may translate within slot 1196 when it is not sufficiently secured to first member 1192. Translation of bolt 1199 within slot 1196 may enable lighting system 1100 to be adjusted to a desired pitch or incline with respect to vehicle 1109 (e.g., via rotation about bolt 1198), such that the photometric distribution of light from lighting system 1100 may be aimed in a desired direction. Further, once the desired direction is obtained, bolt 1199 may be tightened, or otherwise fixed to stop rotation of lighting system 1100 with respect to vehicle 1109.

First and second members 1192, 1195 may be further prevented from rotating with respect to each other by including one or more surface characteristics 1197 on one or both of first and second members 1192, 1195. For example, one or both of first and second members 1192, 1195 may have high friction surfaces to prevent sliding with respect to each other. In another example, one or both of first and second members 1192, 1195 may have complementing geometries to enable positional locking between first and second members 1192, 1195. In another example, surface characteristics 1197 may extend from a surface of second member 1195 around at least a portion of slot 1196, such that bolt 1199 is restricted from translating within slot 1196. A person of ordinary skill in the art will appreciate that many configurations may exist to allow and stop rotation of first member 1192 with respect to second member 1195

Figure 12A:
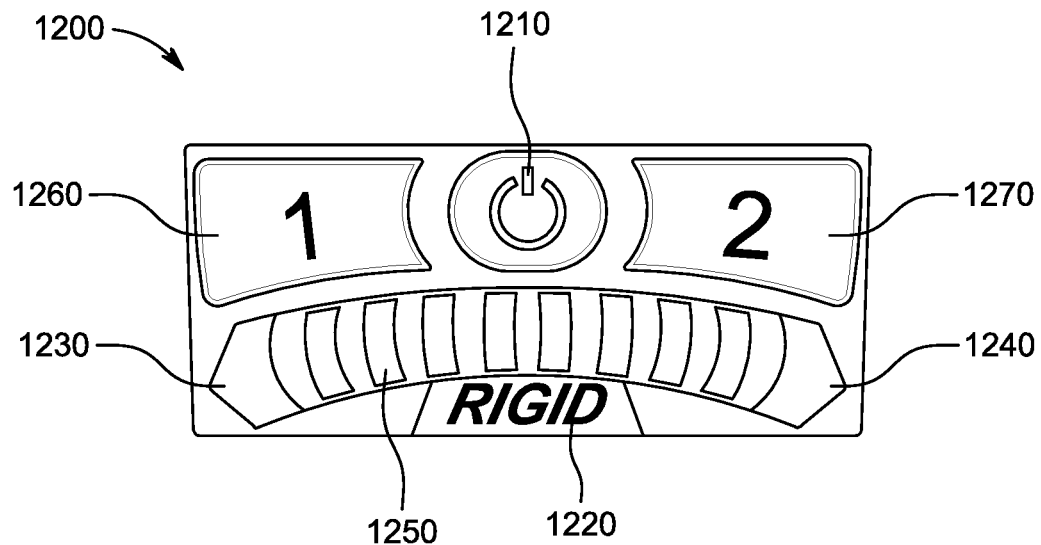
FIG. 12A illustrates a front view of a controller for communicating with a lighting device, according to another embodiment of the present invention.
Figure 12B:
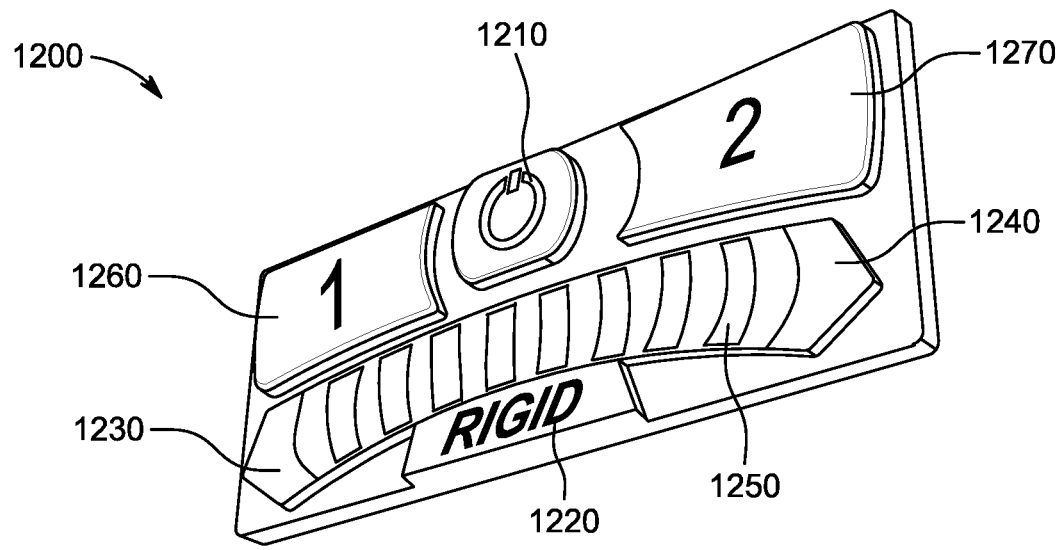
FIG. 12B illustrates an isometric view of the controller of FIG. 12A.

FIGS. 12A and 12B illustrate a controller 1200 which may be capable of communicating with one or more lighting devices (e.g., lighting system 100 of FIG. 1, and/or controller 470A of FIG. 4). Controller 1200 may communicate via cables and/or wirelessly to transmit signals to and receive signals from one or more lighting devices. For example, controller 1200 may communicate wirelessly with one or more lighting devices having integrated wireless receivers (e.g., Bluetooth receivers). In another example, controller 1200 may communicate wirelessly with a wireless relay that is external to, but controls one or more lighting devices (e.g., via radio frequency signals). In another example, controller 1200 may communicate with one or more wireless receivers and one or more wireless relays.

In general, a lighting device may be installed on a vehicle (e.g., vehicle 1109 of FIG. 11), whether on an exterior of the vehicle or in an interior of the vehicle (e.g., in a cabin of the vehicle). To be operable, power cables may be run to a power source (e.g., a battery within the vehicle), and to be controllable, signal cables may be run and/or wireless signals may be sent to a user interface in an interior of the vehicle, so as to be accessible by an operator of the vehicle.

Controller 1200 may include one or more toggles (e.g., button 1210) to enable an operator to interact with and/or select one or more modes of operation of the controller 1200, which may correspond to one or more modes of operation of the lighting devices. For example, the toggles may include any one or more of a button, a dial, a gauge, a knob, a switch, a touch screen, and/or any combination thereof. Interaction with any one or more of the toggles may cause signals to be generated by controller 1200 (e.g., via processor 1831 of FIG. 18), such that the signals are sent to the one or more lighting devices to control operation of the lighting devices.

The one or more toggles may include any one or more of a first power button 1210, a second power button 1220, a first range selection button 1230, a second range selection button 1240, a first preset button 1260, a second preset button 1270, and/or any combination thereof. Furthermore, additional mode specific buttons may be included to enable activation of specified modes of operation of the lighting devices. In the configuration of FIGS. 12A and 12B, first power button 1210 may be oriented in a top middle of controller 1200, and may extend outwardly from controller 1200 a sufficient distance (e.g., further than any other button) to be identifiable by tactile interaction, visual identification, or both. Further, first power button 1210 may have a particular shape (e.g., oval) that may be identified by tactile interaction, visual identification, or both. For example, an operator of the vehicle may be able to identify button 1210 by hand, by a gloved hand, and/or in the dark. In another example, first power button 1210 may be a reference point from which the operator may then identify other buttons of the controller 1200.

Second power button 1220 may be oriented in a bottom middle of controller 1200, and may extend outwardly from controller 1200 a sufficient distance to be identifiable by tactile interaction. Further, second power button 1220 may have a particular shape (e.g., trapezoid), different from the shape of first power button 1210, that may be identified by tactile interaction, visual identification, or both. Second power button 1220 may be independently identifiable and/or may be identified as below first power button 1210.

First range selection button 1230 may be oriented in a bottom left side of controller 1200, and may extend outwardly from controller 1200 a sufficient distance to be identifiable by tactile interaction, visual identification, or both. Further, first range selection button 1230 may have a particular shape (e.g., left-pointing arrow), different from the other shapes, that may be identified by tactile interaction, visual identification, or both. First range selection button 1230 may be independently identifiable and/or may be identified as downward and leftward of first power button 1210.

Second range selection button 1240 may be oriented in a bottom right side of controller 1200, and may extend outwardly from controller 1200 a sufficient distance to be identifiable by tactile interaction, visual identification, or both. Further, second range selection button 1240 may have a particular shape (e.g., right-pointing arrow), different from the other shapes, that may be identified by tactile interaction, visual identification, or both. Second range selection button 1240 may be independently identifiable and/or may be identified as downward and rightward of first power button 1210.

First preset button 1260 may be oriented in a top left side of controller 1200, and may extend outwardly from controller 1200 a sufficient distance to be identifiable by tactile interaction, visual identification, or both. Further, first preset button 1260 may have a particular shape (e.g., wedge), different from the other shapes, that may be identified by tactile interaction, visual identification, or both. First preset button 1260 may be independently identifiable and/or may be identified as leftward of first power button 1210.

Second preset button 1270 may be oriented in a top right side of controller 1200, and may extend outwardly from controller 1200 a sufficient distance to be identifiable by tactile interaction, visual identification, or both. Further, second preset button 1270 may have a particular shape (e.g., wedge), different from the other shapes, that may be identified by tactile interaction, visual identification, or both. First preset button 1270 may be independently identifiable and/or may be identified as rightward of first power button 1210. While FIGS. 12A and 12B exemplify one embodiment of the controller of the present invention, a person of ordinary skill in the art will appreciate that buttons may be positioned in different configurations, and having different features for tactile interaction and/or visual identification without departing from the principles discussed herein.

A gauge 1250 may extend across a portion of controller 1200 to indicate to the operator a mode of operation corresponding to one or more of a power level, a color selection, a mode of operation, a beam intensity and/or a beam selection (e.g., a photometric distribution selection). For example, gauge 1250 may extend from first range selection button 1230 to second range selection button 1240, may extend below first power button 1210, and first and second preset buttons 1260, 1270, and may extend above second power button 1220. Nevertheless, a person of ordinary skill in the art will appreciate that other configurations may be possible.

Figure 13A:
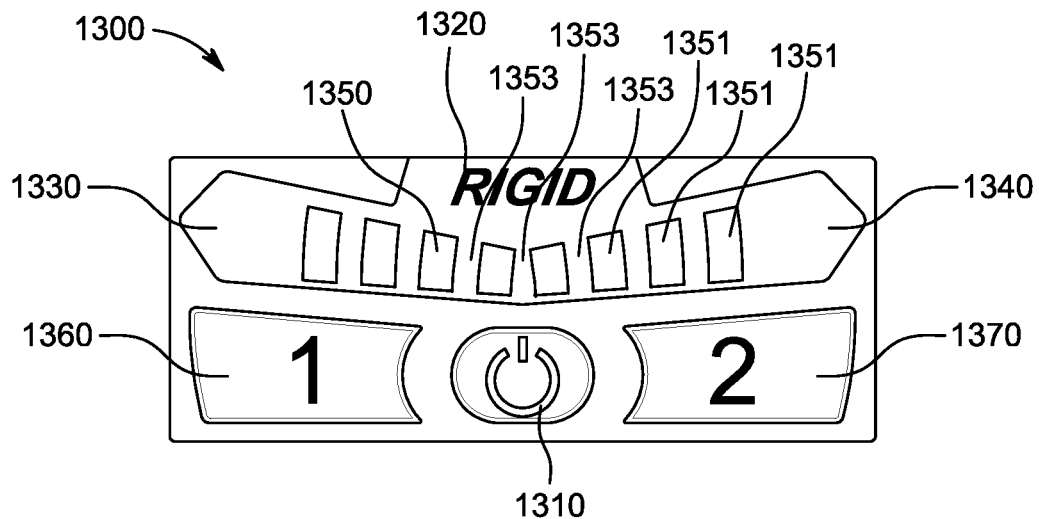
FIG. 13A illustrates a front view of a controller for communicating with a lighting device according to another embodiment of the present invention.
Figure 13B:
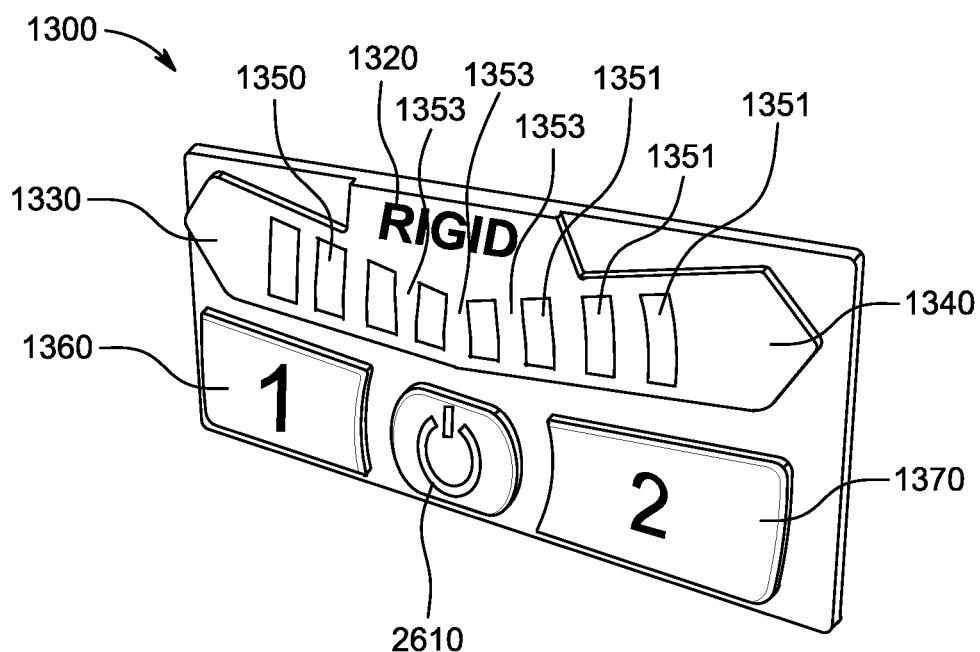
FIG. 13B illustrates an isometric view of the controller of FIG. 13A.

FIGS. 13A and 13B illustrate a controller 1300, according to an embodiment of the present invention. Controller 1300 may be conveniently located for receiving operator input to determine one or more modes of operation, power levels, color selections, beam intensities, and/or beam selections of one or more lighting devices. For example, controller 1300 may be located on a dashboard within a vehicle. In another example, controller 1300 may be attached to the dashboard on a surface thereof by adhesive, one or more clips, one or more fasteners, one or more hooks, one or more snaps, and/or hook and loop fasteners. Alternatively, controller 1300 may be configured to be mountable to a steering wheel of the vehicle (e.g., as exemplified with controller 1700 of FIG. 17).

Controller 1300 may be optimally sized to enable placement in any operable position and/or orientation. Further, controller 1300 may include one or more toggles (e.g., buttons 1310, 1320, 1330, 1340, 1360, 1370), which may be optimally sized to be depressible by the finger, thumb, gloved finger, and/or gloved thumb of an operator. For example, controller 1300 may be between about 0.5 inches and about 4 inches in height (e.g., about 1.25 inches), and between about 0.5 inches and about 4 inches in width (e.g., about 3 inches).

Controller 1300 may receive power from a power source (e.g., a battery of the vehicle and/or an internal battery not shown). Further, controller 1300 may include one or more LEDs for backlighting one or more of the toggles. For example, one or more LEDs may be associated with each toggle to enable each toggle to be backlit independently and/or collectively with one or more other toggles. One or more LEDs may also be provided for backlighting a gauge 1350 of controller 1300. Gauge 1350 may include one or more open portions 1351, and an LED may be associated with each open portion 1351. Open portions 1351 may be separated by one or more closed portions 1353 to separate light emitted by each LED. While portions 1351, 1353 have been described with terminology such as "open" and/or "closed", these terms are meant to convey the notion of a difference in capability to pass emitted light therethrough, such that open portions may have a greater tendency to enable passage of light, while closed portions may have a lesser tendency to enable passage of light. Thus, for example, open portions 1351 may be formed of transparent and/or translucent material, and closed portions 1353 may be formed of opaque material. The LEDs associated with each toggle and gauge 1350 may be any one of white light emitting LEDs, red-green-blue (RGB) light emitting LEDs, LEDs of any other dedicated color, or any combination thereof.

Power consumption by controller 1300 may be optimized by controlling the backlighting of the toggles and gauge 1350. For example, each toggle (e.g., buttons 1310, 1320, 1330, 1340, 1360, 1370) and/or gauge 1350 may be backlit at any time while the vehicle is in use. In another example, no toggles nor gauge 1350 may be backlit until the operator interacts with at least one toggle, such that all toggles and/or gauge 1350 may be backlit simultaneously for a predetermined period (e.g., 6 seconds). In another example, no toggles nor gauge 1350 may be backlit until the operator interacts with a first toggle (e.g., button 1310), such that the first toggle and/or gauge 1350 may be backlit until the operator interacts with the first toggle a second time, after which the first toggle and/or gauge 1350 may return to an unlit condition.

In the above examples, gauge 1350 may have a preset number of backlighting options for indicating to the operator a mode of operation of the system corresponding to one or more of a power level, a color selection, a beam intensity and/or a beam selection. For example, LEDs associated with each open portion 1351 may be illuminated from left to right to signal to the operator a corresponding increase or decrease in power level, a shift in color selection, and/or a shift in beam selection. In another example, LEDs associated with each open portion 1351 may be illuminated from right to left. In another example, LEDs associated with each open portion 1351 may be illuminated from a central open portion 1351 outward to left and right open portions 1351. In another example, all LEDs associated with a left half of open portions 1351 may be illuminated in one mode of operation (e.g., corresponding to activation of button 1360 for a first preset lighting operation). In another example, all LEDs associated with a right half of open portions 1351 may be illuminated in one mode of operation (e.g., corresponding to activation of button 1370 for a second preset lighting operation). A person of ordinary skill in the art will appreciate that additional modes of operation may be facilitated by utilizing other types of button depressions (e.g., by double depression, press and hold, as so forth).

Figure 14:
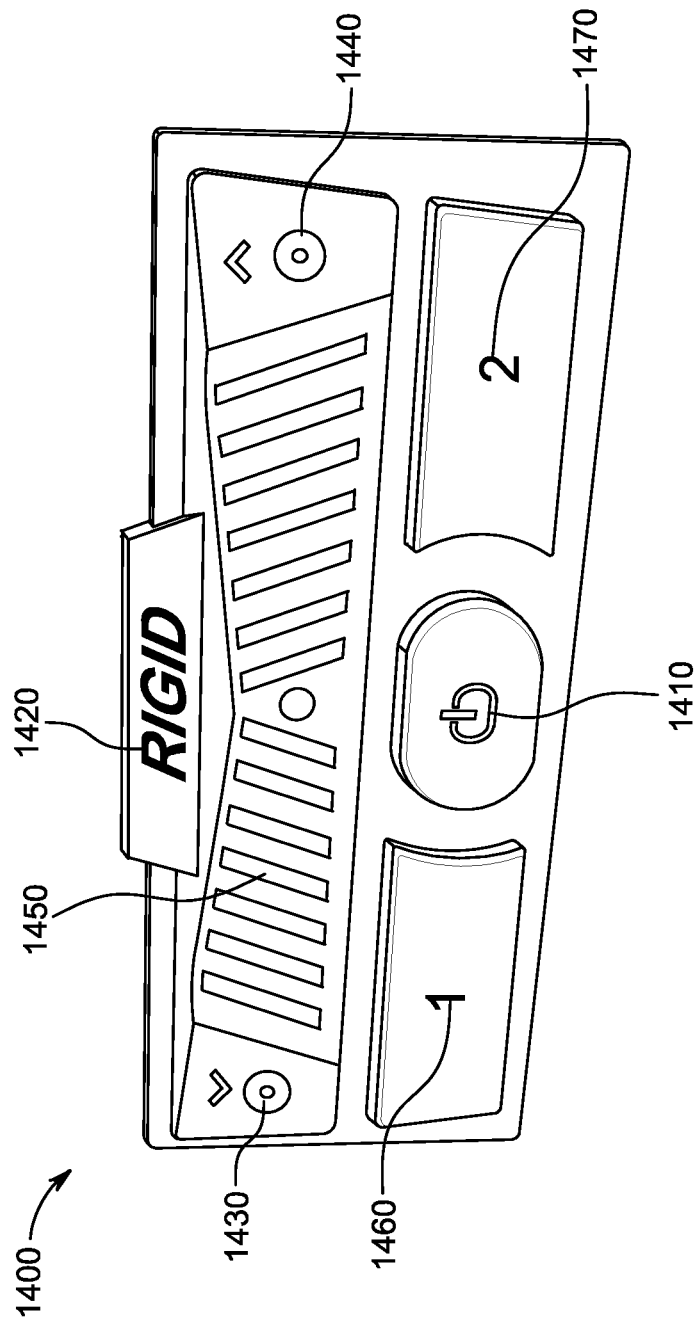
FIG. 14 illustrates a front view of a controller for communicating with a lighting device according to another embodiment of the present invention.

FIG. 14 illustrates a controller 1400, according to an embodiment of the present invention. Controller 1400 may include one or more toggles (e.g., buttons 1410, 1420, 1430, 1440, 1460, 1470) for enabling operator input to determining one or more modes of operation of one or more lighting devices. Further, controller 1400 may include at least one gauge 1450 for indicating power level, a color selection, mode selection, and/or a beam selection to the operator.

A first depression of a first power button 1410 may activate one or more operational groups of LEDs in a lighting device (e.g., the first, second, third, and/or fourth operational groups of LEDs of lighting system 500 of FIG. 5). For example, gauge 1450 may indicate a mode of operation of the first operational group of LEDs. A second depression of the first power button 1410 may deactivate the active operational groups of LEDs.

Alternatively, a depression of first range selection button 1430 may cause a change in the mode of operation, power level, color, or beam pattern of the active operational groups of LEDs. For example, a first operational group of LEDs may receive a decreased power level (e.g., reducing emitted light therefrom), while a second operational group of LEDs may receive an increased power level (e.g., increasing emitted light therefrom). Thus, a depression of first range selection button 1430 may cause a change in the photometric distribution of light emitted from the lighting device (e.g., from spot to flood). The type of change performed by a depression of first range selection button 1430 may be differentiated by the manner of the first depression of the first power button 1410. For example a single touch depression may correspond to a change in beam pattern. In another example, a double-touch depression may correspond to a change in power level. In another example, a press-and-hold depression may correspond to a change in color. Other button depression methods may be possible.

In another alternative, a depression of second range selection button 1440 may cause a change in the mode of operation, power level, color, or beam pattern of the active operational groups of LEDs. The type of change performed by second range selection button 1440 may be differentiated in the same or a similar manner as described with reference to the first range selection button 1430. Nevertheless, a person of ordinary skill in the art will appreciate the utility in have the second range selection button 1440 perform the opposite change as that performed by the first range selection button 1430.

In another alternative, a depression of first preset button 1460 may cause the current settings of the active operational groups of LEDs, including power level, color, and/or beam pattern, to be saved to a first preset selection. An operator may program first preset button 1460 by selecting a desired power level, color, and/or beam pattern as described above, then by press-and-holding first preset button 1460 for a predetermined period (e.g., 3 seconds). Other button depression methods may be possible. First preset button 1460 may indicate that the preset programming was successful by flashing one or more times. Second preset button 1470 may operate according to the same principles described with respect to first preset button 1460.

In another alternative, a first depression of second power button 1420 may activate one or more operational groups of LEDs in a lighting device (e.g., the fourth operational group of LEDs of lighting system 500). Second power button 1420 may be backlit by an LED having a similar capability (e.g., color) as the operational groups of LEDs in the lighting device. For example, where the LEDs in the lighting device are RGB LEDs, the LED which provides backlighting for the second power button 1420 may likewise be an RGB LED. A second depression of second power button 1420 may deactivate the activated operational groups of LEDs.

Alternatively, a press-and-hold depression of second power button 1420 may activate the operational groups of LEDs and place controller 1400 into a color selection mode. Color may be selected by depression of the second power button 1420 one or more times to scroll through a predefined list of color options, and/or by depression of one or both of first and second range selection buttons 1430, 1440 to scroll through a predefined list of color options. During scrolling, the RGB LED backlight of the second power button 1420 may scroll through color options simultaneously with the scrolling of color in the active operational groups (e.g., where the active operational groups also have RGB LEDs), such that the color displayed by the LED in controller 1400 matches the color displayed by the LEDs in the lighting device. The color selection mode may be terminated by a press-and-hold depression of the second power button 1420. Other button depression methods may be possible. The second power button 1420 may indicate that the color selection programming was successful by flashing one or more times.

In another alternative, a press-and-hold depression of first power button 1410 may activate the operational groups of LEDs and place controller 1400 into a color selection mode. The second power button 1420 may be backlit by the RGB LED, but may not operate as a depressible button. Color may be selected by depression of the first power button 1410, and/or by depression of one or both of first and second range selection buttons 1430, 1440 as described above. During scrolling, the RGB LED backlight of the second power button 1420 may scroll through color options simultaneously with the scrolling of color in the active operational groups (e.g., where the active operational groups also have RGB LEDs), such that the color displayed by the LED in controller 1400 matches the color displayed by the LEDs in the lighting device. The color selection mode may be terminated by a press-and-hold depression of the first power button 1410. Other button depression methods may be possible. The first power button 1410 and/or second power button 1420 may indicate that the color selection programming was successful by flashing one or more times (e.g., in the designated color if by the second power button 1420).

Figure 15:
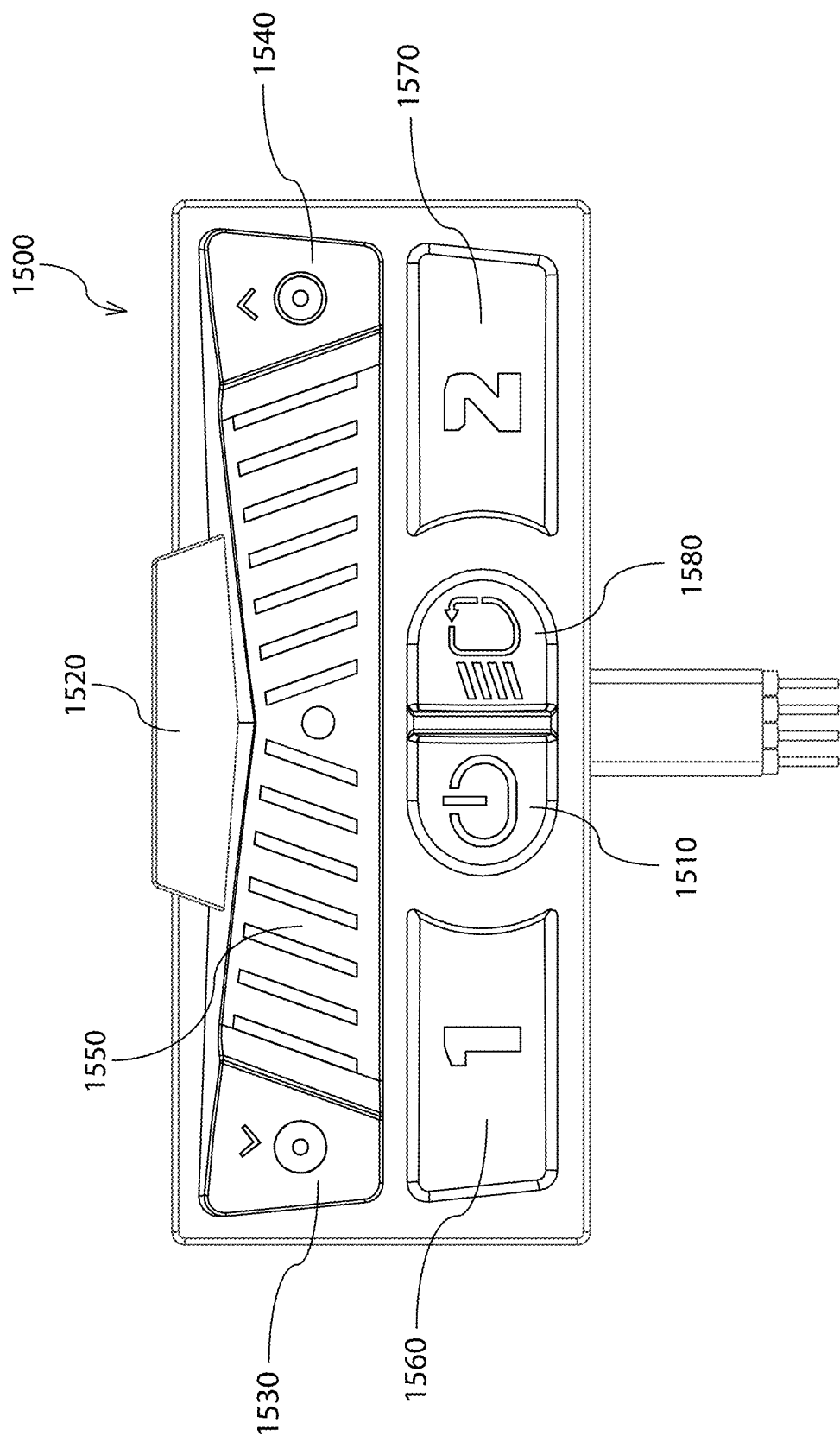
FIG. 15 illustrates a front view of a controller for communicating with a lighting device according to another embodiment of the present invention.

FIG. 15 illustrates a controller 1500, according to an embodiment of the present invention. Controller 1500 may include one or more toggles (e.g., buttons 1510, 1520, 1530, 1540, 1560, 1570, 1580) for enabling operator input to determining one or more modes of operation of one or more lighting devices. Further, controller 1500 may include at least one gauge 1550 for indicating power level, a color selection, mode of operation, and/or a beam selection to the operator.

First and second power buttons 1510, 1520, first and second range selection buttons 1530, 1540, and first and second preset buttons 1660, 1570 may be configured to operate as described herein (e.g., as described with reference to FIGS. 12-14). In addition, a third power button 1580 may be configured on controller 1500, to provide the controller with increased functionality.

For example, third power button 1580 may be operable independently of first and second power buttons 1510, 1520. In another example, third power button 1580 may be operable only after activation of first or second power buttons 1510, 1520. In another example, third power button 1580 may be configured so that a depression of third power button 1580 may cause a dimming of any lighting systems which are under the control of controller 1500 (e.g., by dropping the power provided to the LEDs of the lighting system to a lower power level). In another example, third power button 1580 may be configured so that a press-and-hold depression of third power button 1580 may cause a dimming of any lighting systems which are under the control of controller 1500 (e.g., while the third power button 1580 is being held).

Alternatively, third power button 1580 may be configured so that a depression of third power button 1580 may cause the lighting system to be operated in one or more additional modes of operation. For example, third power button 1580 may be configured to operate a lighting system in an automatic mode, wherein the lighting system alternates between one or more modes of operation based on sensed vehicle conditions. Sensed vehicle conditions may include speed, directional changes, glare, object detection, facial recognition, operator vision tracking, or any additional sensed parameters (e.g., a rolling of the vehicle or other catastrophic event detected by the vehicle may activate a strobing and/or S.O.S. Morse Code signaling of the lighting device). The one or more modes of operation may be preprogrammed modes of the lighting system, and/or one or more user customized modes of operation. A person of ordinary skill in the art will appreciate that other types of depressions may be possible to accomplish any one or more of the modes of operation of the present invention.

FIGS. 16A-16E illustrate one or more modes of operation of controller 1600 as indicated by backlighting of a gauge 1650. Gauge 1650 may be capable of indicating a plurality of modes of operation of controller 1600 corresponding to a plurality of modes of operation of a lighting device in communication with controller 1600. Further, gauge 1650 may be capable of indicating modes of operation corresponding to one or more of a power level, a color selection, and/or a beam selection. For example, gauge 1650 may be capable of indicating 1, 2, 3, 4, 5, 6, 7, 8, 9, 10, 11, 12, 13, 14, 15 or more modes of operation for each of a power level, a color selection, and/or a beam selection.

In a first mode of operation of controller 1600, a first window portion 1651 of gauge 1650 may be illuminated, corresponding to a first mode of operation of one or more operational groups of LEDs in one or more lighting devices (e.g., corresponding to a high intensity spot photometric distribution). While the first window portion 1651 is illustrated at a center of gauge 1650, the first window portion 1651 may be located at any position along a span of gauge 1650. Furthermore, the term "window" may not necessarily incorporate an actual opening, but may refer to the use of transparent and/or translucent material.

Operation of first or second range selection buttons 1630, 1640, may cause controller 1600 to switch to a second mode of operation. In the second mode of operation of controller 1600, a second window portion 1652 of gauge 1650 may be illuminated, corresponding to a second mode of operation of the one or more operational groups of LEDs. The second window portion 1652 may be a pair of second window portions 1652 located on either side of first window portion 1651, though other configurations may be possible.

Operation of first or second range selection buttons 1630, 1640, may cause controller 1600 to switch to a third, fourth, fifth, sixth, seventh, eighth, or additional modes of operation (e.g., one or more of which may correspond to a high intensity medial and/or a high intensity flood photometric distribution). For example, FIG. 16C may exemplify a fourth mode of operation of controller 1600, which may correspond to a fourth mode of operation of the one or more operational groups of LEDs of a lighting device. In another example, FIG. 16D may exemplify a seventh mode of operation of controller 1600, which may correspond to a seventh mode of operation of the one or more operational groups of LEDs of a lighting device. In another example, FIG. 16E may exemplify an eighth mode of operation of controller 1600, which may correspond to an eighth mode of operation of the one or more operational groups of LEDs of a lighting device.

In the above examples, the various window portions have been illustrated as being illuminated independently in each mode of operation. Alternatively, switching from the first mode of operation to the second mode of operation may cause the second window portion 1652 of gauge 1650 to be illuminated simultaneously with the first window portion 1651. In another example, where there are eight modes of operation, switching to the eighth mode of operation may cause all of the window portions of gauge 1650 to be illuminated.

In one embodiment, the separation distance between illuminated window portions may be indicative of a beam pattern selected by the associated lighting device. For example, illumination of window portion 1651 may indicate a spot beam pattern is selected. Illumination of window portion 1652 may indicate a slightly wider beam pattern is selected. Illumination of window portions as illustrated in FIGS. 28C-28E may indicate the selection of progressively wider beam patterns, respectively, with the illuminated window portions of FIG. 28E indicating the widest beam pattern (e.g., a flood photometric distribution).

Figure 17:
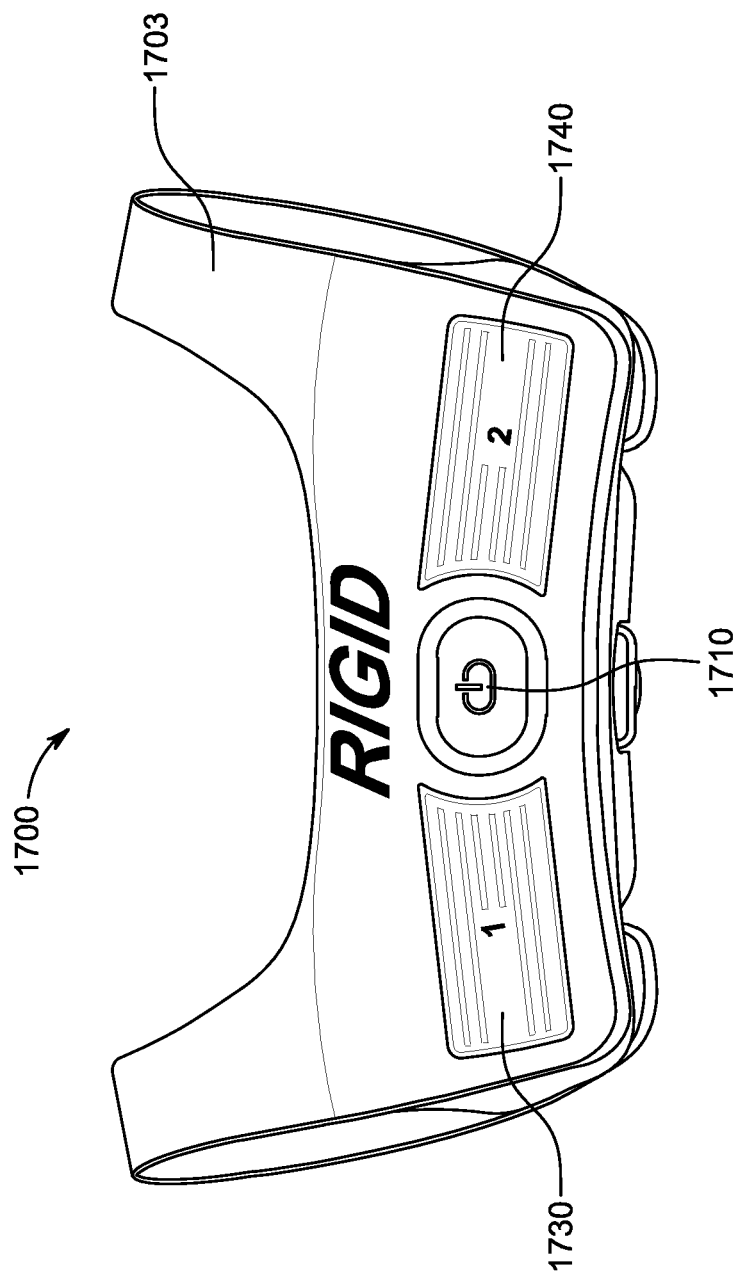
FIG. 17 illustrates a front view of a steering wheel mountable controller according to another embodiment of the present invention.

FIG. 17 illustrates a controller 1700, according to an embodiment of the present invention. Controller 1700 may include one or more toggles (e.g., buttons 1710, 1730, 1740) for enabling operator input to determining one or more modes of operation of one or more lighting devices. Controller 1700 may be configured to be mountable to a steering wheel of a vehicle (e.g., via straps 1703).

Controller 1700 may have a power button 1710, a first selection button 1730, and a second selection button 1740. For example, a first depression of power button 1710 may activate one or more operational groups of LEDs in a lighting device (e.g., the first, second, third, and/or fourth operational groups of LEDs of lighting system 500 of FIG. 5). In another example, a second depression of the power button 1710 may deactivate the active operational groups of LEDs.

In another example, a depression of first selection button 1730 may cause the active operational groups of LEDs to undergo a change in power level, color, and/or beam pattern (e.g., from spot to flood). The type of change performed by a depression of first range selection button 1730 may be differentiated by the manner of the first depression of power button 1710. For example a single touch depression may correspond to a change in beam pattern. In another example, a double-touch depression may correspond to a change in power level. In another example, a press-and-hold depression may correspond to a change in color. Other button depression methods may be possible. A second selection button 1740 may operate in substantially the same manner as describe with respect to the first selection button 2940.

Alternatively, a press-and-hold depression of first selection button 1730 while the operational groups of LEDs are active may cause controller 1700 to store a first preset mode of operation associated with first selection button 1730. The first preset mode of operation may be activated by depressing first selection button 1730 while the operational groups of LEDs are inactive, in another operational mode, or in the same operational mode. A depression of first selection button 1730 and/or power button 1710 may deactivate the preset mode of operation. The second selection button 1740 may operate in substantially the same manner as described with respect to the first selection button 1730. Thus first and second selection buttons 1730, 1740, may operate as range selection buttons (e.g., as range selection buttons 1430, 1440, of FIG. 14), as preset buttons (e.g., as preset buttons 1460, 1470, of FIG. 14), or both.

Figure 18:
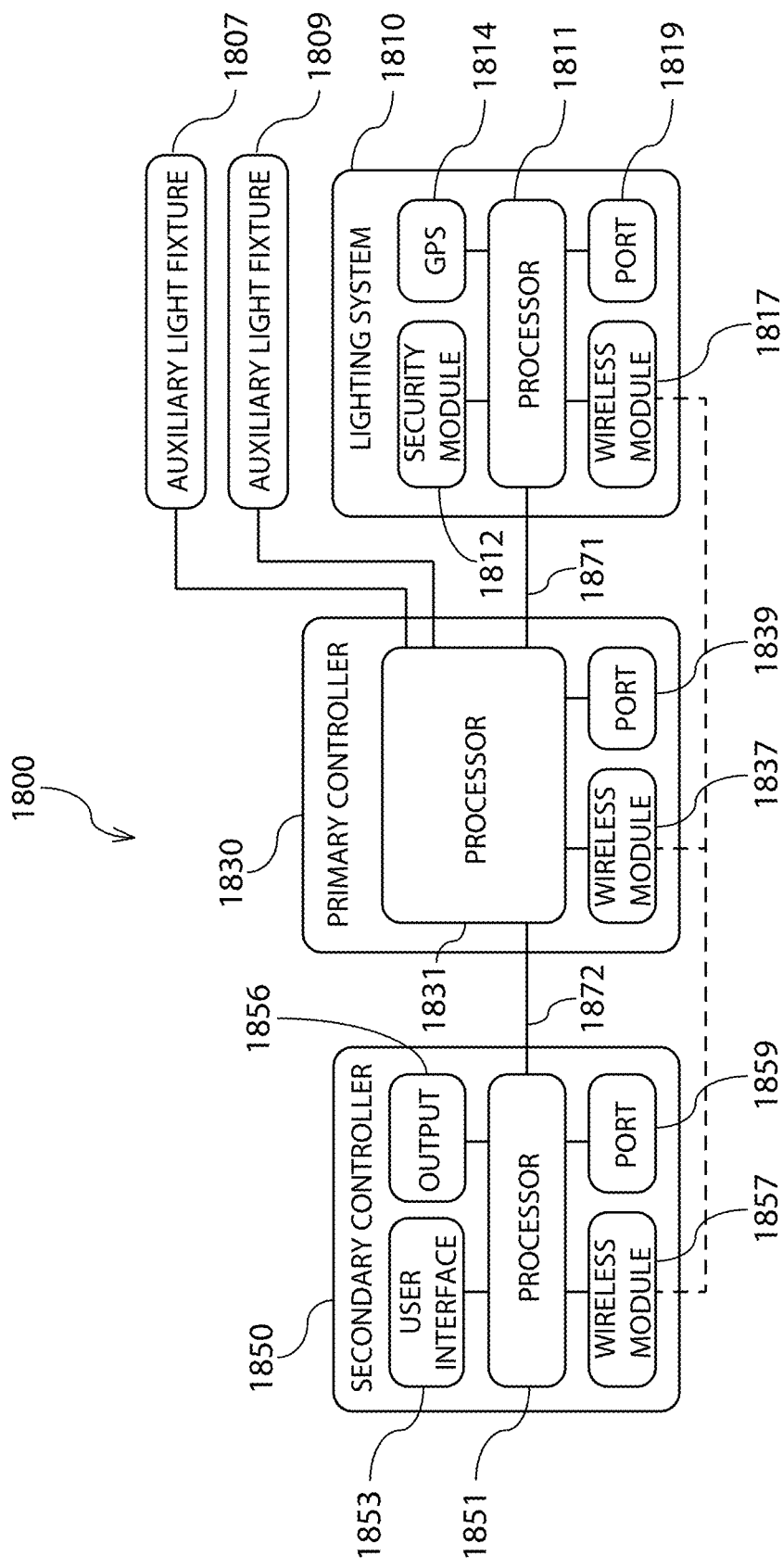
FIG. 18 illustrates a block diagram of a control system for communicating with a lighting device according to another embodiment of the present invention.

FIG. 18 illustrates a control system 1800, according to an embodiment of the present invention. Control system 1800 may include a lighting system 1810 configured to emit light away from a structure (e.g., vehicle 1109 of FIG. 11) and a primary controller 1830 configured to control operation of the lighting system 1810. Further, primary controller 1830 may be configured to control operation of one or more auxiliary light fixtures (e.g., lighting systems 1807, 1809). In addition, control system 1800 may include a secondary controller 1850 configured to interact with lighting system 1810 and/or primary controller 1830 to enable a user to provide user input, such that signals from the secondary controller 1850 determine operational parameters of lighting system 1810 and/or primary controller 1830.

Primary controller 1830 may include a processor 1831 configured to communicate with a processor 1811 of lighting system 1810. For example, processor 1831 of primary controller 1830 may be electrically connected to processor 1811 of lighting system 1810 by one or more electrical leads (e.g., leads 1871). In another example, processor 1831 may be electrically connected to a wireless module 1837, and processor 1811 may be electrically connected to a wireless module 1817, such that wireless module 1837 may communicate with wireless module 1817 to relay signals which enable primary controller 1830 to control operation of lighting system 1810. Similarly, primary controller 1830 may communicate with lighting systems 1807, 1809 by one or more electrical leads (as exemplified in FIG. 18) or wirelessly. Wireless communication may be by radio frequency signals, Bluetooth, Wi-Fi, or by any other suitable method (e.g., via LIN communication between components in vehicles).

Lighting system 1810 may be configured with a security module 1812 electrically connected to processor 1811 to enable lighting system 1810 to detect a disconnect of the electrical leads (e.g., leads 1871) and/or to detect a disconnect of the wireless signals between each wireless module 1817, 1837. For example, a disconnect of the wireless signal may occur if wireless module 1817 is moved to a distance too far to be in communication with wireless module 1837 (e.g., due to theft). In response to a disconnect of the electrical leads and/or of the wireless signal between wireless modules 1817, 1837, security module 1812 may deploy countermeasures to prevent theft of lighting module 1810 (e.g., electrical shock). In another example, security module 1812 may include radio frequency identification (RFID) technology to enable lighting system 1810 to be detected by an RFID scanner, such that lighting system 1810 may be detected in commerce.

In another example, lighting system 1810 may be configured with a global positioning system (GPS) 1814, such that when electrical leads and/or the wireless signal is disconnected, GPS 1814 may be activated. For example, GPS 1814 may maintain positioning information (e.g., coordinates) for a predefined period of time and/or may instantaneously track the position of the lighting system 1810. In another example, GPS 1814 may periodically maintain positioning information. In another example, positioning information may be relayed by processor 1811 to wireless module 1817. In another example, positioning information may be transmitted via wireless module 1817 to a cellular network. In another example, positioning information may be transmitted via wireless module 1817 to a cellular network to be passed on to a monitoring station (e.g., to enable verification of theft). In another example, positioning information may be transmitted via wireless module 1817 to a cellular network to be passed on to the nearest law enforcement agency.

Primary controller 1830 may be configured adjacent to or remotely from lighting system 1810. For example, lighting system 1810 may be configured on the exterior of a vehicle (e.g., vehicle 1109 of FIG. 11), while primary controller 1830 may be configured on an interior of the vehicle (e.g., under the hood of the vehicle). In another example, primary controller 1830 may be configured as an integral element of lighting system 1810.

A secondary controller 1850 may be configured to communicate with primary controller 1830 and/or lighting system 1810 to enable user selected input of control system 1800. While secondary controller 1850 may be configured as an integral element of lighting system 1810, secondary controller 1850 is intended as a means to enable a user to provide user selected input to primary controller 1830 and/or lighting system 1810. Thus, where lighting system 1810 is configured at a position remote to the user, secondary controller 1850 may be configured adjacent to a user, such that secondary controller 1850 may enable the user to provide control input remotely.

Secondary controller 1850 may include a processor 1851 configured to communicate with processor 1831 of primary controller 1830 and/or with processor 1811 of lighting system 1810. For example, processor 1851 may communicate with processor 1831 by one or more electrical leads (e.g., leads 1872). In another example, processor 1851 may communicate with processor 1811 by one or more electrical leads (not shown). In another example, processor 1851 may be electrically connected to a wireless module 1857, such that wireless module 1857 may communicate with one or more of wireless module 1817 and/or wireless module 1837 to relay signals which enable primary controller 1830 to control operation of lighting system 1810.

Secondary controller 1850 may receive user inputs through a user interface 1853 which communicates with processor 1851. For example, user interface 1853 may include one or more toggles (e.g., buttons 1510, 1520, 1530, 1540, 1560, 1570, 1580 of FIG. 15). In another example, user interface 1853 may be any other known mechanical toggle (e.g., a foot pedal switch, a joystick, etc.). In another example, user interface 1853 may include a touch screen with virtual toggles simulating mechanical toggles.

Secondary controller 1850 may include one or more outputs (e.g., output 1856) to enable feedback to the user. For example, outputs may include visual outputs (e.g., light sources indicating operation), audio outputs (e.g., audio feedback), or any other output that is identifiable by the user. In another example, output 1856 may include alarms (e.g., to warn the user of hazardous conditions around and/or detected by control system 1800 and/or to provide alerts regarding errors experienced by control system 1800). In another example, output 1856 may include music. In another example, output 1856 may include prerecorded voice messages.

Secondary controller 1850 may be configured to be accessible to the user for operation of lighting system 1810. For example, where lighting system 1810 is configured on the exterior of a vehicle (e.g., vehicle 1109 of FIG. 11), secondary controller 1850 may be configured in an interior (e.g., on a dashboard) of the vehicle (e.g., controller 1500 of FIG. 15). In another example, secondary controller 1850 may be configured on a steering wheel (not shown) of the vehicle (e.g., controller 1700 of FIG. 17). In another example, secondary controller 1850 may be configured on lighting system 1810 (e.g., in a bicycle lighting arrangement). In another example, secondary controller 1850 may be configured at a foot of the user (e.g., a foot pedal switch). In another example, secondary controller 1850 may be a cellular phone with a software application (app) which enables communication as herein described. In another example, secondary controller 1850 may be a vehicle integrated radio system already existing in the vehicle which enables communication as herein described. In another example, secondary controller 1850 may be a vehicle integrated GPS already existing in the vehicle which enables communication as herein described. In another example, secondary controller 1850 may be any other vehicle integrated system already existing in the vehicle which enables communication as herein described. In another example, more than one of the above examples may be utilized simultaneously to enable communication as herein described (e.g., two, three, four, or more secondary controllers).

Furthermore, secondary controller 1850 may be a device external to control system 1800, such that primary controller 1830 may communicate wirelessly with one or more external devices which are not accessible to the user of control system 1800, to enable notifications and/or alerts to be sent to persons other than the user. For example, primary controller 1830 may be capable of wireless communication with one or more control systems installed remotely to control system 1800. In another example, primary controller 1830 may be capable of wireless communication with a control system installed on another vehicle (e.g., for distress messages). In another example, primary controller 1830 may be capable of wireless communication with a cellular network (e.g., for social networking). In another example, primary controller 1830 may be capable of wireless communication with a base station (e.g., a monitoring station).

Each of lighting system 1810, primary controller 1830, and/or secondary controller 1850 may be configured with one or more electrical terminals (e.g., ports 1819, 1839, 1859, respectively) to enable temporary and/or permanent electrical communication with one or more other devices. For example, other devices may include diagnostic devices, MP3 players, cellular phones, laptop computers, desktop computers, and/or any other electronic devices. In another example, ports 1819, 1839, 1859 may be any one or more of USB, mini USB, micro USB, HDMI, coaxial, Ethernet, RCA, DVI, VGA, S-Video, or other known ports.

Figure 19:
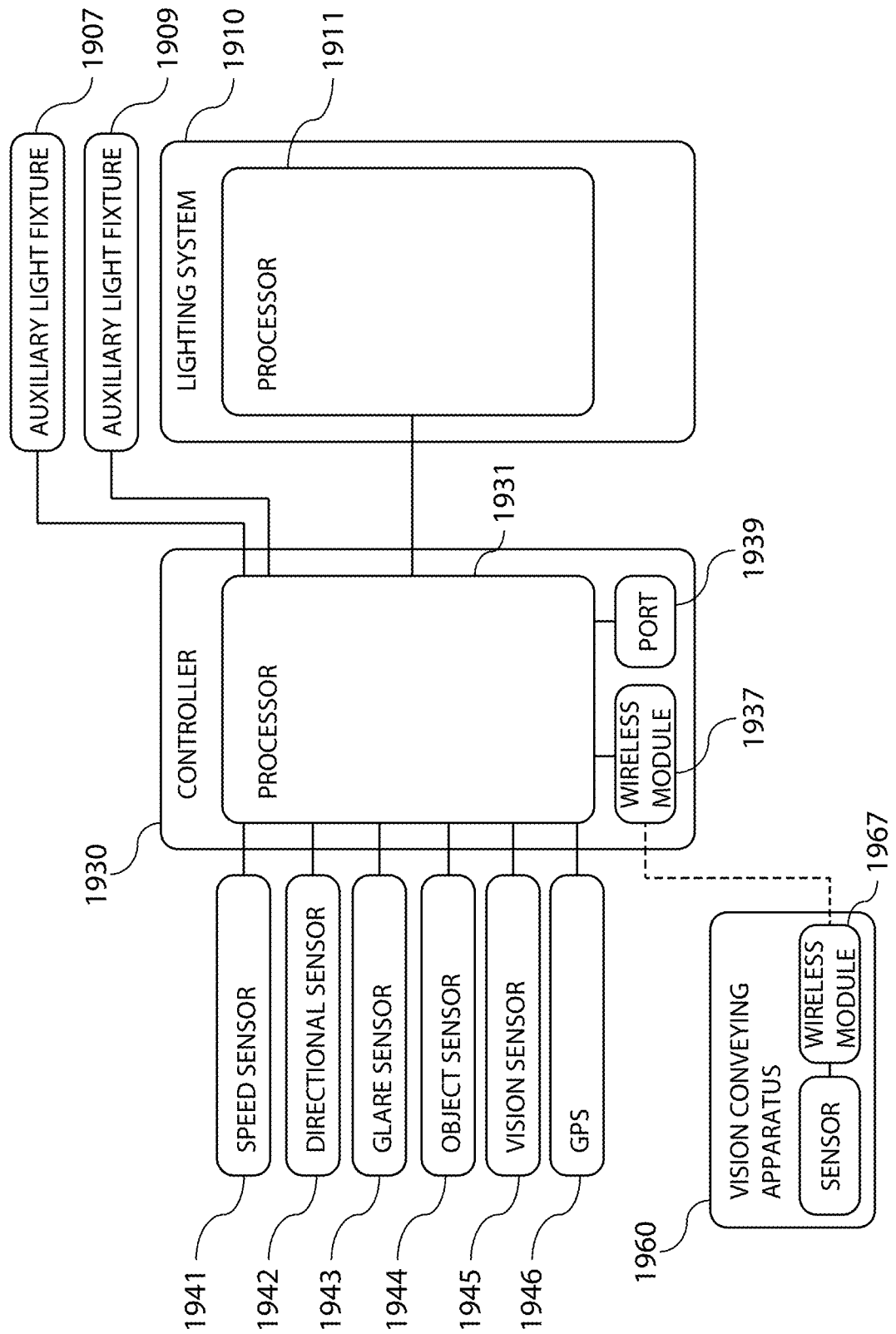
FIG. 19 illustrates a block diagram of a controller configured for communication with a lighting system.

FIG. 19 illustrates a block diagram of a primary controller 1930 configured for communication with a lighting system 1910 according to the present invention. Further, primary controller 1930 may be configured to control operation of one or more auxiliary light fixtures (e.g., lighting systems 1907, 1909). Primary controller 1930 may include a processor 1931 configured to communicate with a processor 1911 of lighting system 1910. Primary controller 1930 may further include one or more sensors (e.g., sensors 1941-1946) configured to detect operating conditions (e.g., vehicle conditions, environmental conditions, and/or user conditions). Other operating conditions may also be detectable and are within the scope of the present invention.

For example, primary controller 1930 may be electrically connected to a first sensor 1941 which may detect a first vehicle condition (e.g., a travelling speed of the vehicle). For example, sensor 1941 may be a vehicle speed sensor (VSS). In another example, sensor 1941 may be a global positioning system sensor (GPS). In another example, sensor 1941 may be an accelerometer. In another example, first sensor 1941 may be a control system of the vehicle (e.g., connected via port 1939) which may send vehicle speed information to primary controller 1930. Processor 1931 may be configured to assign one or more modes of operation of lighting system 1910 to discrete ranges and/or values of the vehicle speed information. For example, processor 1931 may determine a maximum speed of the vehicle based on a maximum detected driving speed, and may divide the range from zero to the maximum speed into one or more discrete ranges corresponding to one or more modes of operation (e.g., where maximum speed is 80 miles per hour, mph, 71-80 mph may correspond to a first mode of operation, 61-70 mph may correspond to a second mode of operation, 51-60 mph may correspond to a third mode of operation, as so forth). In another example, processor 1931 may be configured to receive a user specified maximum speed. In another example, processor 1931 may be configured to allow the user to select a maximum speed from a list of speeds. In another example, processor 1931 may have a programmable mode wherein the user may interact with a user interface (e.g., user interface 1853 of FIG. 18) to identify a maximum speed while operating the vehicle. In another example, a maximum speed may be preset within the software and/or hardware of processor 1931 and/or processor 1911.

In another example, primary controller 1930 may be electrically connected to a second sensor 1942 which may detect a second vehicle condition (e.g., a change in direction of the vehicle). In another example, second sensor 1942 may be configured within primary controller 1930, or may be configured within lighting system 1910. In another example, second sensor 1942 may detect a change in pitch of the vehicle (e.g., due to a hill approach and/or due to vehicle loading). Processor 1931 may be configured to select a mode of operation suitable for a change in pitch of the vehicle (e.g., high beams for hill approach and/or low beams for rear vehicle loading). In another example, second sensor 1942 may detect a change in yaw of the vehicle (e.g., due to turning of the vehicle). Processor 1931 may be configured to select a mode of operation suitable for a change in yaw of the vehicle (e.g., right and/or left side beams for turning). In another example, second sensor 1942 may detect a change in roll of the vehicle (e.g., due to overturning of the vehicle, or rollover). Processor 1931 may be configured to select a mode of operation suitable for a change in roll of the vehicle (e.g., strobing, hazard flashing beams, and/or Morse code signaling). Further, the precise mode of operation utilized by processor 1931 may be customized by the user.

In another example, primary controller 1930 may be electrically connected to a third sensor 1943 which may detect a first environmental condition (e.g., light emitted toward lighting system 1910 from another light source and/or glare produced by light emitted by lighting system 1910 and reflected back toward lighting system 1910). In another example, third sensor 1943 may be configured within lighting system 1910. Processor 1931 may be configured to select a mode of operation suitable to accommodate external light and glare. For example, processor 1931 may turn off an operational group of white LEDs and further may turn on an operational group of amber LEDs. In another example, processor 1931 may adjust a power level of one or more active operational groups (e.g., to cause a dampening and/or dimming of light output). A person of ordinary skill in the art will appreciate that other methods of light control and/or dimming may be utilized to decrease the intensity of the photometric distribution produced by the lighting system 1910 (e.g., pulse width modulation, analog dimming, frequency modulation, duty cycle modulation, and so forth). For example, the power levels herein described may refer to alternate pulse width modulations, alternate frequency modulations, alternate duty cycle modulations, as so forth.

In another example, primary controller 1930 may be electrically connected to a fourth sensor 1944 which may detect a second environmental condition (e.g., objects approaching the vehicle and/or moving with respect to the vehicle). In another example, fourth sensor 1944 may be configured within lighting system 1910, or may be mounted at a discrete location or locations on the vehicle. Processor 1931 may be configured to select a mode of operation appropriate for the approaching object. For example, fourth sensor 1944 may detect moving objects entering the roadway (e.g., animals) and/or within a specified distance of the vehicle, such that processor 1931 may select a mode of operation suitable to alert the user of the moving object (e.g., increasing light output in the direction of the object). In another example, fourth sensor 1944 may detect stationary obstructions (e.g., tree trunks) on the roadway and/or within a travel direction of the vehicle, such that processor 1931 may select a mode of operation suitable to alert the user of the stationary obstruction (e.g., increasing light output in the direction of the obstruction). In another example, fourth sensor 1944 may detect non-obstructions (e.g., a severe drop off) in the roadway and/or within a travel direction of the vehicle, such that processor 1931 may select a mode of operation suitable to alert the user of the stationary obstruction (e.g., audio alarm). In another example, fourth sensor 1944 may be capable of facial recognition (e.g., of human faces) in the roadway, within a travel direction of the vehicle and/or in any other direction from the vehicle, such that processor 1931 may select a suitable mode of operation (e.g., reducing light output in the direction of a detected human face).

In another example, primary controller 1930 may be electrically connected to a fifth sensor 1945 which may detect a first user condition (e.g., a user's visual direction and/or a vision conveying apparatus 1960 to track the user's visual direction such as where the user is looking, and emit light in accordance with the user's visual direction). For example, vision conveying apparatus 1960 may be configured to sense the orientation of the user's head and/or eyes, and may provide visual direction information to controller 1930, such that controller 1930 may select an appropriate mode of operation. In another example, the user may wear the vision conveying apparatus, such that fifth sensor 1945 may detect visual direction information. Alternatively, processor 1931 may select a mode of operation which enables the user to modify a direction of emitted light with a secondary controller (e.g., a joystick). Where the vision conveying apparatus 1960 is remote from primary controller 1930, a wireless module 1967 of the vision conveying apparatus 1960 may communicate wireless with a wireless module 1937 of primary controller 1930. Furthermore, the vision conveying apparatus may be powered by the same power source, or may have an internal power source (not shown).

In another example, primary controller 1930 may be electrically connected to a sixth sensor 1946 which may detect a third vehicle condition (e.g., geographical position of the vehicle such as with a GPS). Alternatively, sixth sensor 1946 may be configured within lighting system 1910 (e.g., GPS 1814 of FIG. 18), may be configured within primary controller 1930, or may be a vehicle integrated system (e.g., a vehicle integrated GPS may communicate via wired or wireless communication with primary controller 1930). For example, processor 1931 and/or sixth sensor 1946 may detect an instantaneous geographical position of the vehicle. The instantaneous geographical position may be communicated by primary controller 1930 to one or more control systems installed remotely to primary controller 1930 (e.g., for multi-vehicle caravanning). In another example, processor 1931 and/or sixth sensor 1946 may be configured to calculate and/or receive vehicle speed information based on detected geographical positioning detected by sixth sensor 1946, over time, and may select a mode of operation appropriate for the speed of the vehicle (e.g., as described with reference to first sensor 1941). In another example, processor 1931 and/or sixth sensor 1946 may collect detected geographical positions over time, and may generate a route of travel of the vehicle. The route of travel may be communicated by primary controller 1930 to one or more control systems installed remotely to primary controller 1930 (e.g., for destination sharing via social media).

While particular sensors have been presented which may be capable of detecting vehicle conditions, environmental conditions, and/or user conditions, a person of ordinary skill in the art will appreciate that additional vehicle conditions, environmental conditions, and/or user conditions exist, and may be detectable by the use of additional sensors. Thus, the present invention is intended to encompass all detectable vehicle conditions, all detectable environmental conditions, and all detectable user conditions. Further, a person of ordinary skill in the art will appreciate that additional sensors and/or sensing modes may be integrated with lighting system 1910 and/or primary controller 1930 to increase the versatility of the modes of operation of the present invention and enable photometric distribution of light which has been optimized for any activity.

FIGS. 20A-20H illustrate plan views of several beam patterns or photometric distributions (e.g., beam patterns 2010-2080) produced by a lighting system of the present invention (e.g., lighting system 100 of FIG. 1). Each beam pattern may represent the photometric distribution of high intensity light emitted by one or more operational groups of LEDs (e.g., LEDs 471A-476A, 471B-476B, 471C-476C, 471D-476D of FIG. 4) at one or more power levels.

For example, beam pattern 2010 may represent a high intensity spot photometric distribution of light emitted by a first operational group of LEDs (e.g., LEDs 471A-D of FIG. 4), which may correspond to a first mode of operation. Beam pattern 2010 may originate from a position along line 2019, and may be represented by one or more bands of intensity (e.g., bands 2011, 2012, 2013, 2014, 2015). In general, bands may increase in intensity from an outer perimeter of beam pattern 2010 toward the interior (e.g., a position of peak intensity). Therefore, band 2011 may represent a region of relatively lower intensity, whereas band 2015 may represent a region of relatively higher intensity. Furthermore, beam pattern 2010 may be represented by a band width 2017 (e.g., corresponding to width 103 of FIG. 1) and/or a band depth 2018 (e.g., corresponding to depth 805 of FIG. 8). Band width 2017 may be relatively small compared to other beam patterns, and band depth 2018 may be relatively large compared to other beam patterns. Further, band depth 2018 may be relatively large compared to band width 2017.

In another example, beam pattern 2020 may represent a high intensity photometric distribution of light emitted by first and second operational groups of LEDs (e.g., LEDs 471A-D and LEDs 472A-D, 473A-D), which may correspond to a second mode of operation. In another example, beam pattern 2030 may represent a high intensity photometric distribution of light emitted by first and second operational groups of LEDs (e.g., in a third mode of operation). In another example, beam pattern 2040 may represent a high intensity photometric distribution of light emitted by first and second operational groups (e.g., in a fourth mode of operation). In another example, beam pattern 2050 may represent a high intensity medial photometric distribution of light emitted by the second operational group of LEDs (e.g., LEDs 472A-D, 473A-D), which may correspond to a fifth mode of operation. In another example, beam pattern 2060 may represent a high intensity photometric distribution of light emitted by second and third operational groups (e.g., in a sixth mode of operation). In another example, beam pattern 2070 may represent a high intensity photometric distribution of light emitted by second and third operational groups (e.g., in a seventh mode of operation). In another example, beam pattern 2080 may represent a high intensity flood photometric distribution of light emitted by second and third operational groups of LEDs or a third operational group of LEDs exclusively (e.g., LEDs 474A-D), which may correspond to an eighth mode of operation).

Each of beam patterns 2020-2080 may share similar characteristics to beam pattern 2010, and each of beam patterns 2020-2080 may be represented by corresponding band widths of increasing width and corresponding band depths of decreasing depth. For example, as a user alternates between corresponding modes of operation, the beam pattern emitted by the lighting system will appear to transform from a high intensity spot photometric distribution to a high intensity flood photometric distribution, or from a high intensity flood photometric distribution to a high intensity spot photometric distribution, with incremental changes in photometric distribution therebetween (e.g., the medial photometric distribution). The transformation may occur with eight beam patterns as exemplified in FIGS. 20A-20H, however, a person of ordinary skill in the art will appreciate that fewer or greater modes of operation may be employed to enable the transformation to occur more abruptly or more gradually as a user cycles through corresponding modes of operation. For example, as previously discussed a mechanical configuration may enable instantaneous adjustment of beam pattern rather than the incremental approach exemplified in FIGS. 20A-20H as might be possible with a solid state system (e.g., no moving parts).

FIGS. 21A-27D illustrate various menu screens of a software application 2100 (e.g., an app) which may be used to program and/or control a lighting system (e.g., lighting system 100 of FIG. 1) in accordance with at least some of the principles described herein. The app may be operable and/or navigable on any suitable electronic device (e.g., laptops, desktops, radios, GPS modules), and further may be particularly suited for electronic devices having touch screens (e.g., cellular phones, electronic tablets, MP3 players having touch capabilities, etc.). For example, software application 2100 may enable a user to adjust photometric distribution and other operational features during use of a lighting system (e.g., lighting system 100 of FIG. 1) and/or may enable a user to program settings and features when the lighting system is not in use.

FIG. 21A may represent a main menu screen 2101 (e.g., a home screen) of the app. The main menu screen 2101 may include a welcome message 2102, such as "WELCOME NAME1", where "NAME1" may be a user name which may be programmable in a submenu (e.g., in menu 2510 exemplified in FIG. 25B). Further, the menu of FIG. 21A may include one or more user selection features (e.g., features 2103-2106), each of which when selected may open a corresponding submenu. For example, a first user selection feature 2103 may open a first submenu (e.g., beam settings menu screen 2110 of FIG. 21B). In another example, a second user selection feature 2104 may open a second submenu (e.g., media settings menu screen 2420 of FIG. 24C). In another example, a third user selection feature 2105 may open a third submenu (e.g., network settings menu screen 2430 of FIG. 24D). In another example, a fourth user selection feature 2106 may open a fourth submenu (e.g., security settings menu screen 2510 of FIG. 25B. Main menu screen 2101 may include one or more additional user selection features to enable access to programmable features of a lighting device in one or more submenus. Furthermore, main menu screen 2101 may have an "OFF" feature (e.g., sleep feature 2199), which may enable a user to turn off app 2100 and/or cause the screen to be tinted or otherwise darkened.

The menu of FIG. 21A may further include one or more power selection features (e.g., features 2107-2109), each of which when selected may enable a power setting of the lighting system. For example, a first power selection feature 2107 (e.g., "ON") may activate the lighting system, such that light may be emitted therefrom at a normal power setting in any active mode of operation (e.g., a power switch). The lighting system may emit light in accordance with the last used mode of operation (e.g., based on memory contained within a lighting device, and/or within a controller), may emit light in accordance with a preset setting, and/or may emit light in accordance with a default setting. In another example, a second power selection feature 2108 (e.g., "DIM") may activate the lighting system, such that light may be emitted therefrom at some fraction of the normal power level (e.g., a dimmer switch). For example, the fraction of normal power may be between about 15 percent and about 85% of normal power (e.g., about 50 percent). In another example, a third power selection feature 2109 (e.g., "OFF") may deactivate the lighting system by stopping the supply of power thereto, such that no light may be emitted therefrom (e.g., a kill switch).

The power selection features have been exemplified on every menu of FIGS. 21A-27D, to enable a user of the app to always have quick access to the power selection features to enable a lighting device to be turned on, off, or dimmed quickly in response to environmental conditions or user preference. In another example, one or more user selection features may be included on every menu to facilitate easier navigation between submenus. In another example, no user or power selection features may appear on every menu. In another example, no user or power selection features may appear on any menu. Furthermore, the order and placement of the power selection features and/or user selection features may be configured to facilitate ease of use by a user of app 2100. For example, one or more of the power selection features and/or user selection features may be larger, similarly sized, and/or smaller than others of the power selection features and/or user selection features. In another example, one or more power selection features (e.g., third power selection feature 2109) may be configured near a perimeter of a screen area of app 2100, so that a user can easily drag his/her finger to a position to quickly adjust the power settings of the lighting device.

FIG. 21B may represent a beam settings menu screen 2110 (e.g., "BEAM SETTINGS") of the app 2100 (e.g., navigable by selecting user selection feature 2103 from menu 2101 of FIG. 21A). Beam settings menu screen 2110 may include the one or more power selection features (e.g., features 2107-2109 of FIG. 21A), which may appear in the same configuration as presented in FIG. 21A and may have an identical functionality. Further, beam settings menu screen 2110 may include one or more mode selection features (e.g., features 2111-2116) which may enable user selection of one or more modes of operation corresponding to one or more modes of operation of a lighting device. Further, beam settings menu screen 2110 may include one or more port selection features 2117, wherein each port selection feature 2117 may open a corresponding submenu with additional selection features (e.g., port settings menu screen 2120 of FIG. 21C). Further, beam settings menu screen 2110 may include a return feature (e.g., main menu feature 2198), which may enable a user to return to main menu screen 2101.

The one or more mode selection features 2111-2116 may be configured as a vertical list, such that the user may select one feature from the list by sliding a selector bubble 2118 to the desired mode selection feature (e.g., one of features 2111-2116). Mode selection features 2111-2116 may include a first mode selection feature 2111 (e.g., "PLAY"), which may correspond to a mode enabling the user to play around with settings without saving settings, a second mode selection feature 2112 (e.g., "AUTO"), which may correspond to a mode enabling the lighting system to automatically adjust modes in accordance with sensed vehicle parameters and/or with sensed environmental conditions, a third mode selection features 2113 (e.g., "PRESET 1", "PRESET 2", and/or "PRESET 3"), which may correspond to modes wherein settings may be set by the user and saved for later use, a fourth mode selection feature 2114 (e.g., "STREET"), which may correspond to a mode wherein light emissions are in compliance with industry and/or government regulations, a fifth mode selection feature 2115 (e.g., "STROBE"), which may correspond to a mode enabling user defined strobing of the lighting system, and/or a sixth mode selection feature 2116 (e.g., "MUSIC"), which may enable intermittent activation of the lighting system based on a musical input.

A person of ordinary skill in the art will appreciate that greater or fewer mode selection features may be possible in light of the principles of the present invention described herein. Furthermore, while the mode selection features have been exemplified in a particular manner, and have been made selectable in a particular manner, a person of ordinary skill in the art will appreciate that other methods may be utilized to represent the mode selection features. Further, the mode selection features may include additional modes as described in other embodiments of the present invention and/or additional modes known to a person of ordinary skill in the art.

The port selection features 2117 of FIG. 21B may correspond to physical ports on a primary controller (e.g., ports 1839 of primary controller 1830 of FIG. 18), on a secondary controller (e.g., ports 1859 of secondary controller 1850 of FIG. 18), and/or on a lighting system (e.g., ports 1819 of lighting system 1810 of FIG. 18), such that each port selection feature 2117 may open a corresponding submenu for enabling the user to define settings for a lighting system electrically connected to the corresponding physical port (e.g., a port selection feature and corresponding submenu may exist for each physical port). For example, a first of the port selection features 2117 (e.g., "PORT 1") may open a first submenu of the beam settings menu screen 2110 (e.g., port settings menu screen 2120 of FIG. 21C), and may enable configuration of settings corresponding to a lighting system electrically connected to a corresponding physical port of either the primary controller, the secondary controller, and/or the lighting system. In another example, a user may select the first port selection feature (e.g., "PORT 1") and a port program feature 2119 (e.g., "SET") to open the first submenu. In another example, a user may press-and-hold the first port selection feature (e.g., "PORT 1") to open the first submenu.

The availability of each port selection feature 2117 may vary based on whether a lighting system is electrically connected to the corresponding physical port of the primary controller. For example, if no lighting systems are electrically connected to ports 4-8 of a primary controller, secondary controller, or lighting system, then port selection features 4-8 in the beam settings menu screen 2110 may be shaded, phantomed, removed, or their appearance may be otherwise affected to convey to the user that they are not available for selection.

Further, the availability of each port selection feature 2117 may vary based on the selected mode selection feature (e.g., one of features 2111-2116). For example, when the first mode selection feature 2111 (e.g., "PLAY") is selected, any of port selection features 2117 may be available for user selection.

In another example, when the second mode selection feature 2112 (e.g., "AUTO") is selected, none of port selection features 2117 may be available, since the lighting system may determine its own operating parameters based on sensor inputs (e.g., from sensors 1941-1946 of FIG. 19). In another example, the user may select the port program feature 2119 (e.g., "SET") to open a second submenu of the beam settings menu screen 2110 (e.g., automatic mode settings menu screen 2300 of FIG. 23A).

In another example, when one of the third mode selection features 2113 (e.g., "PRESET 1", "PRESET 2", or "PRESET 3") is selected, any of port selection features 2117 may be available for user selection. Further, the user may program the selected preset mode selection feature by selecting which of each of port selection features 2117 to activate (e.g., selected port selection features may be illuminated or otherwise represented as distinctive to non-selected port selection features). Lighting systems corresponding to the activated/selected port selection features may be further configured by accessing their settings in a corresponding third submenu of the beam settings menu screen 2110 (e.g., port settings menu screen 2120 of FIG. 21C), by selecting the port program feature (e.g., "SET"), and/or by a press-and-hold depression of the port selection feature. A preset mode selection feature 2113 may activate one or more operational groups of LEDs operating at one or more power levels in a user selected mode of operation.

In another example, when the fourth mode selection feature 2114 (e.g., "STREET") is selected, none of port selection features 2117 may be available, since the lighting system may be programmed with operating parameters that are in compliance with industry and/or governmental regulations, such that the user may be prohibited from altering these settings. In another example, where lighting systems are built to stay within industry and/or governmental regulations, port selection features corresponding to these compliant lighting systems may remain accessible (e.g., available for selection, with corresponding fourth submenus of the beam settings menu screen 2110).

In another example, when a fifth mode selection feature 2115 (e.g., "STROBE") is selected, port selection features 2117 may be available for selection, but port settings menu screens (e.g., menu 2120 of FIG. 21C) may not be accessible. In another example, the port selection features 2117 may be accessible, but upon selection may direct the user to a fifth submenu of the beam settings menu screen 2110 (e.g., strobe rate settings menu screen 2400 of FIG. 24A). In another example, the user may select the port program feature (e.g., "SET") to open the fifth submenu (e.g., strobe rate settings menu screen 2400 of FIG. 24A). In another example, a press-and-hold depression of each port selection feature 2117 may open a corresponding fifth submenu of each port selection feature 2117.

In another example, when a sixth mode selection feature 2116 (e.g., "MUSIC") is selected, port selection features 2117 may be unavailable for selection, such that each lighting system may be operated in accordance with software logic which syncs the strobing of the lighting systems to a musical input (e.g., based on beat, tempo, amplitude, frequency, etc.). In another example, port selection features 2117 may remain accessible for selection. In another example, the user may select the port program feature (e.g., "SET") to open a sixth submenu of the veam settings menu screen 2110 (e.g., music settings menu screen 2410 of FIG. 24B). In another example, a press-and-hold depression of each port selection feature 2117 may open a corresponding sixth submenu of each port selection feature 2117.

FIG. 21C may represent a port settings menu screen 2120 (e.g., "PORT 1 MENU") of the app 2100 (e.g., navigable from the first port selection feature 2117, or "PORT 1", of FIG. 21B). The port settings menu screen 2120 may include one or more power selection features (e.g., features 2107-2109 of FIG. 21A), and further may include a name data field 2121 (e.g., "NAME2"), a type data field 2122 (e.g., "TYPE"), one or more beam selection features (e.g., features 2123, 2124), one or more corresponding beam program features (e.g., 2125, 2126), wherein each of the beam program features may open a corresponding submenu of the beam selection features, and/or one or more beam pattern selection features 2127 (e.g., "BEAM 1"-"BEAM 8").

Name data field 2121 (e.g., "NAME2") may be configured to enable user customization. For example, the user may select the default name (e.g., "PORT 1") and may enter a user specified name (e.g., using the device's onboard keyboard/keypad). Upon entering the user specified name, the user specified name may appear in the name data field 2121, in the menu heading (e.g., "PORT 1 MENU" may be converted to "USER SPECIFIED NAME MENU"), and/or in other areas of the software application (e.g., on the corresponding port selection feature 2117 on the beam settings menu screen 2110 of FIG. 21B).

The type data field 2122 (e.g., "TYPE") may be configured to enable the user to select one lighting system type from a list of known and/or preprogrammed lighting systems. For example, the user may select the default lighting system (e.g., "LIGHT SYS 1") and select a lighting system from the list of lighting systems. The beam selection features 2123, 2124, corresponding beam program features 2125, 2126, and/or beam pattern selection features 2127 may be available or unavailable based on which lighting system the user selected in type data field 2122. For example, the beam selection features 2123, 2124, corresponding beam program features 2125, 2126, and beam pattern selection features 2127 may be available for a lighting system of the present invention (e.g., a lighting system capable of providing primary light, backlighting, and variable beam capability, such as lighting system 100 of FIG. 1). In another example, only the beam selection features 2123, 2124, and corresponding beam program features 2125, 2126 may be available for a lighting system having primary and backlighting capability, but not having variable beam capability (e.g., having only one operational group of LEDs for primary light and one operational group of LEDs for backlighting). In another example, only the primary beam selection feature 2123 and corresponding beam program feature 2125 may be available for a lighting system emitting only primary, high-intensity light (e.g., white light, or light throughout the visible spectrum). In another example, only beam selection feature 2124 and corresponding beam program feature 2126 may be available for a lighting system emitting secondary, low-intensity light (e.g., non-white light, or light of a particular wavelength). Beam selection features 2123, 2124, beam program features 2125, 2126, and beam pattern selection features 2127 may be shaded, phantomed, removed, or their appearance may be otherwise affected to convey to the user that they are not available for selection.

While in a port settings menu screen 2120 (e.g., "PORT 1 MENU"), a user may select one or both of the beam selection features 2123, 2124 (e.g., "PRIMARY" and/or "BACKLITE") by sliding a corresponding selector bubble 2128 between "ON" and "OFF" positions. A person of ordinary skill in the art will appreciate that other button methods may be employed to enable the same functionality. Furthermore, when beam selection feature 2123 is in the "ON" position and/or when the lighting system selected in type data field 2122 is capable of variable beam capability, the beam pattern selection features 2127 (e.g., "BEAM 1"-"BEAM 8") may be made available (e.g., not shaded, phantomed, etc.). Thus, a user may select any one of the beam pattern selection features 2127 by sliding a corresponding selector bubble 2128 to the desired beam pattern selection feature (e.g., "BEAM 1" as exemplified in FIG. 21C). Each of beam pattern selection features 2127 may correspond to one or more modes of operation of a lighting system (e.g., as described with respect to FIG. 4 and/or corresponding to beam patterns 2010, 2020, 2030, 2040, 2050, 2060, 2070, and 2080 of FIG. 20).

A user may establish a preset (e.g., "PRESET 1", or one of mode selection features 2113 of FIG. 21B) by returning to the menu of FIG. 21B by using a return selection feature 2129 (e.g., "BACK"). While only discussed with reference to return selection feature 2129 of FIG. 21C (and exemplified in FIGS. 21C-27D), a person of ordinary skill in the art will appreciate that a similar return selection feature may be utilized on every submenu to enable a user to return to the previous submenu. In another example, the user may select beam program feature 2125 (e.g., "PROG") corresponding to beam selection feature 2123 to open a first submenu of port settings menu screen 2120 (e.g., primary program settings menu screen 2130 of FIG. 21D), which may be accessible for a lighting system of the present invention. In another example, the user may select beam program feature 2125 (e.g., "PROG") corresponding to the beam selection feature 2123 to open a second submenu of port settings menu screen 2120 (e.g., alternate primary program settings menu screen 2220 of FIG. 22C), which may be accessible for an auxiliary light fixture known in the art and not possessing the versatility of the present invention.

FIG. 21D may represent a primary program settings menu screen 2130 (e.g., "PRIMARY PROGRAM MENU 1") of app 2100 (e.g., navigable from beam program feature 2125 of FIG. 21C for a lighting system of the present invention). The primary program settings menu screen 2130 may include power selection features (e.g., features 2107-2109 of FIG. 21A) and further may include one or more beam setting features 2131 (e.g., "BEAM 1"-"BEAM 8"), which may correspond to beam pattern selection features 2127 of FIG. 21C. For example, a first beam setting feature (e.g., "BEAM 1") may open a first submenu of primary program settings menu screen 2130 (e.g., beam settings menu screen 2200 of FIG. 22A). While eight beam pattern selection features have been exemplified, greater or fewer beam pattern selection features may be utilized. Furthermore, the primary program settings menu screen may enable a user to add and/or delete beam setting features to optimize the number or corresponding beam pattern selection features 2127 in FIG. 21C, which may also update the number of beam pattern selection features available for selection another submenu (e.g., in port settings menu screen 2120 of FIG. 21C).

The primary program settings menu screen 2130 exemplified in FIG. 21D (e.g., "PRIMARY PROGRAM MENU 1") may only be available when a lighting system of the present invention is selected in the type data field. An alternate submenu (e.g., primary program settings menu screen 2220 of FIG. 22C) may be available for other lighting systems with reduced capability and/or versatility.

Figure 22B:
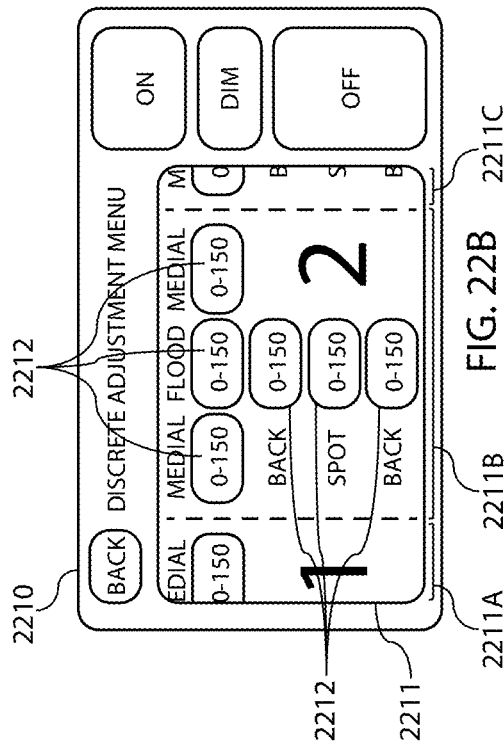
FIG. 22B illustrates a diagram of a software application menu screen.
Figure 22D:
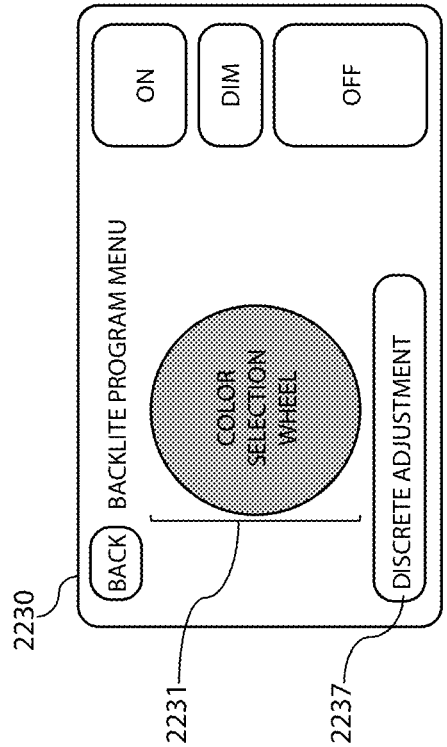
FIG. 22D illustrates a diagram of a software application menu screen.
Figure 22A:
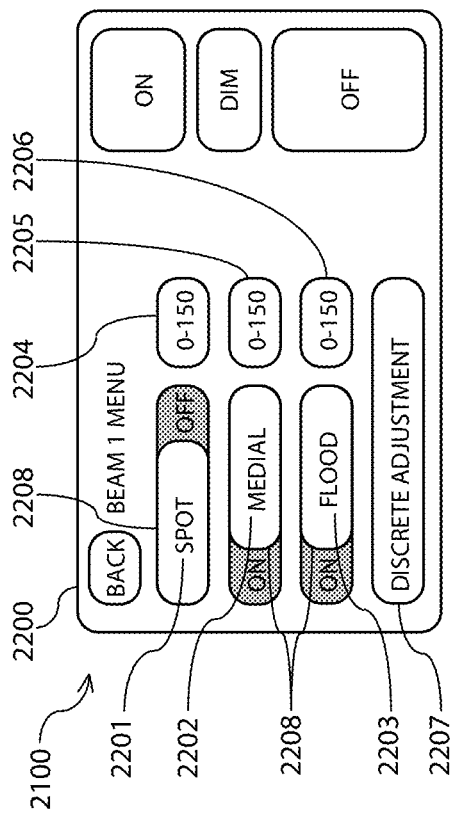
FIG. 22A illustrates a diagram of a software application menu screen.

FIG. 22A may represent a beam settings menu screen 2200 (e.g., "BEAM 1 MENU") of app 2100 (e.g., navigable from a first beam setting feature 2131, or "BEAM 1", of FIG. 21D for a lighting system of the present invention). The beam settings menu screen 2200 may include power selection features (e.g., features 2107-2109 of FIG. 21A) and further may include one or more functional group power selection features (e.g., spot feature 2201, medial feature 2202, and/or flood feature 2203), and/or a discrete adjustment feature 2207 (e.g., "DISCRETE ADJUSTMENT"). For example, the discrete adjustment feature 2207 may open a first submenu of beam settings menu screen 2200 (e.g., discrete adjustment settings menu screen 2210 of FIG. 22B). In other example, spot feature 2201 may correspond to and/or may control the operation of a first operational group of LEDs, medial feature 2202 may correspond to and/or may control the operation of a second operational group of LEDs, and flood feature 2203 may correspond to and/or may control the operation of a third operational group of LEDs (e.g., as described with reference to FIG. 4). In another example, beam settings menu screen 2200 may include fewer than three functional group power selection features (e.g, 1 or 2). In another example, beam settings menu screen 2200 may include greater than three functional group power selection features (e.g., 4, 5, 6, 7, or more).

Each of the functional group power selection features 2201-2203 may be capable of operating in an "ON and/or an "OFF" position. For example, each functional group power selection feature may be selected by sliding a corresponding selector bubble 2208 between "ON" and "OFF" positions. Other modes of selection may also be utilized. Further, each functional group power selection feature 2201-2203 may have a corresponding power level feature (e.g., features 2204-2206), which may be selectable to between about 0 percent and about 150 percent of a maximum luminous output (e.g., maximum luminous outputs described with reference to FIG. 4). For example, power level features 2204-2206 may be available (e.g., not represented in phantom) when corresponding functional group power selection features are in the "ON" position. In another example, the user may select a power level feature, and may scroll through a list of values to select a user defined luminous output value for one or more of the power level features 2204-2206. In another example, a user may use an onboard keypad of the electronic device running the app 2100 to designate a luminous output value. In another example, the user may be prevented from selecting high values in one power level feature where a high value has been selected in another power level feature (e.g., the sum total value of all power level features may not exceed a predefined value).

FIG. 22B may represent a discrete adjustment settings menu screen 2210 (e.g., "DISCRETE ADJUSTMENT MENU") of the app 2100 (e.g., navigable from discrete adjustment feature 2207 of FIG. 22A for a lighting system of the present invention). The discrete adjustment settings menu screen 2210 may include power selection features (e.g., features 2107-2109 of FIG. 21A) and further may include a virtual lighting device representation 2211, which may contain a block diagram of the lighting system of the present invention. For example, the block diagram may be partitioned into one or more optical set blocks 2211A-C corresponding to the number of optical sets in the lighting system (e.g., four optical sets for a lighting system having four optical sets 102 of FIG. 1) and/or corresponding to the number of LED sets in the lighting system (e.g., LED sets 402 of FIG. 4), with each optical set block 2211A-C including one or more LED power level features 2212 (e.g., labelled "FLOOD", "MEDIAL", "SPOT", and/or "BACK") corresponding to each physical LED (e.g., LEDs 471A-476D) configured on a PCBA (e.g., PCBA 470 of FIG. 4) of the lighting system.

For example, each functional group of LEDs of a lighting device may be represented by an LED power level feature. In another example, each LED of a lighting device may be represented by an LED power level feature. Therefore, for larger lighting devices, additional optical set blocks and/or additional LED power level features may necessitate smaller features and/or the ability to scroll between all available features. For example, virtual lighting device representation 2211 may be a scrollable menu (e.g., from left to right and/or from top to bottom), such that one or more of the optical set blocks may be accessible at a time, and a user may scroll to access other optical set blocks as desired (e.g., FIG. 22B exemplifies optical set block 2211B as available for selection, whereas optical set blocks 2211A and 2211C are only partially visible and/or available for selection. Further, each optical set block 2211A-C may be numbered and/or otherwise identified to enable a user to adequately identify each optical set block 2211A-C.

Each LED power level feature 2212 may be selectable to between about 0 percent and about 150 percent of a maximum luminous output. For example, LED power level features 2122 may be available when corresponding features are in the "ON" position (e.g., when functional group power selection features 2201-2203 of FIG. 22A are in the "ON" position. In another example, the user may select an LED power level feature 2212, and may scroll through a list of values to select a user defined value. In another example, a user may use an onboard keypad of the electronic device running the app 2100 to designate a value. In another example, the user may be prevented from selecting high values in one LED power level feature where a high value has been selected in another LED power level feature (e.g., the sum total value of all LED power level features may not exceed a predefined value).

Figure 22C:
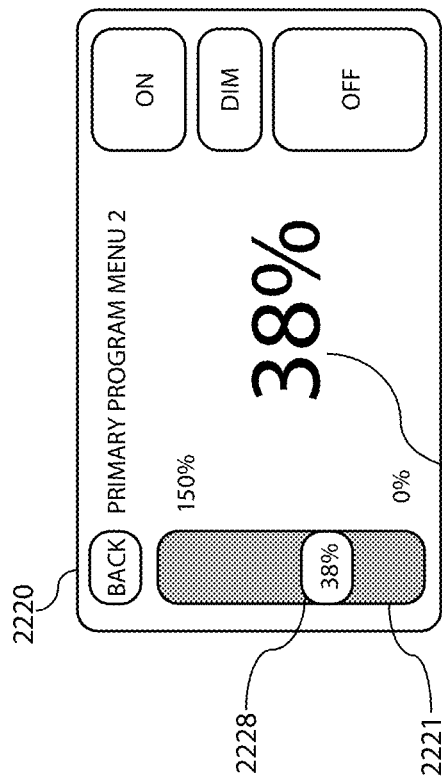
FIG. 22C illustrates a diagram of a software application menu screen.

FIG. 22C may represent an alternate primary program settings menu screen 2220 (e.g., "PRIMARY PROGRAM MENU 2") of the app 2100 (e.g., navigable from beam program feature 2125 of FIG. 21C for an auxiliary light fixture). Alternate primary program settings menu screen 2220 may include power selection features (e.g., features 2107-2109 of FIG. 21A) and may further include at least an auxiliary power level feature 2221. For example, a selector bubble 2228 may be slideable between about 0 percent and about 150 percent of the maximum luminous output of an auxiliary light fixture (e.g., 38 percent as illustrated in FIG. 22C). For example, the selected auxiliary power level may be displayed within selector bubble 2228. In another example, the selected auxiliary power level may be displayed elsewhere on the primary program settings menu (e.g., in large font, as indicated by 2223). Additional features of alternate primary program settings menu screen 2220 of FIG. 22C may vary based on the functional capabilities of the auxiliary light fixture (e.g., including one or more of the features available on other submenus of the present invention).

FIG. 22D may represent a backlite program settings menu screen 2230 (e.g., "BACKLITE PROGRAM MENU") of the app 2100 (e.g., navigable from beam program feature 2126 of FIG. 21C for a lighting system of the present invention and/or for an auxiliary light fixture having backlighting capabilities). The backlite program settings menu screen 2230 may include power selection features (e.g., features 2107-2109 of FIG. 21A) and may further include a color selection feature 2231 (e.g., "COLOR SELECTION WHEEL" or circular array of colors) and/or a discrete adjustment feature 2237 (e.g., "DISCRETE ADJUSTMENT"). For example, color selection feature 2231 may be a color wheel exhibiting a range of color selection options. In another example, color selection feature 2231 may include one or more color bars (not shown). In another example, the discrete adjustment feature may open a first submenu of backlite program settings menu screen 2230 (e.g., discrete adjustment settings menu screen 2210 of FIG. 22B).

The color selection feature 2231 may enable the user to select a desired backlighting color. For example, a user may select a color by touching color selection feature 2231 at a position corresponding to the desired backlighting color. In another example, a suer may select a color by scrolling through a range of color options. Other color selection methods may be utilized. The selected backlighting color may be displayed in the backlite program settings menu screen 2230 and/or may be exhibited by the corresponding LEDs (e.g., LEDs 475A-476A of FIG. 4) of the lighting system.

FIG. 23A may represent an automatic mode settings menu screen 2300 (e.g., "AUTO MODE MENU") of app 2100 (e.g., navigable from features 2112 and/or 2119 of FIG. 21B for a lighting system). The automatic mode settings menu screen 2300 may include power selection features (e.g., features 2107-2109 of FIG. 21A) and may further include one or more detection selection features (e.g., features 2301-2304). While four detection selection features have been exemplified in FIG. 23A, a person of ordinary skill in the art will appreciate that greater or fewer detection selection features may be utilized.

For example, each of the detection selection features 2301-2304 may be selected by sliding a corresponding selector bubble 2308 between "ON" and "OFF" positions. A person of ordinary skill in the art will appreciate that other button methods may be employed to enable the same functionality. Further, one or more detection selection features 2301-2304 may have corresponding detection program features (e.g., detection program features 2305-2307). For example, the user may select a first detection program feature 2305 (e.g., "PROG") corresponding to a first detection selection feature 2301 (e.g., "DIRECTION") to open a first submenu of automatic mode settings menu screen 2300 (e.g., direction detection settings menu screen 2310 of FIG. 23B). Detection selection feature 2301 may correspond to functions and operations described with respect to a first sensor of the present invention (e.g., sensor 1942 of FIG. 19).

In another example, the user may select a second detection program feature 2306 (e.g., "PROG") corresponding to a second detection selection feature 2302 (e.g., "GLARE") to open a second submenu of automatic mode settings menu screen 2300 (e.g., glare detection settings menu screen 2320 of FIG. 23C). Detection selection feature 2302 may correspond to functions and operations described with respect to a second sensor of the present invention (e.g., sensor 1943 of FIG. 19). In another example, the user may select a third detection program feature 2307 (e.g, "PROG") corresponding to a third detection selection feature 2303 (e.g., "OBJECT") to open a third submenu of automatic mode settings menu screen 2300 (e.g., object detection settings menu screen 2330 of FIG. 23D). Detection selection feature 2303 may correspond to functions and operations describe with respect to a third sensor of the present invention (e.g., sensor 1944 of FIG. 19). In another example, at least one detection selection feature 2304 (e.g., "VISION") may not have a corresponding detection program feature. Detection selection feature 2304 may correspond to functions and operations describe with respect to a fourth sensor of the present invention (e.g., sensor 1945 of FIG. 19). In another example, all detection selection features may have a corresponding detection program feature. In another example, none of the detection selection features may have a corresponding detection program feature.

FIG. 23B may represent a direction detection settings menu screen 2310 (e.g., "DIRECTION DETECTION") of app 2100 (e.g., navigable from detection selection feature 2301 and/or detection program feature 2305 of FIG. 23A for a lighting system). The direction detection settings menu screen 2310 may include power selection features (e.g., features 2107-2109 of FIG. 21A) and may further include one or more direction selection features (e.g., features 2311-2313). Each of the direction selection features 2311-2313 may be selected by sliding a corresponding selector bubble 2318 between "ON" and "OFF" positions. A person of ordinary skill in the art will appreciate that other button methods may be employed to enable the same functionality.

FIG. 23C may represent a glare detection settings menu screen 2320 (e.g., "GLARE SENSITIVITY") of app 2100 (e.g., navigable from detection selection feature 2302 and/or detection program feature 2306 of FIG. 23A for a lighting system). The glare detection settings menu screen 2320 may include power selection features (e.g., features 2107-2109 of FIG. 21A) and may further include at least a first sensitivity level feature 2321 to enable a user to select a glare sensitivity value. For example, a selector bubble 2328 may be slideable between about 0 percent and about 100 percent of a maximum sensitivity of a first sensor (e.g., glare sensor 1943 of FIG. 19) of the lighting system (e.g., such as 74 percent as illustrated in FIG. 23C). For example, the selected sensitivity value may be displayed within selector bubble 2228. In another example, the selected sensitivity level may be displayed elsewhere on the glare detection settings menu (e.g., in large font, as indicated by 2323). Glare detection settings menu screen may include additional sensitivity level features. For example, a second sensitivity level feature may enable adjustment and/or selection of sensitivity with respect to certain wavelengths of light and/or wavelengths within a certain range of wavelengths (e.g., within the visible spectrum, infrared, ultraviolet, etc.).

FIG. 23D may represent an object detection settings menu screen 2330 (e.g., "OBJECT DETECTION") of app 2100 (e.g., navigable from detection selection feature 2303 and/or detection program feature 2307 of FIG. 23A for a lighting system). The object detection settings menu screen 2330 may include power selection features (e.g., features 2107-2109 of FIG. 21A) and may further include one or more object selection features 2331-2333 (e.g., "ALARM", "OBJECT LIGHT INCREASE", and/or "FACIAL LIGHT DECREASE"). Nevertheless, a person of ordinary skill in the art will appreciate that additional object selection features may be utilized in accordance with principles of the present invention. Each of the object selection features 2331-2333 may be selected by sliding a corresponding selector bubble 2338 between "ON" and "OFF" positions. A person of ordinary skill in the art will appreciate that other button methods may be employed to enable the same functionality.

Figure 24B:
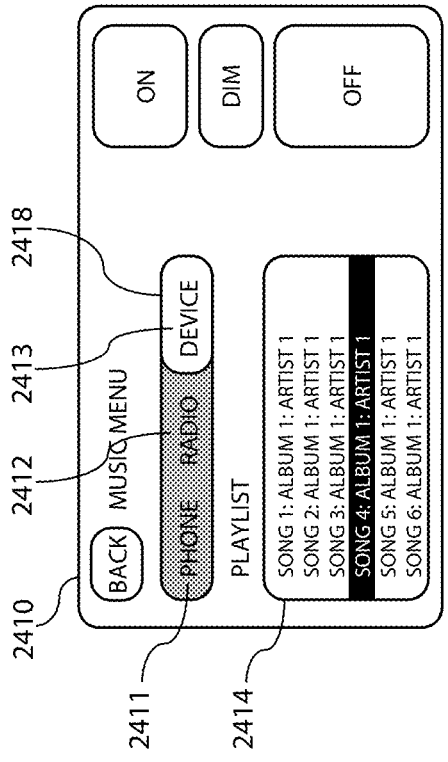
FIG. 24B illustrates a diagram of a software application menu screen.
Figure 24D:
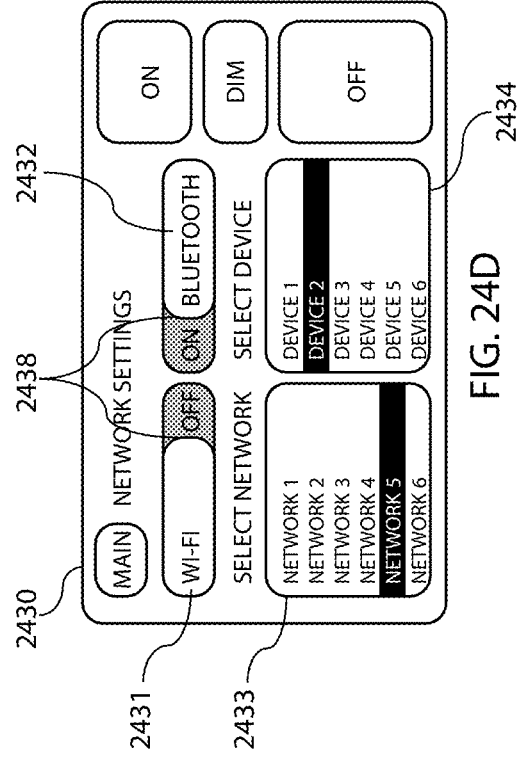
FIG. 24D illustrates a diagram of a software application menu screen.
Figure 24A:
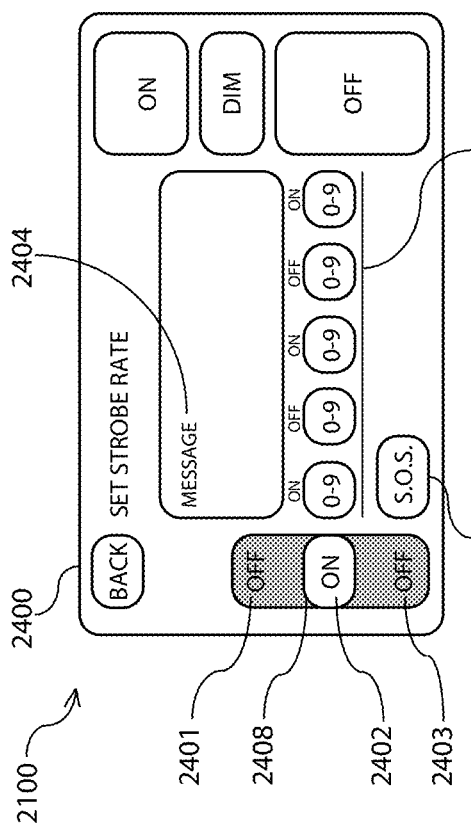
FIG. 24A illustrates a diagram of a software application menu screen.

FIG. 24A may represent a strobe rate settings menu screen 2400 (e.g., "SET STROBE RATE") of app 2100 (e.g., navigable from features 2115 and/or 2119 of FIG. 21B for a lighting system of the present invention and/or an auxiliary light fixture). The strobe rate settings menu screen 2400 may include power selection features (e.g., features 2107-2109 of FIG. 21A) and may further include one or more strobe selection features (e.g., features 2401-2403). While three strobe selection features have been exemplified in FIG. 24A, a person of ordinary skill in the art will appreciate that greater or fewer strobe selection features may be utilized.

For example, a first strobe selection feature 2401 may enable a user to enter a message 2404 (e.g., such as a string of text), which when selected may be converted into Morse code, such that the strobe rate of the lighting system may be a coded message. In another example, a second strobe selection feature 2402 may enable a user to design a custom strobe rate by selecting one or more custom strobe features 2405. For example, a user may select one or more custom strobe features 2405 (e.g., 1, 2, 3, 4, 5, as exemplified in FIG. 24A, or more) and may select an interval of between about 0.0 seconds and about 9.0 seconds for each custom strobe feature 2405. In another example, one or more custom strobe features 2405 may represent an "ON" condition of the lighting system, and one or more custom strobe features 2405 may represent an "OFF" condition of the lighting system (e.g., as indicated in FIG. 24A). In another example, a third strobe selection feature 2403 may enable a user to select a default strobe setting 2406 (e.g., "S.O.S."). One of the strobe selection features 2401-2403 may be selected by sliding a selector bubble 2408 between strobe selection features 2401, 2402, and/or 2403. A person of ordinary skill in the art will appreciate that other button methods may be employed to enable the same functionality.

FIG. 24B may represent a music settings menu screen 2410 (e.g., "MUSIC MENU") of app 2100 (e.g., navigable from features 2116 and/or 2119 of FIG. 21B for a lighting system of the present invention and/or an auxiliary light fixture). The music settings menu screen 2410 may include power selection features (e.g., features 2107-2109 of FIG. 21A) and may further include one or more device selection features (e.g., features 2411-2413).

One of the device selection features 2411-2413 may be selected by sliding a selector bubble 2418 between device selection features. A person of ordinary skill in the art will appreciate that other button methods may be employed to enable the same functionality (e.g., as exemplified with network and device selection features 2431, 2432 of FIG. 24D). A playlist feature 2414 may be populated based on the user selected device selection feature (e.g., one of features 2411-2413). For example, a first device selection feature 2411 (e.g., "PHONE") may cause the playlist feature 2414 to be populated by audio recordings accessible from a first source (e.g., stored on a cellular phone wirelessly and/or wire connected to the control system, such as control system 1830 of FIG. 18) which controls the lighting system. The user may scroll through the audio recordings and/or select an audio recording to initiate a sync between the selected audio recording and the operation of the lighting system. In another example, a second device selection feature 2412 (e.g., "RADIO") may cause music from a second source (e.g., the radio) to be synced with the operation of the lighting system. In another example, a third device selection feature 2413 (e.g., "DEVICE") may cause the playlist feature 2414 to be populated by audio recordings from a third source (e.g., stored on the device, such as from an MP3 player, or any other device including audio recordings).

Figure 24C:
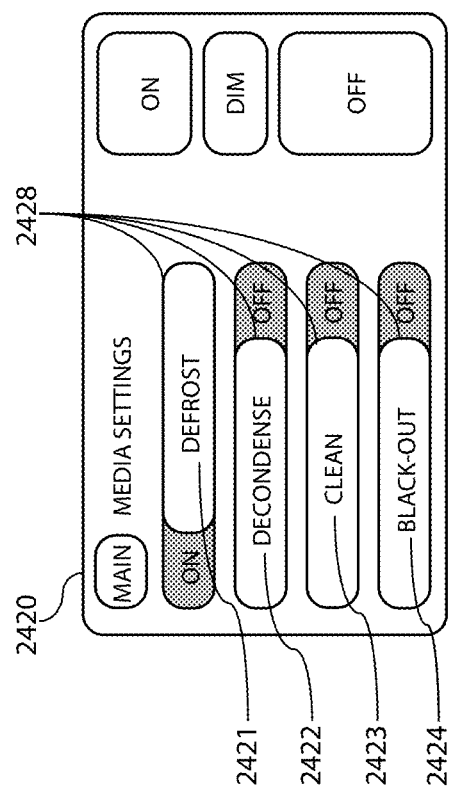
FIG. 24C illustrates a diagram of a software application menu screen.

FIG. 24C may represent a media settings menu screen 2420 (e.g., "MEDIA SETTINGS") of app 2100 (e.g., navigable by selecting user selection feature 2104 of FIG. 21A for a lighting system). The media settings menu screen 2420 may include the one or more power selection features (e.g., features 2107-2109 of FIG. 21A), and further may include one or more lens selection features 2421-2424 (e.g., "DEFROST", "BLACK OUT", "DECONDENSE", and/or "CLEAN"). While four lens selection features have been exemplified in FIG. 24C, a person of ordinary skill in the art will appreciate that greater or fewer lens selection features may be utilized.

Each of the lens selection features may be selected by sliding a corresponding selector bubble 2428 between "ON" and "OFF" positions. A person of ordinary skill in the art will appreciate that other button methods may be employed to enable the same functionality. For example, a first lens selection feature 2421 (e.g., "DEFROST") may be selected to cause a first moisture removal element (e.g., as describe with reference to FIG. 1) to defrost a media (e.g., media 140 of FIG. 1) of the lighting system. In another example, a second lens selection feature 2422 (e.g., "DECONDENSE") may be selected to cause a second moisture removal element (e.g., as describe with reference to FIG. 1) to decondense the media of the lighting system. In another example, a third lens selection feature 2423 (e.g., "CLEAN") may be selected to cause a particulate removal system (e.g., as describe with reference to FIG. 1) to clean the media of the lighting system. In another example, a fourth lens selection feature 2424 (e.g., "BLACK-OUT") may be activated to cause a switchable material (e.g., as describe with reference to FIG. 1) of the media to switch from an opaque or translucent state to a transparent state, or to switch from a transparent state to an opaque or translucent state, or to switch from a translucent state to an opaque state, or to switch from an opaque state to a translucent state.

FIG. 24D may represent a network settings menu screen 2430 (e.g., "NETWORK SETTINGS") of app 2100 (e.g., navigable by selecting user selection feature 2105 of FIG. 21A for a lighting system). The network settings menu screen 2430 may include the one or more power selection features (e.g., features 2107-2109 of FIG. 21A), may include one or more network selection features (e.g., feature 2431), and further may include one or more device selection features (e.g., feature 2432).

Each of the network and/or device selection features 2431, 2432 may be selected by sliding a corresponding selector bubble 2438 between "ON" and "OFF" positions. A person of ordinary skill in the art will appreciate that other button methods may be employed to enable the same functionality (e.g., as exemplified with device selection features 2411-2413 of FIG. 24B). For example, a network selection feature 2431 (e.g., "WI-FI") may be selected, such that a corresponding network list feature 2433 (e.g., a WI-FI network) is populated with all detected networks (e.g., those within a detectable range). The user may select the desired network to join from the network list feature 2433, and upon selection of a desired network a first submenu of network settings menu screen 2430 may open (e.g., password entry menu screen 2500 of FIG. 25A). In another example, a device selection feature 2432 (e.g., "BLUETOOTH") may be selected, such that a corresponding device list feature 2434 (e.g., Bluetooth) is populated with all detected and capable devices (e.g., those within a detectable range). The user may select the desired device or devices from the device list feature 2434, and upon doing so may be prompted for credentials (not shown).

Figure 25B:
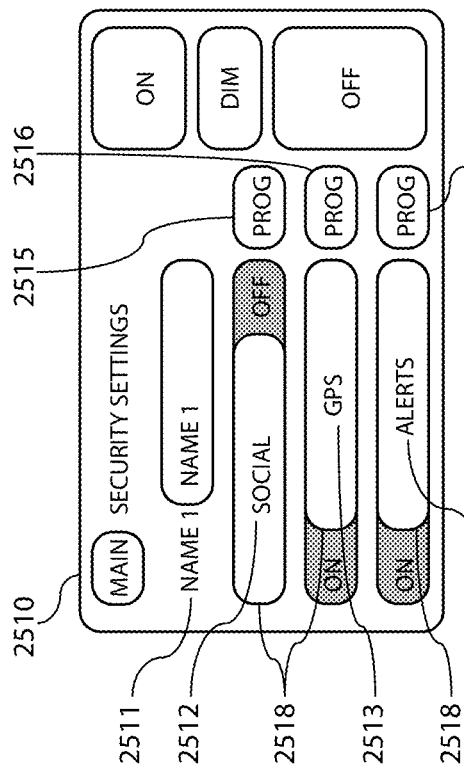
FIG. 25B illustrates a diagram of a software application menu screen.
Figure 25D:
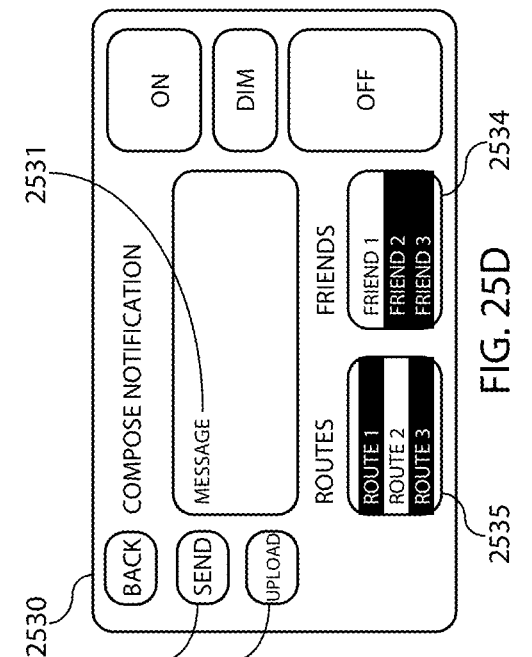
FIG. 25D illustrates a diagram of a software application menu screen.
Figure 25A:
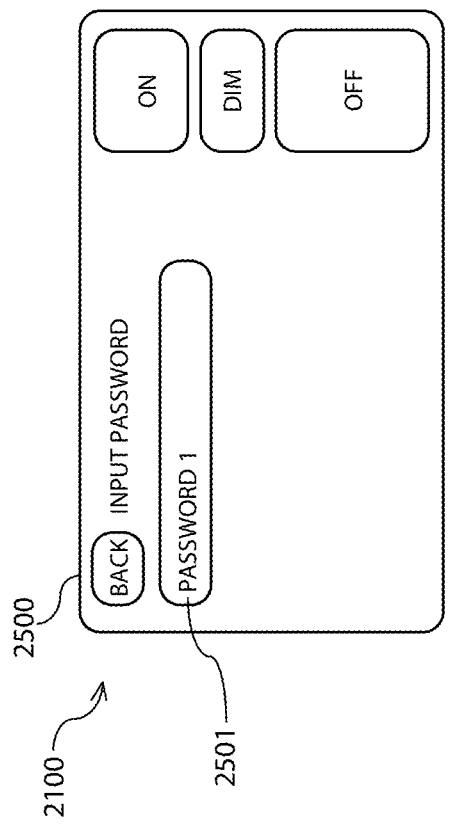
FIG. 25A illustrates a diagram of a software application menu screen.

FIG. 25A may represent a password entry menu screen 2500 (e.g., "INPUT PASSWORD") of app 2100 (e.g., navigable by selecting a wireless network to join from the network selection feature 2431 of FIG. 24D for a lighting system). The password entry menu screen 2500 may include the one or more power selection features (e.g., features 2107-2109 of FIG. 21A), and further may include a password data field 2501 (e.g., "PASSWORD 1"). The user may select the password data field 2501, and may enter the appropriate password (e.g., using the device's onboard keyboard/keypad not shown). Upon entering the correct password, the user may be returned to the previous menu (e.g., network settings menu screen 2430).

FIG. 25B may represent a security settings menu screen 2510 (e.g., "SECURITY SETTINGS") of app 2100 (e.g., navigable by selecting user selection feature 2106 of FIG. 21A for a lighting system). The security settings menu screen 2510 may include the one or more power selection features (e.g., features 2107-2109 of FIG. 21A), and further may include a name data field 2511 (e.g., "NAME1") and/or one or more security selection features (e.g., features 2512-2514). Any one or more of the name data field 2511 and/or the security selection features 2512-2514 may be password protected (e.g., using the password entry menu screen exemplified in FIG. 25A), and/or the security settings menu screen 2510 may be password protected in like manner. While three security selection features have been exemplified in FIG. 25B, a person of ordinary skill in the art will appreciate that greater or fewer security selection features may be utilized.

The name data field 2511 (e.g., "NAME1") may be configured to enable user customization. For example, the user may select the default name (e.g., "NAME 1") and enter a user specified name (e.g., using the device's onboard keyboard/keypad not shown). Upon entering the user specified name, the user specified name may appear in the name data field 2511, and/or in the welcome message on the menu of FIG. 21A (e.g., "WELCOME NAME 1" may be converted to "WELCOME USER SPECIFIED NAME"). The user specified name may be used in other submenus of app 2100.

Each of the security selection features 2512-2514 may be selected by sliding a corresponding selector bubble 2518 between "ON" and "OFF" positions. A person of ordinary skill in the art will appreciate that other button methods may be employed to enable the same functionality. Further, each of the security selection features 2512-2514 may have a corresponding security program feature (e.g., features 2515-2517). For example, a first security program feature 2515 (e.g., "PROG") corresponding to a first security selection feature 2512 (e.g., "SOCIAL") may open a first submenu of security settings menu screen (e.g., social settings menu screen 2520 of FIG. 25C). In another example, first security program feature 2515 may enable a user to interface with social media platforms already available in commerce and/or social media platforms for which user has an established user account and login credentials. In another example, a second security program feature 2516 (e.g., "PROG") corresponding to a second security selection feature 2513 (e.g., "GPS") may open a second submenu (e.g., GPS settings menu screen 2600 of FIG. 26A). In another example, a third security program feature 2517 (e.g., "PROG") corresponding to a third security selection feature 2514 (e.g., "ALERTS") may open a third submenu (e.g., alert settings menu screen 2700 FIG. 27A). Any one or more of the security program features 2515-2517 may be password protected (e.g., using the password entry menu screen exemplified in FIG. 25A).

Figure 25C:
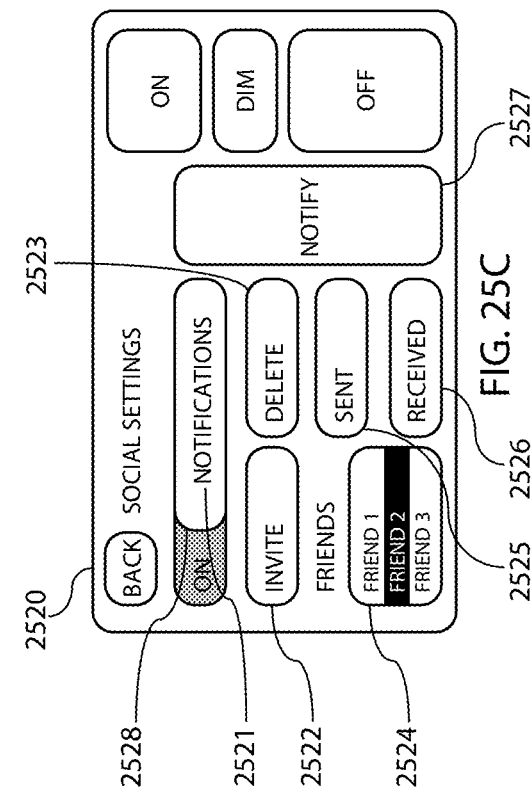
FIG. 25C illustrates a diagram of a software application menu screen.

FIG. 25C may represent a social settings menu screen 2520 (e.g., "SOCIAL SETTINGS") of app 2100 (e.g., navigable by selecting security program feature 2515 of FIG. 25B for a lighting system). The social settings menu screen 2520 may include the one or more power selection features (e.g., features 2107-2109 of FIG. 21A), and further may include a notifications selection feature 2521 (e.g., "FOTIFICATIONS"), one or more friend features (e.g., features 2522, 2523), and/or one or more mail features (e.g., features 2525-2527).

The notifications selection feature 2521 may be selected by sliding a selector bubble 2528 between "ON" and "OFF" positions. A person of ordinary skill in the art will appreciate that other button methods may be employed to enable the same functionality. The user may select a first friend feature 2522 (e.g., "INVITE") to enter a submenu (not shown) which may, for example, populate with the name data field (e.g., "NAME 1") of all other control systems within an operable range of a wireless module (e.g., wireless module 1837 of FIG. 18) of the present invention. In another example, the first friend feature 2522 may interface with social media platforms already available in commerce and/or social media platforms for which user has an established user account and login credentials. The user may grant friend status to other control systems, and may receive friend status from other control systems. Once friend status has been obtained, friends may be populated on a friend list feature 2524 (e.g., "FRIENDS" as exemplified in FIG. 25C). The user may delete a friend by selecting the desired friend (e.g., friend 2) in the friend list feature 2524 and may further select a second friend feature 2523 (e.g., "DELETE").

The user may utilize the mail features of the social settings menu screen 2520 to send and receive notifications (e.g., messages, texts, emails). For example, the user may review sent notifications by selecting a first mail feature 2525 (e.g., "SENT"). In another example, the user may review received notifications by selecting a second mail feature 2526 (e.g., "RECEIVED"). In another example, the user may compose notifications by selecting a third mail feature 2527 (e.g., "NOTIFY"), which may open a first submenu of social settings menu screen 2520 (e.g., notification settings menu screen 2530 of FIG. 25D). The notification capabilities describe herein may be one example of the communication between wireless modules of a plurality of control systems as discussed with reference to FIG. 18).

FIG. 25D may represent a notification settings menu screen 2530 (e.g., "COMPOSE NOTIFICATION") of app 2100 (e.g., navigable by selecting third mail feature 2527 of FIG. 25C for a lighting system). The notification settings menu screen 2530 may include the one or more power selection features (e.g., features 2107-2109 of FIG. 21A), and further may include a message data field 2531 (e.g., for composing text strings), a route list feature 2535 (e.g., "ROUTES" corresponding to route list feature 2615 of FIG. 26B), a friend list feature 2534 (e.g., "FRIENDS" corresponding to friend list feature 2524 of FIG. 25C), and/or one or more delivery features (e.g., features 2532, 2533). For example, route list feature 2535 may be populated by data entered in route list feature 2615 of FIG. 26B. In another example, friend list feature 2534 may be populated by data entered in friend list feature 2524 of FIG. 25C.

A user may compose a notification by typing a message in message data field 2531 (e.g., with an onboard keyboard/keypad), and/or by selecting one or more saved routes from the route list feature 2535, then by selecting one or more friends from the friend list feature 2534. Accordingly a notification may require at least a message and/or a selected route. The notification may be sent by selecting a first delivery feature 2532 (e.g., "SEND") to send the notification to selected friends, and/or may be sent by selecting a second delivery feature 2533 (e.g., "UPLOAD") to upload the notification to one or more social media platforms (not shown). Selecting the second delivery feature 2533 may open a platform selection menu (not shown) wherein the user may select for which social media platform, blog, and/or website to upload the notification.

Figure 26B:
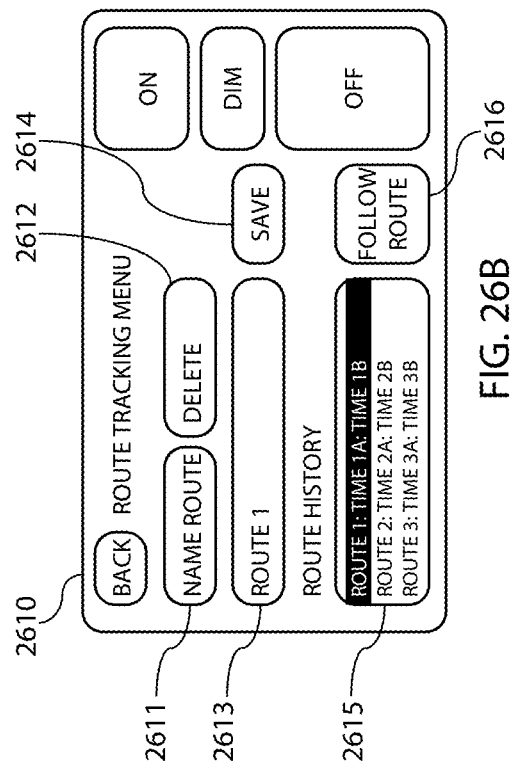
FIG. 26B illustrates a diagram of a software application menu screen.
Figure 26D:
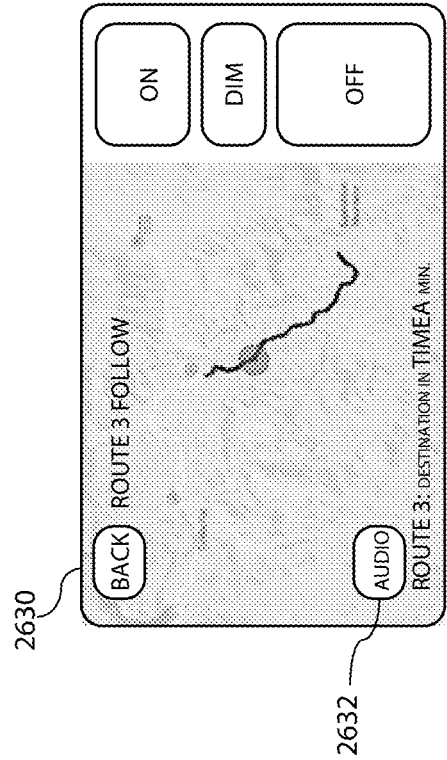
FIG. 26D illustrates a diagram of a software application menu screen.
Figure 26A:
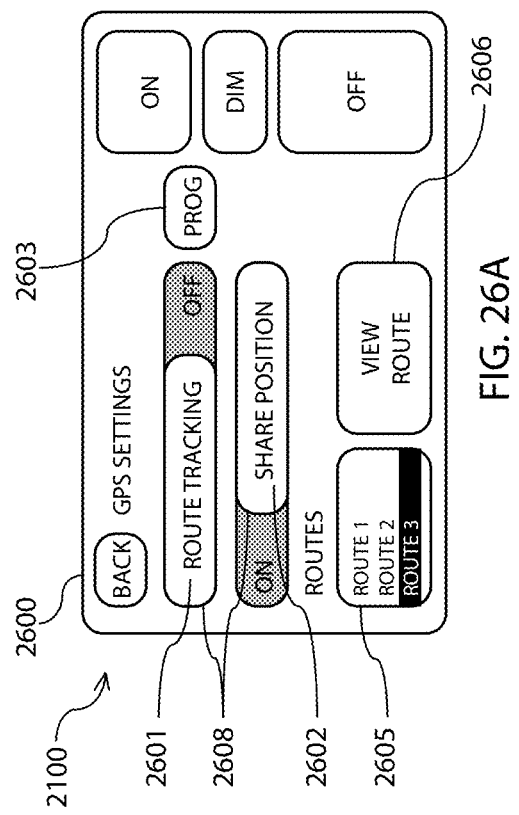
FIG. 26A illustrates a diagram of a software application menu screen.

FIG. 26A may represent a GPS settings menu screen 2600 (e.g., "GPS SETTINGS") of app 2100 (e.g., navigable by selecting security program feature 2516 of FIG. 25B for a lighting system). The GPS settings menu screen 2600 may include the one or more power selection features (e.g., features 2107-2109 of FIG. 21A), and further may include one or more GPS selection features (e.g., features 2601, 2602) and/or a route list feature 2605 (e.g., "ROUTES" corresponding to and/or being populated by data from route list feature 2615 of FIG. 26C).

The GPS selection features 2601, 2602 may be selected by sliding a selector bubble 2608 between "ON" and "OFF" positions. A person of ordinary skill in the art will appreciate that other button methods may be employed to enable the same functionality. For example, the user may start a new route by selecting (into an "ON" position) a first GPS selection feature 2601 (e.g., "ROUTE TRACKING"), and the user may complete the new route by selecting (into an "OFF" position) the first GPS selection feature 2601. In another example, the user may make positioning data of his control system and/or lighting system available to friends and/or emergency personnel by selecting a second GPS selection feature 2602 (e.g., "SHARE POSITION").

Further, one or more of the GPS selection features may have a corresponding GPS program feature 2603. For example, first GPS program feature 2603 (e.g., "PROG") corresponding to the first GPS selection feature 2601 may enable the user to open a first submenu (e.g., route settings menu screen 2610 of FIG. 26B). The user may select a route from the route list feature 2605 and further may select a route viewing feature 2606 (e.g., "VIEW ROUTE") to open a second submenu (e.g., first route navigation menu screen 2620 of FIG. 26C). Although not exemplified, a person of ordinary skill in the art will appreciate that a route following feature (e.g., route following feature 2616 of FIG. 26B) may be included on GPS settings menu screen 2600.

FIG. 26B may represent a route settings menu screen 2610 (e.g., "ROUTE TRACKING MENU") of app 2100 (e.g., navigable by selecting GPS program feature 2603 of FIG. 26A for a lighting system). The route settings menu screen 2610 may include the one or more power selection features (e.g., features 2107-2109 of FIG. 21A), and further may include one or more route features (e.g., features 2611, 2612), and/or a route list feature 2615 (e.g., "ROUTE HISTORY").

After a route has been created (e.g., as exemplified with respect to FIG. 26A) the route may appear on the route list feature with a generic route name (e.g., "ROUTE 1") followed by a first route time (e.g., "TIME 1A") and a second route time (e.g., "TIME 1B"). Thus, route list feature 2615 may be populated by data from other submenus (e.g., route list feature 2605 of GPS settings menu screen 2600 of FIG. 26A). For example, the first route time may represent an overall travel time of the route from start to finish (including stops), and the second route time may represent a time for travel only. Other route data may be storable in route list feature 2615. The user may customize the generic route name by selecting a first route feature 2611 (e.g., "NAME ROUTE"), by entering a user specified route name in a route name data field 2613, and by selecting a route program feature 2614 (e.g., "SAVE"). Other data fields may be configured to enable storage of other route data as specified by the user and/or collected automatically by the app 2100, a controller (e.g., controller 1830 of FIG. 18), or both. In another example, routes on the route list feature 2615 may be deleted by selecting the route and then selecting a second route feature 2612 (e.g., "DELETE"). Further, the user may select a route from the route list feature 2615 and further may select a route following feature 2616 (e.g., "FOLLOW ROUTE") to open a first submenu of route settings menu screen 2610 (e.g, second route navigation menu screen 2630 of FIG. 26D). Although not exemplified, a person of ordinary skill in the art will appreciate that a route viewing feature (e.g., route viewing feature 2606 of FIG. 26A) may be included on route settings menu screen 2610.

Figure 26C:
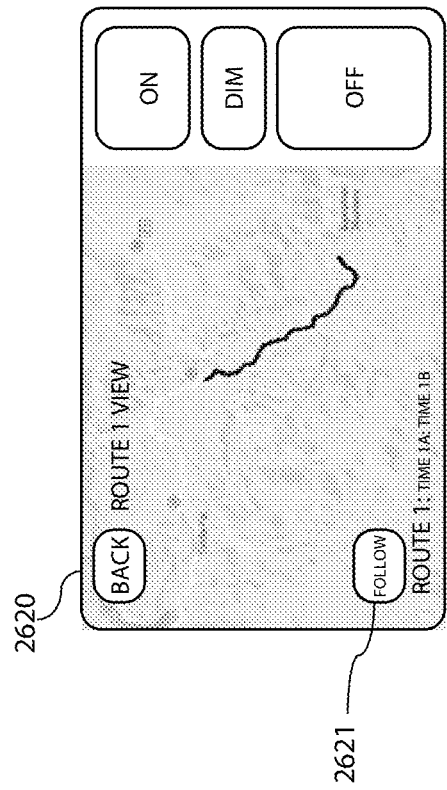
FIG. 26C illustrates a diagram of a software application menu screen.

FIG. 26C may represent a first route navigation menu screen 2620 (e.g., "ROUTE 1 VIEW") of app 2100 (e.g., navigable by selecting route viewing feature 2606 of FIG. 26A for a lighting system). For example, the first route navigation menu screen 2620 may include a map of the selected route from the route list feature 2605 of FIG. 26A and/or route list feature 2615 of FIG. 26B (e.g., and the surrounding area). In another example, the user may be able to scroll in any direction and further may be able to zoom in or out using finger scrolling motions and/or features enabling such function (not shown). In another example, the first route navigation menu screen 2620 may display the route name of the selected route, the first route time, and the second route time (e.g., at a bottom of the screen). In another example, the first route navigation menu screen 2620 may include a route following feature 2621 (e.g., "Follow") which may open a first submenu of first route navigation menu screen 2620 (e.g., to open the second route navigation menu screen 2630 of FIG. 26D).

FIG. 26D may represent a second route navigation menu screen 2630 (e.g., "ROUTE 3 FOLLOW") of app 2100 (e.g., navigable by selecting route following feature 2616 of FIG. 26B and/or by selecting route following feature 2621 of FIG. 26C for a lighting system). For example, the second route navigation menu screen 2630 may include a map of the selected route from the route list feature 2605 of FIG. 26A and/or route list feature 2615 of FIG. 26B (e.g., and the surrounding area). In another example, the user may be able to scroll in any direction and further may be able to zoom in or out using finger scrolling motions. In another example, the second route navigation menu screen 2630 may display the route name of the selected route, and a third route time (e.g., corresponding to an estimated arrival time at a destination of the route). In another example, the second route navigation menu screen 2630 may include an audio feature 2632 (e.g., "AUDIO") to enable voice instructions and/or interaction with the user while following a route. In another example, second route navigation menu screen 2630 may include a route viewing feature (e.g., such as route viewing feature 2606 of FIG. 26A) to enable a user to open a first submenu of second route navigation menu screen 2630 (e.g., first route navigation menu screen 2620 of FIG. 26C). In another example, first and second route navigation menu screens 2620, 2630 may be combined into a single route navigation menu screen with some or all features as disclosed herein.

FIG. 27A may represent an alert settings menu screen 2700 (e.g., "ALERT SETTINGS") of app 2100 (e.g., navigable by selecting security program feature 2517 of FIG. 25B for a lighting system). The alert settings menu screen 2700 may include the one or more power selection features (e.g., features 2107-2109 of FIG. 21A), and further may include one or more alert selection features (e.g., features 2701-2704).

The alert selection features 2701-2704 may be selected by sliding corresponding selector bubbles 2708 between "ON" and "OFF" positions of each alert selection feature. A person of ordinary skill in the art will appreciate that other button methods may be employed to enable the same functionality. Further, one or more of the alert selection features 2701-2704 may have a corresponding alert program feature (e.g., features 2705-2707). For example, a first alert program feature 2705 (e.g., "PROG") corresponding to a first alert selection feature 2701 (e.g., "DEFAULT ALERT") may open a first submenu of the alert settings menu screen 2700 (e.g., default alert settings menu screen 2710 of FIG. 27B). In another example, a second alert program feature 2706 (e.g., "PROG") corresponding to a second alert selection feature 2702 (e.g., "ROLE ALERT") may open a second submenu of the alert settings menu screen 2700 (e.g., roll alert settings menu screen 2720 of FIG. 27C). In another example, a third alert program feature 2707 (e.g., "PROG") corresponding to a third alert selection feature 2703 (e.g., "DISCONNECT ALERT") may open a third submenu of alert settings menu screen 2700 (e.g., disconnect alert settings menu screen 2730 of FIG. 27D). In another example, a fourth alert selection feature 2704 may have no corresponding alert program feature. The fourth alert selection feature may be configured to cause an audible alarm (e.g., via speaker 1856 of FIG. 18 and/or by integration with an alarm of the vehicle) in response to a disconnect condition of the lighting system from a control system (e.g, control system 1800 of FIG. 18). While four alert selection features and three alert program features have been exemplified in FIG. 27A, a person of ordinary skill in the art will appreciate that greater or fewer alert selection features and/or alert program features may be utilized. First, second, and third alert program features may enable a user to select and/or program who is to be notified in the event that any alert conditions are satisfied (e.g., when the lighting system is disconnected from the control system, an alarm may sound, and a notification may be send to a desired party).

FIG. 27B may represent a default alert settings menu screen 2710 (e.g., "DEFAULT ALERT MENU") of app 2100 (e.g., navigable by selecting alert program feature 2705 of FIG. 27A for a lighting system). A default alert may be sent if the lighting system or the control system experience any detectable software and/or hardware error which hampers the usability of the system. The default alert settings menu screen 2710 may include the one or more power selection features (e.g., features 2107-2109 of FIG. 21A), and further may include one or more default alert type features (e.g., features 2711-2713), a report feature 2716, and/or one or more alert timing features (e.g., features 2717, 2719).

The default alert type features may be selected by sliding corresponding selector bubbles 2718 between "ON" and "OFF" positions. A person of ordinary skill in the art will appreciate that other button methods may be employed to enable the same functionality. For example, when a user selects a first default alert type feature 2711 (e.g., "PHONE") the user may be prompted to enter a phone number in a phone number data field 2714 (e.g., "ENTER NUMBER"). In another example, when a user selects a second default alert type feature 2712 (e.g., "EMAIL") the user may be prompted to enter an email address in an email address data field 2715 (e.g., "ENTER EMAIL"). In another example, when a user selects a third default alert type feature 2713 (e.g., "MONITOR") a notification may be sent automatically to a monitoring station and/or to emergency response personnel. While three default alert type features and two corresponding data fields have been exemplified in FIG. 27B, a person of ordinary skill in the art will appreciate that greater or fewer default alert type features and/or data fields may be utilized. In another example, when a user selects the report feature 2716 (e.g., "REPORT") the user may be directed to a first submenu of default alert settings menu screen 2710 (e.g., to the notification settings menu screen 2530 of FIG. 25 to compose a notification which will be sent to a monitoring station and/or to emergency response personnel).

Further, the user may select one or more alert timing features 2717, 2719, to provide an alert at a specified time after default and/or another alert condition has occurred. For example, the user may select a first alert timing feature 2717 (e.g., "INSTANT") if he/she desires for an alert to be sent out at the time of the default. In another example, the user may select a second alert timing feature 2719 (e.g., "DELAY") and may select a number of minutes, hours, and/or days of delay in an alert timing list 2741. In another example, the user may select both the first and the second alert timing features (e.g., an illuminated feature may indicate that the feature has been selected or is in the "ON" position).

FIG. 27C may represent a roll alert settings menu screen 2720 (e.g., "ROLL ALERT MENU") of app 2100 (e.g., navigable by selecting alert program feature 2706 of FIG. 27A for a lighting system). The roll alert settings menu screen 2720 may include the one or more power selection features (e.g., features 2107-2109 of FIG. 21A), and further may include one or more roll alert type features (e.g., e.g., features 2721-2724).

The roll alert type features 2721-2724 may be selected by sliding corresponding selector bubbles 2728 between "ON" and "OFF" positions. A person of ordinary skill in the art will appreciate that other button methods may be employed to enable the same functionality. For example, when a user selects a first roll alert type feature 2721 (e.g., "PHONE") the user may be prompted to enter a phone number in a phone number data field 2725 (e.g., "ENTER NUMBER"). In another example, when a user selects a second roll alert type feature 2722 (e.g., "EMAIL") the user may be prompted to enter an email address in an email address data field 2726 (e.g., "ENTER EMAIL"). In another example, when a user selects a third roll alert type feature 2723 (e.g., "MONITOR") a notification may be sent automatically to a monitoring station and/or to emergency response personnel. In another example, when a user selects a fourth roll alert type feature 2724 (e.g., "FRIENDS") the user may select one or more friends from a friend list feature 2727 to receive the roll alert (e.g. in the form of a notification as herein described). While four roll alert type features have been exemplified in FIG. 27C, a person of ordinary skill in the art will appreciate that greater or fewer roll alert type features may be utilized.

FIG. 27D may represent a disconnect alert settings menu screen 2730 (e.g., "DISCONNECT ALERT MENU") of app 2100 (e.g., navigable by selecting alert program feature 2707 of FIG. 27A for a lighting system of the present invention). In general, disconnect refers to the disconnect of the lighting system from the control system (e.g., such as by theft). Nevertheless, disconnect may also include any other form of disconnect of the lighting system from its intended use, which causes either a disconnect of wiring and/or a disconnect of wireless connectivity. The disconnect alert settings menu screen 2730 may include the one or more power selection features (e.g., features 2107-2109 of FIG. 21A), and further may include one or more disconnect alert type features (e.g., features 2731-2733), a report feature 2736, and/or one or more alert timing features (e.g., features 2737, 2739).

The disconnect alert type features 2731-2733 may be selected by sliding a selector bubble 2738 between "ON" and "OFF" positions. A person of ordinary skill in the art will appreciate that other button methods may be employed to enable the same functionality. For example, when a user selects a first disconnect alert type feature 2731 (e.g., "PHONE") the user may be prompted to enter a phone number in a phone number data field 2734 (e.g., "ENTER NUMBER"). In another example, when a user selects a second disconnect alert type feature 2732 (e.g., "EMAIL") the user may be prompted to enter an email address in an email address data field 2735 (e.g., "ENTER EMAIL"). In another example, when a user selects a third disconnect alert type feature 2733 (e.g., "MONITOR") a notification may be sent automatically to a monitoring station and/or to emergency response personnel. While three disconnect alert type features and two corresponding data fields have been exemplified in FIG. 27D, a person of ordinary skill in the art will appreciate that greater or fewer disconnect alert type features and/or data fields may be utilized. In another example, when a user selects the report feature 2736 (e.g., "REPORT") the user may be directed to a first submenu of disconnect alert settings menu screen 2730 (e.g., to the notification settings menu screen 2530 of FIG. 25 to compose a notification which will be sent to a monitoring station and/or to emergency response personnel).

Further, the user may select one or more alert timing features 2737, 2739 to provide an alert at a specified time after disconnect has occurred. For example, the user may select a first alert timing feature 2737 (e.g., "INSTANT") if he/she desires for an alert to be sent out at the time of the default. In another example, the user may select a second alert timing feature 2739 (e.g., "DELAY") and may select a number of minutes, hours, and/or days of delay in an alert timing list 2742. In another example, the user may select both the first and the second alert timing features. In another example, alert timing list 2742 may be populated by data from another submenu (e.g., from alert timing list 2741 of default alert settings menu screen 2710 of FIG. 27B, or vice versa).

The menus and/or submenus of app 2100 have been described as having a particular hierarchy, however, a person of ordinary skill in the art will appreciate that the menus and/or submenus described herein may be configured in any hierarchy which enables access by a user. Furthermore, functions, features, and modes of operation described herein may be represented in app 2100 in any order and/or as part of any menu and/or submenu.

Other aspects and embodiments of the present invention will be apparent to those skilled in the art from consideration of the specification and practice of the invention disclosed herein. It is intended, therefore, that the specification and illustrated embodiments be considered as examples only, with a true scope and spirit of the invention being indicated by the following claims.

What is claimed is:

1. A method of operating a lighting system, comprising:
providing power at a first power level to a first LED such that light is emitted into a first photometric distribution;
providing power at a second power level to a second LED such that light is emitted into a second photometric distribution different from the first photometric distribution, wherein the first photometric distribution combines with the second photometric distribution to form a combined beam pattern of the lighting system;
regulating the first and second power levels such that changes in light emitted by the first and second LEDs causes a transformation of the combined beam pattern.

2. The method of claim 1, wherein the first power level is greater than the second power level, and wherein decreasing power to the first power level and increasing power to the second power level transforms the combined beam pattern.

3. The method of claim 1, wherein the combined beam pattern is in the form of one of a spot photometric distribution transformable into a flood photometric distribution, or a flood photometric distribution transformable into a spot photometric distribution.

4. The method of claim 1, further comprising:
providing power at a third power level to a third LED such that light is emitted into a third photometric distribution different from the first and second photometric distributions, wherein the first, second, and third photometric distributions combine to form a combined beam pattern of the lighting system.

5. The method of claim 4, wherein regulating the first, second, and third power levels transforms the combined beam pattern of the lighting system.

6. The method of claim 5, wherein regulating the first, second and third power levels includes:
detecting one or more vehicle conditions;
selecting a mode of operation of the lighting system corresponding to the detected vehicle conditions, wherein the first, second and third power levels are regulated so that first, second and third LEDs emit light to form a combined beam pattern selected for the detected vehicle conditions.

7. The method of claim 4, wherein in a mode of operation of the lighting system, the first power level is greater than the second and third power levels, wherein the second and third power levels are about zero, and wherein the combined beam pattern is substantially formed by the first photometric distribution.

8. The method of claim 4, wherein the combined beam pattern is one or more of a spot photometric distribution transformable into a medial photometric distribution, a spot photometric distribution transformable into a flood photometric distribution, a medial photometric distribution transformable into a spot photometric distribution, a medial photometric distribution transformable into a flood photometric distribution, a flood photometric distribution transformable into a medial photometric distribution, or a flood photometric distribution transformable into a spot photometric distribution.

9. A method of operating a lighting system on a vehicle, comprising:
detecting one or more vehicle conditions;
selecting a mode of operation of the lighting system corresponding to the detected vehicle conditions;
providing power at a first power level to a first group of LEDs such that light from the first group of LEDs is emitted into a first photometric distribution;
providing power at a second power level to a second group of LEDs such that light from the second group of LEDs is emitted into a second photometric distribution; and
providing power at a third power level to a third group of LEDs such that light from the third group of LEDs is emitted into a third photometric distribution, wherein the first, second, and third photometric distributions combine to form a combined beam pattern of the lighting system.

10. The method of claim 9, wherein in a first mode of operation, the first power level is greater than the second and third power levels.

11. The method of claim 10, wherein in a second mode of operation, the second power level is greater than the first and third power levels.

12. The method of claim 11, wherein in a third mode of operation, the third power level is greater than the first and second power levels.

13. The method of claim 9, wherein a vehicle condition may include one or more of vehicle speed, vehicle directional changes, glare, object detection, facial recognition, operator vision tracking, or any sensed parameter.

14. The method of claim 13, wherein a first mode of operation is selected corresponding to a first vehicle speed, such that the first power level is greater than the second and third power levels.

15. The method of claim 14, wherein the first, second and third power levels cause the first, second, and third LEDs to emit light into a combined beam pattern resembling a spot beam.

16. The method of claim 14, wherein a second mode of operation is selected corresponding to a second vehicle speed, such that the second power level is greater than the first and third power levels.

17. The method of claim 16, wherein the first, second and third power levels cause the first, second, and third LEDs to emit light into a combined beam pattern resembling a medial beam.

18. The method of claim 16, wherein a third mode of operation is selected corresponding to a third vehicle speed, such that the third power level is greater than the first and second power levels.

19. The method of claim 18, wherein the first speed is greater than the second speed, and the second speed is greater than the third speed.

20. The method of claim 18, wherein the first, second and third power levels cause the first, second, and third LEDs to emit light into a combined beam pattern resembling a flood beam.

* * * * *